US012134003B2

(12) United States Patent
Henniger et al.

(10) Patent No.: US 12,134,003 B2
(45) Date of Patent: *Nov. 5, 2024

(54) WEIGHTLIFTING RACK ASSEMBLY AND WALL MOUNT BRACKET FOR A WEIGHTLIFTING RACK ASSEMBLY

(71) Applicant: Coulter Ventures, LLC., Columbus, OH (US)

(72) Inventors: William Henniger, Columbus, OH (US); Nash Dunahay, Blacklick, OH (US)

(73) Assignee: Coulter Ventures, LLC., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,210

(22) Filed: May 9, 2023

(65) Prior Publication Data
US 2024/0042265 A1 Feb. 8, 2024

Related U.S. Application Data

(63) Continuation of application No. 17/478,053, filed on Sep. 17, 2021, now Pat. No. 11,660,491, which is a
(Continued)

(51) Int. Cl.
*A63B 21/078* (2006.01)
*A63B 21/00* (2006.01)
(Continued)

(52) U.S. Cl.
CPC .......... *A63B 21/078* (2013.01); *A63B 21/068* (2013.01); *A63B 21/169* (2015.10);
(Continued)

(58) Field of Classification Search
CPC ....... A63B 1/00; A63B 3/00; A63B 21/00047; A63B 21/068; A63B 21/072;
(Continued)

(56) References Cited

U.S. PATENT DOCUMENTS

| 88,047 A | 3/1869 | Lawrence |
|---|---|---|
| D47,725 S | 8/1915 | Heulings |

(Continued)

FOREIGN PATENT DOCUMENTS

| CN | 200962175 Y | 10/2007 |
|---|---|---|
| CN | 101988619 A | 3/2011 |

(Continued)

OTHER PUBLICATIONS

*Coulter Ventures LLC* v *Bulldog Gear Limited*, High Court (Eng. & Wales), Claim No. HP-2019-000054, Amended Claim Form and Amended Particulars of Claim, dated Dec. 23, 2020.
(Continued)

*Primary Examiner* — Gary D Urbiel Goldner
(74) *Attorney, Agent, or Firm* — Banner & Witcoff, Ltd.

(57) ABSTRACT

A weightlifting assembly includes a wall mount bracket configured for mounting to a wall surface and a weightlifting rack assembly connected to the wall mount bracket. The weightlifting rack assembly may have various configurations, including a foldable weight rack assembly, a pull-up bar, a fixed weightlifting rack, a wall-mount weightlifting rack, or various other configurations. The wall mount bracket may be elongated along a lateral width thereof and may have a first mounting region and a second mounting region spaced from each other along the lateral width of the wall mount bracket. The wall mount bracket may also include a central panel that is spaced from the wall surface to provide clearance for fasteners for connection to the weightlifting rack assembly, and in some embodiments, the weightlifting rack assembly may be connected to multiple wall mount panels.

20 Claims, 26 Drawing Sheets

Related U.S. Application Data continuation of application No. 16/179,435, filed on Nov. 2, 2018, now Pat. No. 11,123,595, which is a continuation-in-part of application No. 16/043,805, filed on Jul. 24, 2018, now Pat. No. 10,226,661, which is a continuation of application No. 15/801,638, filed on Nov. 2, 2017, now abandoned.

(60) Provisional application No. 62/695,424, filed on Jul. 9, 2018.

(51) Int. Cl.
*A63B 21/062* (2006.01)
*A63B 21/068* (2006.01)
*A63B 21/072* (2006.01)
*A63B 21/16* (2006.01)
*A63B 23/04* (2006.01)
*A63B 23/12* (2006.01)
*A63B 71/00* (2006.01)
*F16M 13/02* (2006.01)

(52) U.S. Cl.
CPC ...... *A63B 21/4035* (2015.10); *A63B 23/0405* (2013.01); *A63B 23/1218* (2013.01); *A63B 71/0036* (2013.01); *F16M 13/02* (2013.01); *A63B 21/0628* (2015.10); *A63B 21/0724* (2013.01); *A63B 2023/0411* (2013.01); *A63B 2210/00* (2013.01); *A63B 2210/50* (2013.01)

(58) Field of Classification Search
CPC .............. A63B 21/0724; A63B 21/078; A63B 21/0783; A63B 21/159; A63B 21/16; A63B 21/169; A63B 21/4027; A63B 21/4033; A63B 21/4035; A63B 21/4045; A63B 21/4047; A63B 21/4049; A63B 22/0046; A63B 22/0048; A63B 23/04; A63B 23/0405; A63B 23/0482; A63B 23/0494; A63B 23/12; A63B 23/1209; A63B 23/1218; A63B 23/1227; A63B 23/1236; A63B 23/1245; A63B 2023/0411; A63B 26/00; A63B 26/003; A63B 71/0036; A63B 2210/00; A63B 2210/50; A63B 2225/09; A63B 2225/093; A63B 2244/09; F16M 13/02
See application file for complete search history.

(56) References Cited

U.S. PATENT DOCUMENTS

| | | |
|---|---|---|
| D47,726 S | 8/1915 | Heulings |
| 1,410,149 A | 3/1922 | Williams |
| 2,855,200 A | 10/1958 | Blickman |
| 3,207,511 A * | 9/1965 | Hoffman ............... A63B 17/00 482/145 |
| D210,469 S | 3/1968 | Sejersen |
| 3,948,513 A | 4/1976 | Pfotenhauer |
| 4,111,414 A | 9/1978 | Roberts |
| D256,865 S | 9/1980 | Crowe |
| D259,512 S | 6/1981 | Hallen |
| 4,323,236 A | 4/1982 | Szabo |
| D264,756 S | 6/1982 | Andersson |
| D265,111 S | 6/1982 | Lynn |
| D269,691 S | 7/1983 | Ornstein et al. |
| D273,334 S | 4/1984 | Young |
| D273,619 S | 4/1984 | Young |
| D273,711 S | 5/1984 | Young |
| D273,997 S | 5/1984 | Ryan |
| D276,656 S | 12/1984 | Lindstrom |
| 4,527,797 A | 7/1985 | Slade, Jr. et al. |
| D285,047 S | 8/1986 | Dean et al. |
| D290,033 S | 5/1987 | Policastro |
| D297,957 S | 10/1988 | Gordon, III |
| 4,934,693 A | 6/1990 | Santoro |
| 4,961,295 A | 10/1990 | Kosch, Sr. et al. |
| 5,046,722 A | 9/1991 | Antoon |
| 5,135,077 A | 8/1992 | Shalders |
| 5,184,992 A | 2/1993 | Banks |
| 5,273,506 A | 12/1993 | Dawson, Jr. |
| D344,601 S | 2/1994 | Jenkins et al. |
| 5,290,209 A | 3/1994 | Wilkinson |
| 5,306,220 A | 4/1994 | Kearney |
| D355,005 S | 1/1995 | Voohanel, Jr. |
| D358,623 S | 5/1995 | Macasieb |
| 5,669,859 A | 9/1997 | Liggett et al. |
| D385,140 S | 10/1997 | Whitehead et al. |
| 5,776,033 A | 7/1998 | Brown |
| D408,480 S | 4/1999 | Haugo |
| 6,116,550 A | 9/2000 | Forbes |
| 6,129,651 A | 10/2000 | Denaro |
| 6,220,988 B1 | 4/2001 | Williams |
| D455,309 S | 4/2002 | Hoernig |
| 6,379,287 B1 | 4/2002 | Slawinski et al. |
| 6,554,338 B1 | 4/2003 | Spence |
| D474,281 S | 5/2003 | Hansen |
| D484,617 S | 12/2003 | Micheals |
| D486,020 S | 2/2004 | Hoernig |
| D486,337 S | 2/2004 | Hoernig |
| D507,352 S | 7/2005 | Vanderbrugghen |
| D514,857 S | 2/2006 | Hoernig |
| D517,085 S | 3/2006 | Deuschle |
| D523,322 S | 6/2006 | Thurston et al. |
| D525,668 S | 7/2006 | Payne |
| D543,839 S | 6/2007 | Cooper et al. |
| D550,793 S | 9/2007 | Rogers et al. |
| D554,209 S | 10/2007 | Loucks |
| 7,316,379 B1 | 1/2008 | Graham |
| 7,374,516 B2 | 5/2008 | Lundquist |
| D577,939 S | 10/2008 | Rubin et al. |
| 7,455,621 B1 | 11/2008 | Anthony |
| 7,488,277 B1 | 2/2009 | Knapp |
| 7,523,907 B2 | 4/2009 | Chen |
| D593,169 S | 5/2009 | Storch |
| 7,534,200 B1 | 5/2009 | Martinez |
| 7,549,950 B1 | 6/2009 | Lundquist et al. |
| D596,761 S | 7/2009 | Beland |
| 7,666,118 B1 | 2/2010 | Anthony |
| D613,883 S | 4/2010 | Staten et al. |
| 7,753,830 B1 | 7/2010 | Marsh et al. |
| 7,892,158 B2 | 2/2011 | Varga |
| D635,206 S | 3/2011 | Henniger |
| D636,038 S | 4/2011 | Henniger |
| D636,039 S | 4/2011 | Henniger |
| D636,040 S | 4/2011 | Henniger |
| D639,585 S | 6/2011 | Shen et al. |
| D639,586 S | 6/2011 | Selinger et al. |
| D639,587 S | 6/2011 | Selinger et al. |
| 8,047,972 B1 | 11/2011 | Dean et al. |
| 8,079,915 B2 | 12/2011 | Spencer et al. |
| 8,083,191 B2 | 12/2011 | Lai et al. |
| D651,670 S | 1/2012 | Calvin |
| D659,854 S | 5/2012 | Kligman |
| D660,984 S | 5/2012 | Kotin et al. |
| D661,412 S | 6/2012 | Kligman |
| 8,206,270 B2 | 6/2012 | Skipper |
| 8,206,273 B2 | 6/2012 | Skipper |
| D670,944 S | 11/2012 | Cittadino |
| 8,323,158 B2 | 12/2012 | Keiser |
| 8,328,698 B1 | 12/2012 | Webber et al. |
| D682,955 S | 5/2013 | Stephan |
| 8,500,608 B1 | 8/2013 | Bonomi |
| 8,517,900 B1 | 8/2013 | Britt |
| D703,773 S | 4/2014 | Henry |
| D711,021 S | 8/2014 | Singh |
| D711,155 S | 8/2014 | OBrien |
| 8,834,329 B2 | 9/2014 | Kelly |
| 8,876,672 B2 | 11/2014 | Schiano |
| D718,883 S | 12/2014 | Thrush et al. |
| D718,884 S | 12/2014 | Thrush et al. |
| 8,992,395 B2 | 3/2015 | Orakwusi |

(56) References Cited

U.S. PATENT DOCUMENTS

| | | |
|---|---|---|
| 9,011,298 B2 | 4/2015 | Bonomi |
| 9,044,629 B2 | 6/2015 | Ross |
| D734,410 S | 7/2015 | Childs et al. |
| D735,820 S | 8/2015 | Alenaddaf |
| D735,821 S | 8/2015 | Alenaddaf |
| D742,540 S | 11/2015 | Singh |
| D742,543 S | 11/2015 | Singh |
| 9,192,799 B2 | 11/2015 | Alenaddaf |
| D747,372 S | 1/2016 | Kim et al. |
| 9,289,638 B2 | 3/2016 | Towley, III et al. |
| 9,308,410 B2 | 4/2016 | Beaver et al. |
| D757,531 S | 5/2016 | Rusher |
| 9,333,387 B2 | 5/2016 | Hopperstad et al. |
| D764,607 S | 8/2016 | Beckford et al. |
| 9,409,048 B1 | 8/2016 | Hopperstad et al. |
| 9,421,917 B1 | 8/2016 | Christian et al. |
| 9,427,611 B1 | 8/2016 | Balentine |
| 9,492,701 B1 | 11/2016 | Bognatz |
| 9,498,670 B1 | 11/2016 | Hopperstad et al. |
| 9,517,382 B2 | 12/2016 | Payne |
| D783,307 S | 4/2017 | Kuo |
| 9,649,525 B2 | 5/2017 | Hopperstad et al. |
| 9,675,829 B1 | 6/2017 | Katz |
| 9,700,761 B2 | 7/2017 | Beaver et al. |
| D799,306 S | 10/2017 | Lee et al. |
| D801,547 S | 10/2017 | Lopez |
| D802,164 S | 11/2017 | Lopez |
| 9,844,691 B2 | 12/2017 | Hopperstad et al. |
| 9,868,006 B1 | 1/2018 | Epler |
| D816,173 S | 4/2018 | Jackson |
| D817,520 S | 5/2018 | Gonzales |
| 9,993,678 B2 | 6/2018 | Hopperstad et al. |
| 10,004,933 B2 | 6/2018 | Lennox et al. |
| 10,086,226 B2 | 10/2018 | Nelson et al. |
| D836,617 S | 12/2018 | Shu |
| 10,226,661 B2 | 3/2019 | Henniger et al. |
| D845,045 S | 4/2019 | Dunahay |
| D852,289 S | 6/2019 | Jones et al. |
| D852,539 S | 7/2019 | Nilssen et al. |
| D852,907 S | 7/2019 | Sergakis |
| D853,587 S | 7/2019 | Jackson et al. |
| D853,588 S | 7/2019 | Jackson et al. |
| D853,589 S | 7/2019 | Jackson et al. |
| D854,635 S | 7/2019 | Dunahay |
| D857,241 S | 8/2019 | Sakamoto et al. |
| D858,721 S | 9/2019 | Gori et al. |
| 10,471,293 B2 | 11/2019 | George |
| D869,688 S | 12/2019 | Lanzafame |
| D875,222 S | 2/2020 | Gori et al. |
| D875,898 S | 2/2020 | Gori et al. |
| D879,216 S | 3/2020 | Dunahay |
| D879,217 S | 3/2020 | Dunahay |
| 10,576,322 B2 | 3/2020 | Schlegel |
| D883,405 S | 5/2020 | Dunahay |
| 10,646,740 B2 | 5/2020 | Lee |
| D886,214 S | 6/2020 | Jones et al. |
| D886,920 S | 6/2020 | Dunahay |
| D888,851 S | 6/2020 | Dunahay |
| 10,709,921 B2 | 7/2020 | Risacher |
| D892,239 S | 8/2020 | Carmichael et al. |
| D892,948 S | 8/2020 | Huang |
| D898,137 S | 10/2020 | Carmichael et al. |
| 10,806,963 B2 | 10/2020 | Staten |
| D903,019 S | 11/2020 | Sotis |
| 10,864,401 B2 | 12/2020 | Schween |
| D906,740 S | 1/2021 | Parab et al. |
| D907,946 S | 1/2021 | Parab et al. |
| D909,192 S | 2/2021 | Koelling et al. |
| D915,534 S | 4/2021 | Adams |
| D922,809 S | 6/2021 | Parab et al. |
| D928,253 S | 8/2021 | Dunahay |
| 11,103,739 B2 | 8/2021 | Shaw, Jr. |
| D931,954 S * | 9/2021 | Dunahay ............... D21/686 |
| D931,955 S * | 9/2021 | Dunahay ............... D21/686 |
| 11,123,595 B2 | 9/2021 | Henniger et al. |
| 11,123,607 B2 | 9/2021 | Padgett |
| D942,561 S * | 2/2022 | Dunahay ............... D21/686 |
| D949,258 S | 4/2022 | Dunahay |
| D949,264 S | 4/2022 | Dunahay |
| D949,265 S | 4/2022 | Dunahay |
| 11,458,349 B1 | 10/2022 | Carlson |
| 11,607,599 B2 | 3/2023 | Brasch et al. |
| 11,660,491 B2 | 5/2023 | Henniger et al. |
| 11,660,492 B2 | 5/2023 | Henniger et al. |
| D992,063 S | 7/2023 | Dunahay |
| D997,267 S | 8/2023 | Dunahay et al. |
| D1,007,619 S | 12/2023 | Dunahay et al. |
| D1,008,381 S | 12/2023 | Dunahay |
| D1,008,382 S | 12/2023 | Dunahay |
| D1,010,033 S | 1/2024 | Pritchett et al. |
| 2001/0034289 A1 | 10/2001 | Parrillo |
| 2002/0082145 A1 | 6/2002 | Hamilton |
| 2002/0123415 A1 | 9/2002 | Marques |
| 2003/0222041 A1 | 12/2003 | Hong et al. |
| 2005/0130806 A1 | 6/2005 | Lopez |
| 2005/0250619 A1 | 11/2005 | Daikeler et al. |
| 2006/0003875 A1 | 1/2006 | Sharps |
| 2006/0040800 A1 | 2/2006 | Slyter |
| 2006/0065800 A1 | 3/2006 | Bremmon |
| 2006/0145038 A1 | 7/2006 | Chen |
| 2007/0032357 A1 | 2/2007 | Piane |
| 2007/0072750 A1 | 3/2007 | Andrews |
| 2007/0203002 A1 | 8/2007 | Webber |
| 2009/0105052 A1 | 4/2009 | Dalebout et al. |
| 2009/0124471 A1 | 5/2009 | Storch |
| 2010/0044536 A1 | 2/2010 | Huang |
| 2010/0048368 A1 | 2/2010 | Donofrio |
| 2010/0171017 A1 | 7/2010 | Chang |
| 2011/0240808 A1 | 10/2011 | Skipper |
| 2011/0245040 A1 | 10/2011 | Skipper |
| 2011/0248128 A1 | 10/2011 | Oh |
| 2012/0046150 A1 | 2/2012 | Stacey |
| 2012/0094812 A1 | 4/2012 | Smiley |
| 2012/0115683 A1 | 5/2012 | Ross |
| 2012/0329614 A1 | 12/2012 | Schiano |
| 2013/0030334 A1 | 1/2013 | Agostini |
| 2013/0178338 A1 | 7/2013 | Ross |
| 2013/0184124 A1 | 7/2013 | Reed |
| 2013/0237394 A1 | 9/2013 | Fowler |
| 2013/0260970 A1 | 10/2013 | Moskowich |
| 2013/0296143 A1 | 11/2013 | Staten et al. |
| 2014/0094347 A1 | 4/2014 | Orakwusi |
| 2014/0166834 A1 | 6/2014 | Kuroyanagi et al. |
| 2014/0221163 A1 | 8/2014 | Mcbride et al. |
| 2014/0256517 A1 | 9/2014 | Poppinga |
| 2014/0302968 A1 | 10/2014 | Velikin et al. |
| 2014/0371040 A1 | 12/2014 | Vasquez et al. |
| 2015/0016919 A1 | 1/2015 | Tambornino et al. |
| 2015/0059257 A1 | 3/2015 | Beaver et al. |
| 2015/0065316 A1 | 3/2015 | Towley, III et al. |
| 2015/0069257 A1 | 3/2015 | Besson |
| 2015/0076092 A1 | 3/2015 | Tambornino et al. |
| 2015/0126335 A1 | 5/2015 | Gilson et al. |
| 2015/0148197 A1 | 5/2015 | Lentz et al. |
| 2015/0202485 A1 | 7/2015 | Towley, III et al. |
| 2015/0264823 A1 | 9/2015 | Shirley et al. |
| 2015/0290488 A1 | 10/2015 | Hopperstad et al. |
| 2015/0290965 A1 | 10/2015 | Schwartz |
| 2016/0023035 A1 | 1/2016 | Meyer |
| 2016/0250515 A1 | 9/2016 | Hopperstad et al. |
| 2016/0338512 A1 | 11/2016 | Royak |
| 2016/0339291 A1 | 11/2016 | Hopperstad et al. |
| 2016/0346582 A1 | 12/2016 | Wilkinson |
| 2017/0065844 A1 | 3/2017 | Hopperstad et al. |
| 2017/0072260 A1 | 3/2017 | Jackson |
| 2017/0150786 A1 | 6/2017 | Ness et al. |
| 2017/0189736 A1 | 7/2017 | Martin |
| 2017/0209733 A1 | 7/2017 | Beaver et al. |
| 2017/0239512 A1 | 8/2017 | Brasch et al. |
| 2017/0246490 A1 | 8/2017 | Hopperstad et al. |
| 2017/0246496 A1 | 8/2017 | Nelson et al. |
| 2017/0259101 A1 | 9/2017 | Im |
| 2018/0014680 A1 | 1/2018 | Hanley et al. |
| 2018/0028852 A1 | 2/2018 | Beaver et al. |

(56) References Cited

U.S. PATENT DOCUMENTS

| | | |
|---|---|---|
| 2018/0036573 A1 | 2/2018 | Lennox et al. |
| 2018/0056108 A1 | 3/2018 | Kelly |
| 2018/0056116 A1 | 3/2018 | Le Nguyen |
| 2018/0104522 A1 | 4/2018 | Hopperstad et al. |
| 2018/0117382 A1 | 5/2018 | Johanson et al. |
| 2018/0140922 A1 | 5/2018 | Greer |
| 2018/0142832 A1 | 5/2018 | Inouye |
| 2018/0153305 A1 | 6/2018 | Haines |
| 2018/0154234 A1 | 6/2018 | Pack et al. |
| 2018/0178051 A1 | 6/2018 | Shaw, Jr. |
| 2018/0185694 A1 | 7/2018 | Schween |
| 2018/0243597 A1 | 8/2018 | Schlegel |
| 2018/0318635 A1 | 11/2018 | Lee |
| 2018/0326250 A1 | 11/2018 | Henniger et al. |
| 2019/0046835 A1 | 2/2019 | Henniger et al. |
| 2019/0126088 A1 | 5/2019 | Henniger et al. |
| 2019/0240521 A1 | 8/2019 | Staten |
| 2019/0269992 A1 | 9/2019 | Dunahay |
| 2020/0114191 A1 | 4/2020 | Chen |
| 2020/0114195 A1 | 4/2020 | Henniger et al. |
| 2020/0179744 A1 | 6/2020 | Arroyo |
| 2020/0384337 A1 | 12/2020 | Brasch et al. |
| 2020/0391070 A1 | 12/2020 | Henniger et al. |
| 2021/0213321 A1 | 7/2021 | Silveira |
| 2022/0016466 A1* | 1/2022 | Henniger ............ A63B 23/1218 |
| 2022/0023704 A1* | 1/2022 | Henniger ............. A63B 21/068 |
| 2022/0161092 A1 | 5/2022 | Fourney |

FOREIGN PATENT DOCUMENTS

| | | |
|---|---|---|
| CN | 201925694 U | 8/2011 |
| CN | 202812711 U | 3/2013 |
| CN | 203375141 U | 1/2014 |
| CN | 305671858 | 3/2020 |
| CN | 307476479 | 7/2022 |
| EP | 2400205 A1 | 12/2011 |
| KR | 301143803.0000 | 12/2021 |
| WO | 2008054720 A2 | 5/2008 |
| WO | 2009003280 A1 | 1/2009 |
| WO | 2012/047999 A2 | 4/2012 |

OTHER PUBLICATIONS

*Coulter Ventures LLC* v *Bulldog Gear Limited*, High Court (Eng. & Wales), Claim No. HP-2019-000054, Amended Reply and Defence to Counterclaim, dated Feb. 18, 2021.
Jun. 8, 2021—(CA) Office Action—App 3,081,723.
Jul. 30, 2021—(EP) Extended European Search Report—App 18872756.4.
ROGUE Fitness: "Installing the RML-3W with the new Rogue Stringer", Sep. 19, 2017 (Sep. 19, 2017), XP054982060, Retrieved from the Internet: URL: https://www.youtube/com/watch?v=TRpmZ68p5Hw [retrieved on Jul. 13, 2021].
Sep. 13, 2021—(CN) Office Action—App 201880085010.6.
Dec. 14, 2021—(CN) 4th Office Action—App 201880085010.6.
Jan. 18, 2022—(CA) 2nd Office Action—App 3,081,723.
Mar. 9, 2022—(CN) 5th Office Action—App 201880085010.6.
Jun. 7, 2022—(CN) Rejection Decision—App 201880085010.6.
Jan. 31, 2023—(AU) Examination Report—App 2022200346.
Rogue product advertisement dated Dec. 3, 2015 (redacted).
Rogue fitness product video screenshots from <https://www.youtube.com/watch?v=TRpmZ68p5Hw>, dated Sep. 19, 2017.
Gorila Fitness product advertisement dated Apr. 16, 2018 (redacted).
Bulldog Gear product advertisement dated Jan. 11, 2018.
Pure Strength product listing dated Sep. 6, 2018 from <https://www.pure-strength.com/collections/slim-gym-utility-plate>.
Titan Fitness product listing dated Sep. 6, 2018 from <https://www.titan.fitness/t-3-folding-power-rack-stringers.html>.
Titan Fitness product listing dated Sep. 6, 2018 from <https://www.titan.fitness/41-inch-deep-folding-wall-mount-rack.html> (product known to be available as of Mar. 2, 2016).
Product listing for Rogue V2 Face Mount Pull-up Bar for Monster Lite from https://web.archive.org/web/20161105161238/https://www.roguefitness.com/rogue-v2-face-mount-pull-up-bar-for-monster-lite, dated Nov. 5, 2016.
Jan. 11, 2019—(WO) ISR and WO—App No. PCT/US2018/059018.
Oct. 6, 2020—(AU) Examination Report—App 2018360038.
Rogue P-3 Pull-Up System; https://web.archive.org/web/20160901091143/http:/www.roguefitness.com/p3-pullup-system; 5 pages downloaded Dec. 7, 2020.
ROGUE P-5V Garage Pull-Up System; https://web.archive.org/web/20160812065929/http:/www.roguefitness.com:80/rogue-p-5v-garage-pullup-system; 13 pages downloaded Dec. 7, 2020.
Product listing for Rogue RML-3W Fold Back Wall Mount Rack, from <https://web.archive.org/web/20180724134619/https://www.roguefitness.com/rogue-rml-3w-fold-back-wall-mount-rack>, dated Jul. 24, 2018.
Product listing for Folding MyRack Base, from <https://www.forceusa.com/collections/all/products/myrack-folding-power-rack?utm_source=google&utm_medium=cpc&utm_campaign=generic&gclid=EAlaIQobChMlv9bwye6n5wIVysDACh3bBwodEAAYBCAAEglb7vD_BwE>, dated Feb. 6, 2020.
Product listing for Rogue R-3W Fold Back Wall Mount Rack, from <https://web.archive.org/web/20181022030706/https://www.roguefitness.com/rogue-r-3w-fold-back-wall-mount-rack>, dated Oct. 22, 2018.
Product listing for Rogue RML-3WC Fold Back Wall Mount Rack, from <https://web.archive.org/web/20171102102928/http://www.roguefitness.com/rogue-rml-3wc-fold-back-wall-mount-rack-custom-color-edition>, dated Nov. 2, 2017.
Product listing for Rogue RML-3 Rogue Monster Lite R-3, from <https://web.archive.org/web/20170623162215/http://www.roguefitness.com/rml-3-rogue-monster-lite-r-3>, dated Jun. 23, 2017.
https://gearmashers.com/rogue-fitness-jammer-pull-up-bar-review/ (Year: 2020).
Dec. 18, 2020—(CN) Office Action—App 201880085010.6.
Pull up bar by Rogue dated Jun. 4, 2018. Found online [Feb. 4, 2019] https://www.roguefitness.com/rogue-jammer-pull-up-bar?bvstate=pg:4/ct:r.
Screenshot of Level Mount tv mount from https://www.youtube.com/watch?v=YUVvZr3qTrc, dated Mar. 26, 2012, accessed Jun. 2, 2020.
Screenshot of Abt Electronics wall mount from https://www.youtube.com/watch?v=XJEmJhEleH0, dated Jun. 6, 2013, accessed Jun. 2, 2020.
Screenshot of Show Me CABLES ultra slim tv wall mount from https://www.youtube.com/watch?v=UfcsWN7brCg, dated Jun. 27, 2016, accessed Jun. 2, 2020.
Screenshot of Texonic Model LX67 wall mount from https://www.youtube.com/watch?v=ojTXO9edjEc, dated Jul. 5, 2017, accessed Jun. 2, 2020.
Screenshot of Sony SUWL450 wall mount from https://www.amazon.co.uk/Sony-SUWL450-Wall-Mount/dp/B00IZEIZB4/ref=sr_1_20?keywords=Sony+Wall+Mount+Bracket&qid=1580915273&sr%E2%80%A6, dated Mar. 14, 2014.
Screenshot of Sony Duronic TV Bracket TV123M wall mount from https://www.amazon.co.uk/dp/B001PHBZFQ/ref=psdc_1338216031_t4_B07MX3Q3NZ, dated Jan. 12, 2009.
Screenshot of wall mounting bracket Dv5 from Hornung's Industrial Gas Catalogue, http://my.page2flip.de/1672972/2178732/2178865/pdf/CatalogueforindustrialgascontrolequipmentHornungGmbH.pdf, dated Jan. 2013.
Screenshot of wall mounting bracket D2 from Hornung's Industrial Gas Catalogue, http://my.page2flip.de/1672972/2178732/2178865/pdf/CatalogueforindustrialgascontrolequipmentHornungGmbH.pdf, dated Jan. 2013, accessed Feb. 6, 2020.
Screenshot of wall mounting bracket painted from Hornung's Industrial Gas Catalogue, http://my.page2flip.de/1672972/2178732/2178865/pdf/CatalogueforindustrialgascontrolequipmentHornungGmbH.pdf, dated Jan. 2013, accessed Feb. 6, 2020.
Screenshot of wall mounting bracket in stainless steel electropolishing from Hornung's Industrial Gas Catalogue, http://my.page2flip.

(56) References Cited

OTHER PUBLICATIONS de/1672972/2178732/2178865/pdf/Catalogueforindustrialgascontrolequipment HornungGmbH.pdf, dated Jan. 2013, accessed Feb. 6, 2020.
Screenshot of wall mounting bracket in stainless steel, electropolishing, HP 550-552 from Hornung's Industrial Gas Catalogue, http://my.page2flip.de/1672972/2178732/2178865/pdf/Catalogueforindustrialgascontrolequipment HornungGmbH.pdf, dated Jan. 2013, accessed Feb. 6, 2020.
Screenshot of Altecnic Expansion Vessel Bracket from https://www.amazon.co.uk/dp/B00QVM4LCE/ref=sspa_dk_detail_0?psc=1&pd_rd_i=B00QVM4LCE&pd_rd_w=6dXas&pf_rd_p=1055d8b2-c10c-4%E2%80%A6, dated Dec. 11, 2014, accessed Feb. 5, 2020.
Screenshot of Reflex Winkelmann Wall Holder from https://www.amazon.co.uk/Reflex-Winkelmann-7611000-Holder-25-Litre/dp/B0017UWL61, dated Dec. 13, 2012, accessed Feb. 5, 2020.
Design View Registered Community Design No. 002104463-0001, dated Sep. 17, 2012.
Design View Registered Community Design No. 00765862-0001, dated Jul. 27, 2007.
Design View Registered Community Design No. 000153796-0002, dated Feb. 25, 2004.
Screenshot of Mammoth Lite Folding Rack from Bulldog Gear Instagram account, dated Jan. 11, 2018.
Screenshot of Folding Rack from Bulldog Gear Instagram account, dated Oct. 2, 2018.
Screenshot of wall bracket from Weinmann-Schanz, http://web.archive.org/web/20170909025230/http://www.weinmann-schanz.de/de/de/Heizung/Neu-im-Sortiment/W%C3%A4rmeerzeuger-Speicher/pid.1143.1160/agid.90421.90432.105367/ecm.ag/Abstandsmontageplatten-f%C3%BCr-Wandkonsolen.html, dated Sep. 9, 2017.
Screenshot of wall bracket from Weinmann-Schanz, https://www.weinmann-schanz.de/de/de/Heizung/W%C3%A4rmeerzeuger-Speicher/Abgassysteme/Edelstahl-Abgassystem-Uni-DW-doppelwandig/Abstandsmontageplatten-f%C3%BCr-Wandkonsolen-sid134351.htm, accessed Feb. 6, 2020.
Screenshot of wall bracket from Weinmann-Schanz, http://web.archive.org/web/20170529161506/http://www.weinmann-schanz.de:80/de/de/Heizung/Neu-im-Sortiment/W%C3%A4rmeerzeuger Speicher/pid.1143.1160/agid.90421.90432.105379/ecm.ag/Abstandsmontageplatten-f%C3%BCr-Wandhalter.html, dated May 29, 2017.
Screenshot of wall bracket from Weinmann-Schanz, https://www.weinmann-schanz.de/de/de/Heizung/W%C3%A4rmeerzeuger-Speicher/Abgassysteme/Edelstahl-Abgassystem-Uni-DW-doppelwandig/Abstandsmontageplatten-f%C3%BCr-Wandhalter-sid182096.html, accessed Feb. 11, 2020.

*Coulter Ventures LLC* v *Bulldog Gear Limited*, UK High Court (Eng. & Wales), Claim No. HP-2019-000054, Defence and Counterclaim, dated Feb. 13, 2020.
*Coulter Ventures LLC* v *Bulldog Gear Limited*, High Court (Eng. & Wales), Claim No. HP-2019-000054, Defendant's Initial Disclosure List of Documents, dated Feb. 12, 2020.
*Coulter Ventures LLC* v *Bulldog Gear Limited*, High Court (Eng. & Wales), Claim No. HP-2019-000054, Amended Defence and Counterclaim, dated Apr. 23, 2020.
*Coulter Ventures LLC* v *Bulldog Gear Limited*, High Court (Eng. & Wales), Claim No. HP-2019-000054, Amended Defendant's Initial Disclosure List of Documents, dated Apr. 23, 2020.
*Coulter Ventures LLC* v *Bulldog Gear Limited*, High Court (Eng. & Wales), Claim No. HP-2019-000054, Re-Amended Defence and Counterclaim, dated Feb. 4, 2021.
*Coulter Ventures LLC* v *Bulldog Gear Limited*, High Court (Eng. & Wales), Claim No. HP-2019-000054, Claim Form and Particulars of Claim, dated Dec. 18, 2019.
*Coulter Ventures LLC* v *Bulldog Gear Limited*, High Court (Eng. & Wales), Claim No. HP-2019-000054, Claimant's Initial Disclosure List of Documents, dated Dec. 18, 2019.
*Coulter Ventures LLC* v *Bulldog Gear Limited*, High Court (Eng. & Wales), Claim No. HP-2019-000054, Reply and Defence to Counterclaim, dated Apr. 2, 2020.
GYMAX Adjustable Power Rack, available on Amazon.com, date first available Nov. 6, 2018, oldest customer review with photo Jan. 14, 2020, [site visited Feb. 18, 2023], URL: https://www.amazon.com/Gymax-Adjustable-Multi-Grip-Athletics-Fitness/dp/B07K8891 <http://www.amazon.com/Gymax-Adjustable-Multi-Grip-Athletics-Fitness/dp/B07K8891SC/>SC/ (Year: 2018).
HULKFIT Pro Series, available on Amazon.com, date first available Jul. 6, 2018, oldest customer review with photo Aug. 6, 2018, [ site visited Feb. 18, 2023], URL: https://www.amazon.com/HulkFit-Multi-Function-Adjustable-Attachment-1000-Pound/dp/ <http://www.amazon.com/HulkFit-Multi-Function-Adjustable-Attachment-1000-Pound/dp/> B07FBDVJ N5/ (Year: 2018).
Myrack Folding Power Rack, available on forceusa.com, oldest customer review Dec. 5, 2019, [site visited Feb. 18, 2023], URL: https://www.forceusa.com/collections/power-racks/products/myrack-folding-power-rack <http://www.forceusa.com/collections/power-racks/products/myrack-folding-power-rack>(Year: 2019).
Force USA MyRack, available on Youtube.com, date posted Nov. 25, 2019, [site visited Feb. 18, 2023], URL: https://www.youtube.com/ <http://www.youtube.com/> watch?v=S5QWb_fNiKg (Year: 2019).
Apr. 17, 2023—(EP) Article 94(3) Communication—App 18872756.4.
Sep. 12, 2024—(EP) Summons to attend oral proceedings (Examining Division)—App 18 872 756.4-1122.

\* cited by examiner

WEIGHTLIFTING RACK ASSEMBLY AND WALL MOUNT BRACKET FOR A WEIGHTLIFTING RACK ASSEMBLY

CROSS-REFERENCE TO RELATED APPLICATIONS

This application is a continuation of U.S. patent application Ser. No. 17/478,053, filed Sep. 17, 2021, which is a continuation of U.S. patent application Ser. No. 16/179,435, filed Nov. 2, 2018, issued as U.S. Pat. No. 11,123,595 on Sep. 21, 2021, which is a non-provisional of U.S. Provisional Application No. 62/695,424, filed Jul. 9, 2018, and which is also a continuation-in-part of U.S. patent application Ser. No. 16/043,805, filed Jul. 24, 2018, issued as U.S. Pat. No. 10,226,661 on Mar. 12, 2019, which is a continuation of U.S. patent application Ser. No. 15/801,638, filed Nov. 2, 2017, all of which prior applications are incorporated by reference herein.

BACKGROUND OF THE DISCLOSURE

1. Field of the Disclosure

The disclosure relates in general to a weightlifting equipment, and more particularly, to weightlifting racks and to structures for coupling weightlifting racks to a wall surface.

2. Background Art

A staple of any gym is a weightlifting rack assembly. The weightlifting rack assembly is used to support weights for many weightlifting exercises, such as, for example, squatting, pressing, among others. Additionally, weightlifting rack assemblies can be used for body weight exercises, including, for example, chin-ups, pull-ups and the like. Further, additional structures can be coupled thereto for storage, and for the performance of yet further exercises.

Increasingly, athletes are converting living spaces or, for example, garage spaces into home gyms. To increase versatility, a number of foldable or collapsible weightlifting rack assemblies have been developed. Typically, these foldable or collapsible assemblies are attached to a wall surface (such as a garage wall). They can be folded or collapsed to permit the use of the garage, to, for example, store a vehicle, when the assemblies are not in use. That is, they can be folded to be quite flush with the wall surface to which they are attached.

Problematically, however, to properly secure the assembly to the wall surface, it is often necessary to secure studs to the wall surface to span between the vertical wall studs. Problematically, the use of additional studs on the wall surface increases the footprint of the assembly, which is problematic when space is at a premium. Additionally, where it is desirable to couple the assembly to vertical studs directly, there is often a limitation as to the placement of the assembly. And, often, the wall studs are too narrow to be used to support the assembly.

SUMMARY OF THE DISCLOSURE

The disclosure is directed, in one aspect to a foldable weightlifting rack assembly mountable to a wall surface. The assembly includes an upper wall mount bracket, a lower wall mount bracket, a first side rack assembly and a second side rack assembly. The upper wall mount bracket has a central panel, a top wall mount panel and a bottom wall mount panel. The top wall mount panel and the bottom wall mount panel are substantially planar and offset from the central panel. The top wall mount panel and the bottom mount panel are positionable to overlie a wall surface, and including at least one slot extending therethrough configured to receive a fastener therethrough to, in turn, couple the upper wall mount bracket to the wall surface. The lower wall mount bracket has a central panel, a top wall mount panel and a bottom wall mount panel. The top wall mount panel and the bottom wall mount panel are substantially planar and offset from the central panel. The top wall mount panel and the bottom mount panel are positionable to overlie a wall surface, and including at least one slot extending therethrough configured to receive a fastener therethrough to, in turn, couple the upper wall mount bracket to the wall surface.

The first side rack assembly has a main bar with an upper end and a lower end. An upper cross bar is proximate the upper end, and a lower cross bar is proximate the lower end. The upper cross bar is pivotably coupled to the upper wall mount bracket proximate a first end thereof. The lower cross bar is pivotably coupled to the lower wall mount bracket proximate a first end thereof.

The second side rack assembly has a main bar with an upper end and a lower end, an upper cross bar proximate the upper end and a lower cross bar proximate the lower end. The upper cross bar is pivotably coupled to the upper wall mount bracket proximate a second end thereof. The lower cross bar is pivotably coupled to the lower wall mount bracket proximate a second end thereof.

In some configurations, the main bar of the first side rack is substantially parallel to the central panel of the upper wall mount and substantially parallel to the central panel of the of the lower wall mount.

In some configurations, the upper wall mount bracket further includes a first offset panel extending between the top wall mount panel and the central panel. The first offset panel is oblique to each of the top wall mount panel and the central panel.

In some configurations, the upper wall mount bracket further includes a second offset panel extending between the central panel and the lower wall mount panel. The second offset panel is oblique to each of the central panel and the bottom wall mount panel.

In some configurations, the central panel of the upper wall mount bracket further includes a first side mounting region proximate the first end and a second side mounting region proximate the second end. The assembly further includes a first side upper rack pivot bracket and a second side upper rack pivot bracket. The first side upper rack pivot bracket coupled to the first side mounting region. The first side upper rack pivot bracket comprises a base with an upper pivot wall and a lower pivot wall, with the upper cross bar of the first side rack being pivotably coupled to the upper and lower pivot walls of the first side upper rack pivot bracket. The second side upper rack pivot bracket is coupled to the second side mounting region. The second side upper rack pivot bracket comprises a base with an upper pivot wall and a lower pivot wall, with the upper cross bar of the second side rack being pivotably coupled to the upper and lower pivot walls of the second side upper rack pivot bracket.

In some configurations, the base of the first side upper rack pivot bracket is coupled to the central panel of the upper wall mount bracket by a fastener. The base of the second side upper rack pivot bracket is coupled to the central panel of the upper wall mount bracket by a second fastener. A portion of each of the first and second fastener extending between a plane defined by the central panel and a plane defined by the top and bottom wall mount panels.

In some configurations, the lower wall mount bracket further includes a first offset panel extending between the top wall mount panel and the central panel, the first offset panel being oblique to each of the top wall mount panel and the central panel.

In some configurations, the lower wall mount bracket further includes a second offset panel extending between the central panel and the lower wall mount panel. The second offset panel is oblique to each of the central panel and the bottom wall mount panel.

In some configurations, the central panel of the lower wall mount bracket further includes a first side mounting region proximate the first end and a second side mounting region proximate the second end. The assembly further comprises a first side lower rack pivot bracket and a second side lower rack pivot bracket. The first side lower rack pivot bracket is coupled to the first side mounting region. The first side lower rack pivot bracket comprises a base with an upper pivot wall and a lower pivot wall, with the upper cross bar of the first side rack being pivotably coupled to the upper and lower pivot walls of the first side upper rack pivot bracket. The second side lower rack pivot bracket is coupled to the second side mounting region. The second side lower rack pivot bracket comprises a base with an upper pivot wall and a lower pivot wall, with the upper cross bar of the second side rack being pivotably coupled to the upper and lower pivot walls of the second side upper rack pivot bracket.

In some configurations, the base of the first side lower rack pivot bracket is coupled to the central panel of the upper wall mount bracket by a fastener. The base of the second side lower rack pivot bracket is coupled to the central panel of the upper wall mount bracket by a second fastener. A portion of each of the first and second fastener extending between a plane defined by the central panel and a plane defined by the top and bottom wall mount panels.

In another aspect of the disclosure, the disclosure is directed to an upper rack mount assembly configured for use in association with a foldable weightlifting rack assembly. The upper rack mount assembly comprises a upper wall mounting bracket, a first side upper rack pivot bracket and a second side upper rack pivot bracket. The upper wall mount bracket haw a central panel, a top wall mount panel and a bottom wall mount panel. The top wall mount panel and the bottom wall mount panel are substantially planar and offset from the central panel. The top wall mount panel and the bottom mount panel are positionable to overlie a wall surface, and include at least one slot extending therethrough configured to receive a fastener therethrough to, in turn, couple the upper wall mount bracket to the wall surface. The central panel has a first side mounting region proximate the first end and a second side mounting region proximate the second end.

The first side upper rack pivot bracket is coupled to the first side mounting region. The first side upper rack pivot bracket comprises a base with an upper pivot wall and a lower pivot wall, with the upper cross bar of the first side rack being pivotably coupled to the upper and lower pivot walls of the first side upper rack pivot bracket. The second side upper rack pivot bracket is coupled to the second side mounting region. The second side upper rack pivot bracket comprises a base with an upper pivot wall and a lower pivot wall, with the upper cross bar of the second side rack being pivotably coupled to the upper and lower pivot walls of the second side upper rack pivot bracket.

In some configurations, the base of the first side upper rack pivot bracket is coupled to the central panel of the upper wall mount bracket by a fastener. The base of the second side upper rack pivot bracket is coupled to the central panel of the upper wall mount bracket by a second fastener. A portion of each of the first and second fastener extend between a plane defined by the central panel and a plane defined by the top and bottom wall mount panels.

In some configurations, the plane defined by the central panel is substantially parallel with the plane defined by the top and bottom wall mount panels.

In some configurations, the top and bottom wall mount panels each have a plurality of slots between the first and second end thereof.

In some configurations, the upper wall mount bracket further includes a second offset panel extending between the central panel and the lower wall mount panel. The second offset panel being oblique to each of the central panel and the bottom wall mount panel.

In some configurations, the assembly further includes a first side handle opening positioned proximate the first side mounting region and a second side handle opening positioned proximate the second side mounting region.

In some configurations, the central panel, the top wall mount panel, the bottom wall mount panel, the first offset panel and the second offset panel each define a thickness that is substantially equal.

In some configurations, the first side upper rack pivot bracket and the second side upper rack pivot bracket are substantially identical.

In yet another aspect of the disclosure, the disclosure is directed to an upper wall mount bracket configured for use with a foldable weightlifting rack assembly. The upper wall mount bracket comprising a central panel, a top wall mount panel and a bottom wall mount panel. The top wall mount panel and the bottom wall mount panel being substantially planar and offset from the central panel. The top wall mount panel and the bottom mount panel being positionable to overlie a wall surface, and including at least one slot extending therethrough configured to receive a fastener therethrough to, in turn, couple the upper wall mount bracket to the wall surface. The central panel having a first side mounting region proximate the first end and a second side mounting region proximate the second end.

In some configurations, the upper wall mount bracket further includes a first offset panel extending between the top wall mount panel and the central panel. The first offset panel is oblique to each of the top wall mount panel and the central panel. Additionally, the upper wall mount bracket includes a second offset panel extending between the central panel and the lower wall mount panel. The second offset panel is oblique to each of the central panel and the bottom wall mount panel.

Other aspects of the disclosure relate to a weightlifting assembly that includes a wall mount bracket configured for mounting to a wall surface and a weightlifting rack assembly connected to the wall mount bracket. The weightlifting rack assembly may have various configurations. In some configurations, the wall mount bracket is elongated along a lateral width thereof and has a first mounting region and a second mounting region spaced from each other along the lateral width the wall mount bracket.

In some aspects, the weightlifting rack assembly includes a first side mount bracket having a first base connected to the first mounting region of the wall mount bracket, a first support arm extending outward from the first base, and a first receiver connected to the first support arm, a second side mount bracket having a second base connected to the second mounting region of the wall mount bracket, a second support arm extending outward from the second base, and a second receiver connected to the second support arm, and a bar connected to the first side mount bracket and the second side mount bracket and extending between the first and second side mount brackets in a direction along the lateral width of the wall mount bracket. In this configuration, the bar is received in the first and second receivers to connect the bar to the first and second side mount brackets, and the wall mount bracket is configured to suspend the weightlifting rack assembly above a ground surface, such that the weightlifting rack assembly does not engage the ground surface. The weightlifting rack assembly in this configuration may be suited for use as a pull-up bar.

According to one aspect, the first support arm extends outwardly and downwardly from the first base, and the second support arm extends outwardly and downwardly from the second base. In one aspect, the first support arm has a first distal end that extends below a lowermost point of the wall mount bracket, and the second support arm has a second distal end that extends below the lowermost point of the wall mount bracket. In this configuration, the first receiver may be positioned on the first distal end of the first support arm, and the second receiver may be positioned on the second distal end of the second support arm. In a further aspect, the first receiver is positioned on an inner surface of the first support arm that faces the second support arm and has an opening facing the second support arm, and the second receiver is positioned on an inner surface of the second support arm that faces the first support arm and has an opening facing the first support arm.

According to another aspect, the bar has a circular shape and the first and second receivers have circular openings, and wherein the bar has a first end received in the first receiver and a second end received in the second receiver.

According to a further aspect, the first side mount bracket further includes a first brace extending rearward from the first support arm and engaging the wall mount bracket to support the first support arm, and the second side mount bracket further includes a second brace extending rearward from the second support arm and engaging the wall mount bracket to support the second support arm. In one aspect, the first brace is fixedly connected to the first support arm and has a first free end abutting the wall mount bracket, and the second brace is fixedly connected to the second support arm and has a second free end abutting the wall mount bracket. In another aspect, the first base, the first support arm, and the first brace are formed of a first single, integral piece, and wherein the second base, the second support arm, and the second brace are formed of a second single, integral piece.

According to yet another aspect, the first base and the first support arm are formed of a first single, integral piece having a first bend forming a first juncture between the first base and the first support arm, and wherein the second base and the second support arm are formed of a second single, integral piece having a second bend forming a second juncture between the second base and the second support arm.

In other aspects, the weightlifting rack assembly includes a first side mount bracket having a first base connected to the wall mount bracket at a first location and a first support arm extending outward from the first base and a second side mount bracket having a second base connected to the wall mount bracket at a second location laterally spaced from the first location and a second support arm extending outward from the second base, and a bar connected to the first support arm of the first side mount bracket and connected to the second support arm of the second side mount bracket and extending between the first and second side mount brackets in the lateral direction. The first base and the first support arm are formed of a first single, integral piece having a first bend forming a first juncture between the first base and the first support arm, and the second base and the second support arm are formed of a second single, integral piece having a second bend forming a second juncture between the second base and the second support arm. The wall mount bracket is configured to suspend the weightlifting rack assembly above a ground surface, such that the weightlifting rack assembly does not engage the ground surface. The weightlifting rack assembly in this configuration may be suited for use as a pull-up bar.

According to one aspect, the first side mount bracket further includes a first receiver connected to the first support arm, and the second side mount bracket further includes a second receiver connected to the second support arm, and the bar is received in the first and second receivers to connect the bar to the first and second side mount brackets. In one configuration, the first receiver and the second receiver are formed by separate pieces connected to the first and second support arms, respectively.

According to another aspect, the first side mount bracket further includes a first brace extending rearward from the first support arm and engaging the wall mount bracket to support the first support arm, and the second side mount bracket further includes a second brace extending rearward from the second support arm and engaging the wall mount bracket to support the second support arm. In one aspect, the first brace is fixedly connected to the first support arm and has a first free end abutting the wall mount bracket, and the second brace is fixedly connected to the second support arm and has a second free end abutting the wall mount bracket. In another aspect, the first brace is further formed as part of the first single, integral piece, and wherein the second brace is further formed as part of the second single, integral piece.

According to a further aspect, the first support arm extends outwardly and downwardly from the first base, and the second support arm extends outwardly and downwardly from the second base. In one aspect, the first support arm has a first distal end that extends below a lowermost point of the wall mount bracket, and the second support arm has a second distal end that extends below the lowermost point of the wall mount bracket.

In further aspects, the weightlifting rack assembly is a fixed weightlifting rack assembly that includes a first side rack assembly, a second side rack assembly, and a cross-member connected to the first side rack assembly and the second side rack assembly and extending along the lateral width of the wall mount bracket between the first and second side rack assemblies. The first side rack assembly includes a first side mount bracket connected to the first mounting region of the wall mount bracket, a first beam connected to the first side mount bracket and extending outward from the first side mount bracket in a first direction configured to be perpendicular to the wall surface, and a first vertical frame member connected to the first beam and configured to engage a ground surface. The second side rack assembly includes a second side mount bracket connected to the second mounting region of the central panel, a second beam connected to the second side mount bracket and extending outward from the second side mount bracket in the first direction, and a second vertical frame member connected to the second beam and configured to engage the ground surface, such that the first and second vertical frame members are spaced outwardly from the wall mount bracket.

According to one aspect, the first side rack assembly further includes a third beam connected to the first side mount bracket and extending outward from the first side mount bracket in the first direction, where the third beam is connected to the first vertical frame member and located below the first beam, and the second side rack assembly further includes a fourth beam connected to the second side mount bracket and extending outward from the second side mount bracket in the first direction, where the fourth beam is connected to the second vertical frame member and located below the second beam. In one aspect, the first side mount bracket has a first opening and a third opening spaced vertically from each other and receiving ends of the first and third beams, respectively, and the second side mount bracket has a second opening and a fourth opening spaced vertically from each other and receiving ends of the second and fourth beams, respectively. In another aspect, the first side rack assembly further has a first vertical support extending vertically between the first and third beams at a location between the wall mount bracket and the first vertical frame member, and the second side rack assembly further has a second vertical support extending vertically between the second and fourth beams at a location between the wall mount bracket and the second vertical frame member. In a further aspect, no additional supporting structure is connected to the first vertical frame member or the second vertical frame member and configured to be positioned between the first and second vertical frame members and the wall surface.

According to another aspect, the first side mount bracket is vertically elongated and is connected to the wall mount bracket by a plurality of first fasteners aligned vertically with each other along the first side mount bracket, and the second side mount bracket is vertically elongated and is connected to the wall mount bracket by a plurality of second fasteners aligned vertically with each other along the second side mount bracket. In one aspect, the first side rack assembly further includes a third beam connected to the first side mount bracket and extending outward from the first side mount bracket in the first direction to connect to the first vertical frame member, and the second side rack assembly further includes a fourth beam connected to the second side mount bracket and extending outward from the second side mount bracket in the first direction to connect to the second vertical frame member. In this configuration, the third beam is located below the first beam, such that the first beam, the third beam, and the first plurality of fasteners are all aligned vertically with each other along the first side mount bracket, and the fourth beam is located below the second beam, such that the second beam, the fourth beam, and the second plurality of fasteners are all aligned vertically with each other along the second side mount bracket.

In still further aspects, the weightlifting rack assembly is a fixed weightlifting rack assembly that includes a first side rack assembly, a second side rack assembly, and a crossmember connected to the first side rack assembly and the second side rack assembly and extending laterally between the first and second side rack assemblies. The first side rack assembly includes a first side mount bracket connected to the wall mount bracket, a first beam and a third beam each having a proximal end connected to the first side mount bracket and extending outward from the first side mount bracket in the first direction, where the third beam is located below the first beam and extends parallel to the first beam, and a first vertical frame member connected to distal ends of the first beam and the third beam and configured to engage a ground surface, where the first vertical frame member is spaced outwardly from the wall mount bracket. The second side rack assembly includes a second side mount bracket connected to the wall mount bracket, a second beam and a fourth beam each having a proximal end connected to the second side mount bracket and extending outward from the second side mount bracket in the first direction, where the fourth beam is located below the second beam and extends parallel to the second beam, and a second vertical frame member connected to distal ends of the second beam and the fourth beam and configured to engage the ground surface, where the second vertical frame member is spaced outwardly from the wall mount bracket.

According to one aspect, the first side mount bracket has a first opening and a third opening spaced vertically from each other and receiving the proximal ends of the first and third beams, respectively, and the second side mount bracket has a second opening and a fourth opening spaced vertically from each other and receiving the proximal ends of the second and fourth beams, respectively.

According to another aspect, no additional supporting structure is connected to the first vertical frame member or the second vertical frame member and configured to be positioned between the first and second vertical frame members and the wall surface.

According to a further aspect, the first side mount bracket is vertically elongated and is connected to the wall mount bracket by a plurality of first fasteners aligned vertically with each other along the first side mount bracket, and the second side mount bracket is vertically elongated and is connected to the wall mount bracket by a plurality of second fasteners aligned vertically with each other along the second side mount bracket. In one aspect, the first plurality of fasteners are all aligned vertically with each other along the first side mount bracket, and wherein the second beam, the fourth beam, and the second plurality of fasteners are all aligned vertically with each other along the second side mount bracket.

Other features and advantages of the disclosure will be apparent from the following description taken in conjunction with the attached drawings.

BRIEF DESCRIPTION OF THE DRAWINGS

The disclosure will now be described with reference to the drawings wherein.

DETAILED DESCRIPTION OF THE DISCLOSURE

Figure 1:
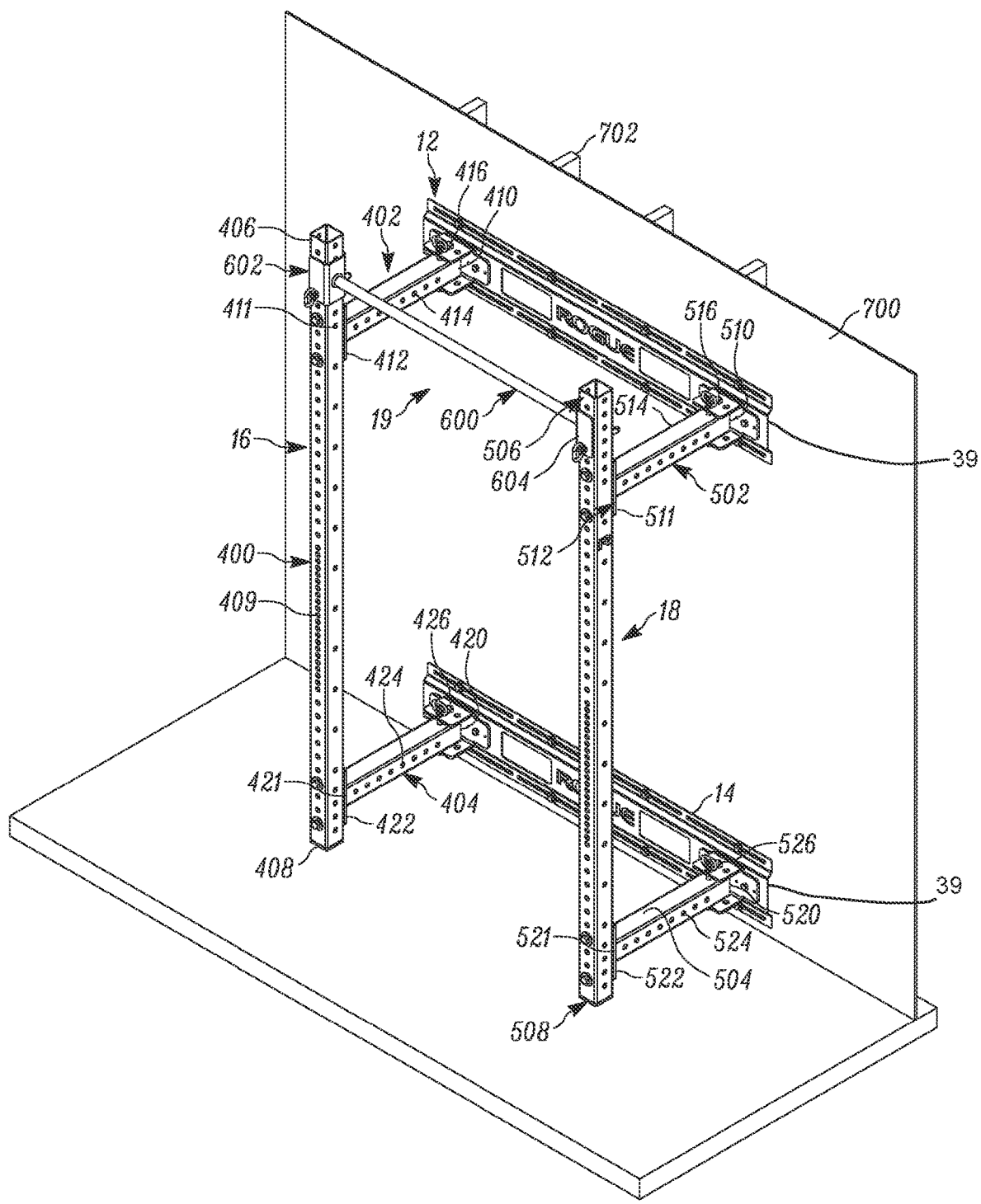
FIG. 1 of the drawings is a perspective view of one embodiment of a weightlifting rack assembly according to aspects of the present disclosure in the form of a foldable weightlifting rack assembly.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
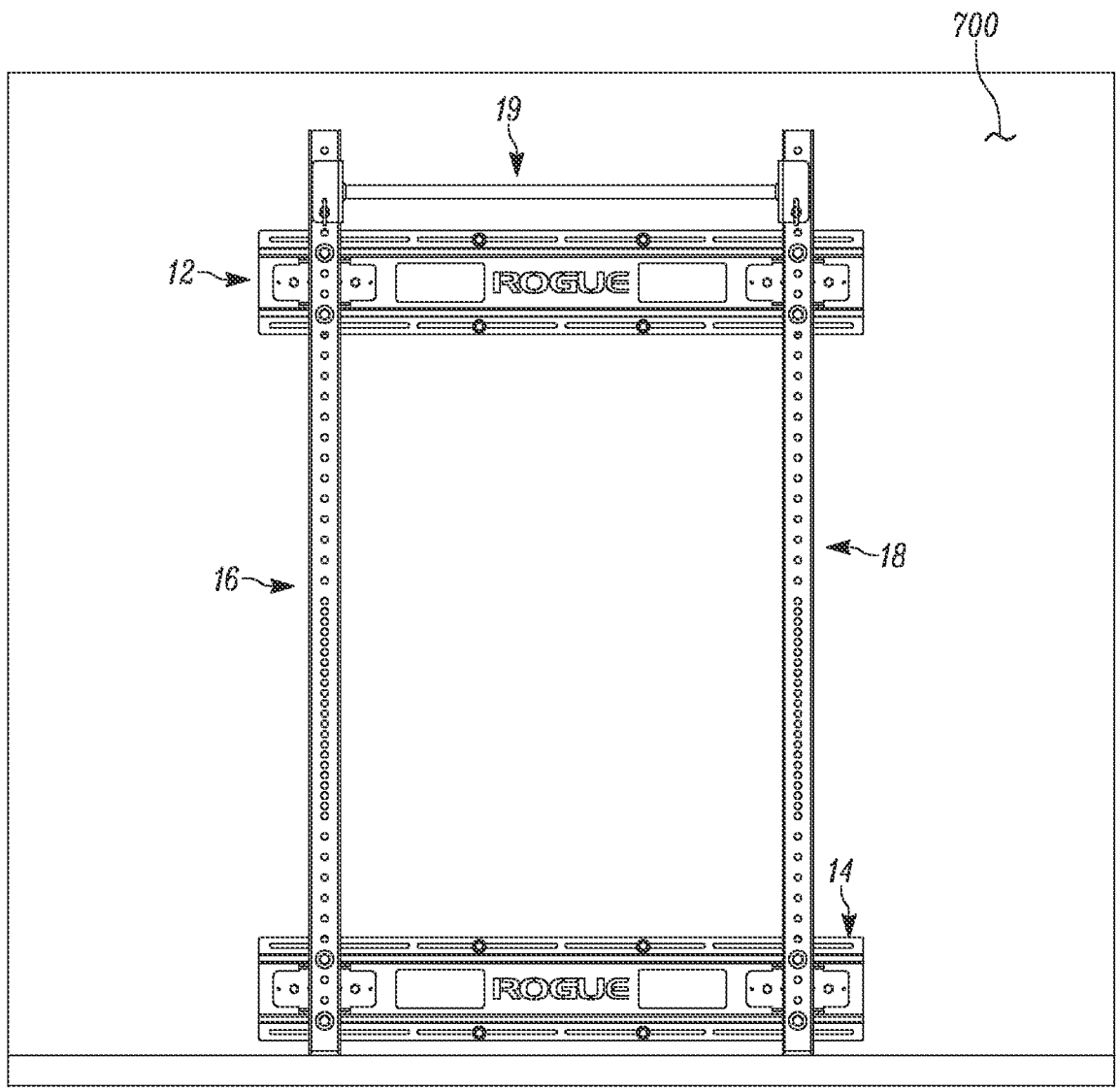
FIG. 2 of the drawings is a front elevation view of the weightlifting rack assembly of FIG. 1.
Figure 3:
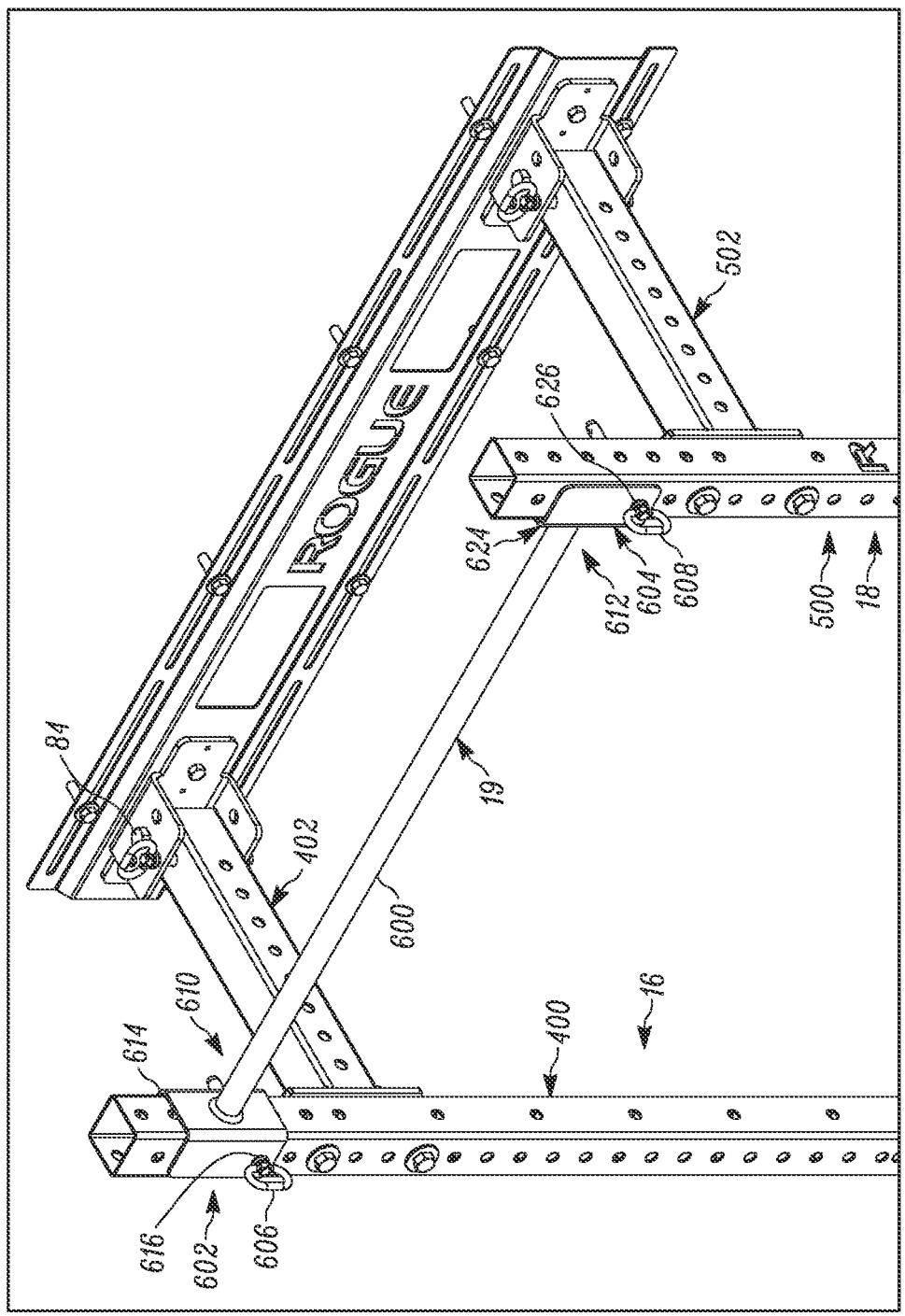
FIG. 3 of the drawings is a partial perspective view of the weightlifting rack assembly of FIG. 1, showing, in particular, an upper rack mount assembly.
Figure 10:
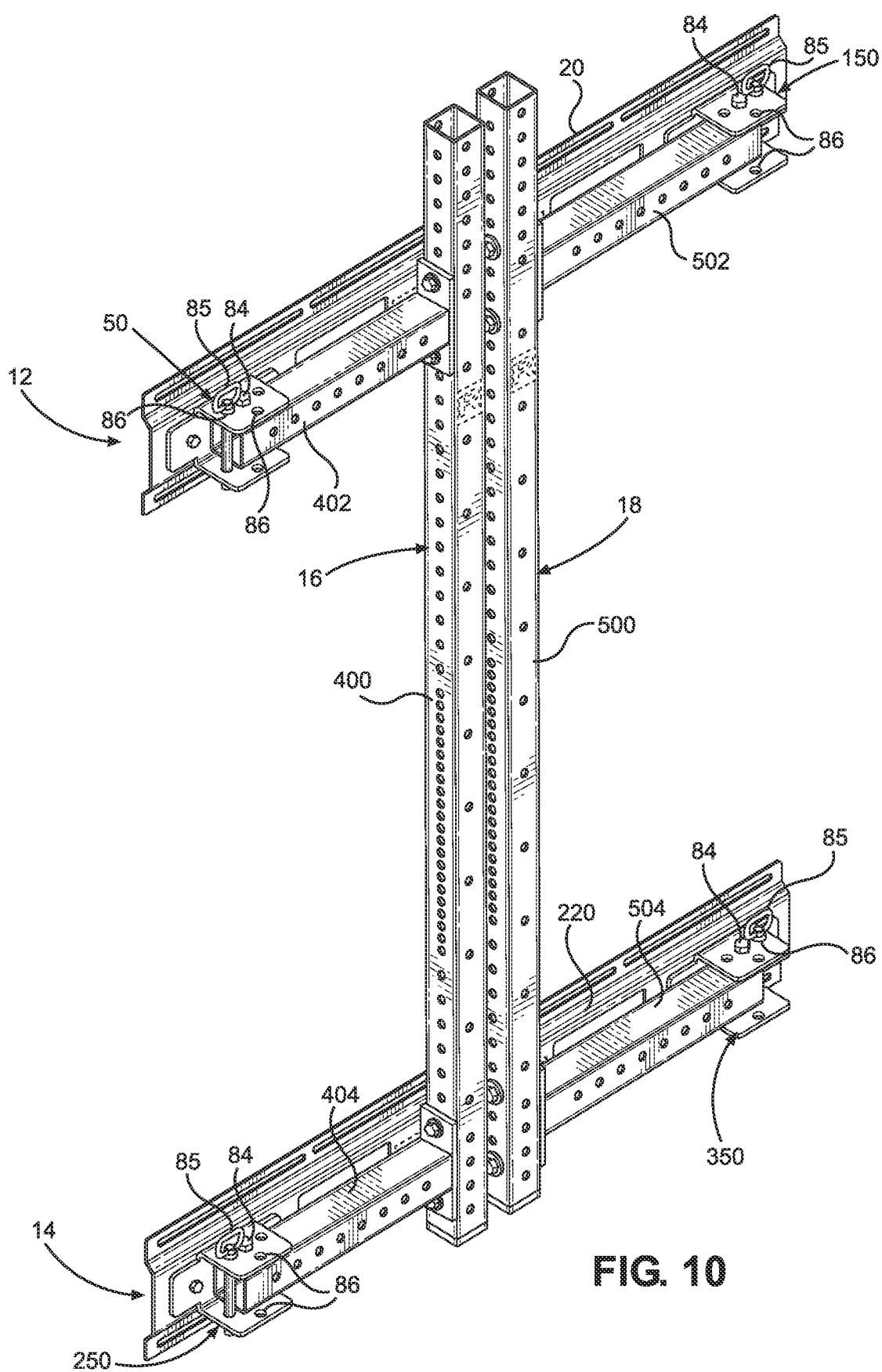
FIG. 10 of the drawings is a perspective view of the weightlifting rack assembly of FIG. 1 in a folded position.
Figure 11:
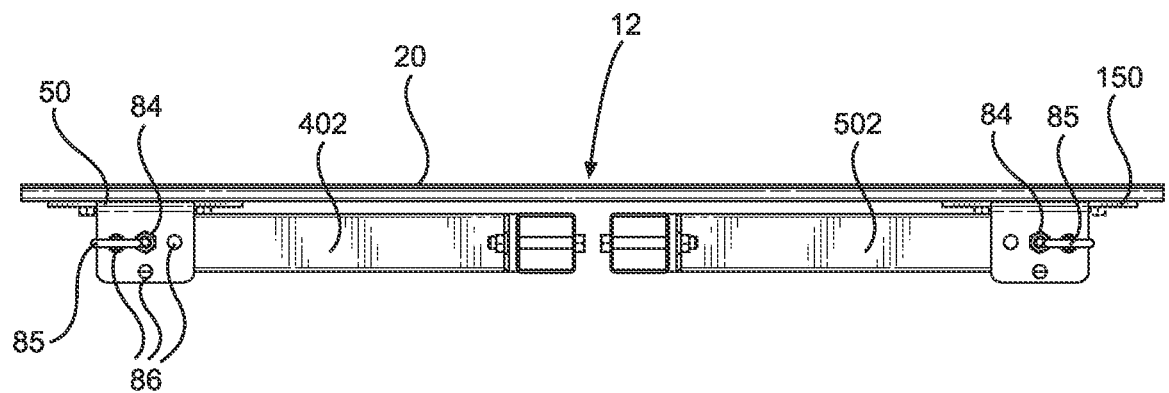
FIG. 11 of the drawings is a top view of the weightlifting rack assembly of FIG. 10.

Referring now to the drawings and in particular to FIGS. 1 and 2, a foldable weightlifting rack assembly 10 is shown configured for mounting on a wall surface 700. The weightlifting rack 10 comprises an upper rack mount assembly 12, lower rack mount assembly 14, first side rack assembly 16, second side rack assembly 18, and cross bar assembly 19. With reference to FIGS. 1 and 3, the cross bar assembly 19 couples the first side rack assembly 16 and second side rack assembly 18. Removal of the cross bar assembly 19, as well as the pin members that are extended therethrough, allows rotational movement of the first side rack assembly 16 and second side rack assembly 18 to direct the first and second side rack assemblies between a folded and an articulated configuration. The folded configuration is illustrated in FIGS. 10-11, while the articulated configuration is illustrated in FIGS. 1-3.

Shown in FIGS. 4 through 7, the upper rack mount assembly 12 comprises upper wall mount bracket 20, first side upper rack pivot bracket 50, second side upper rack pivot bracket 150, wall mount fasteners 80, pivot bracket mount fasteners 82, and pivot pins 84. The upper wall mount bracket 20 comprises a first side end 22, second side end 24, outer surface 26, inner surface 28, central panel 30, top wall mount panel 40, bottom wall mount panel 44, first offset panels 48, and second offset panels 49. Further, the top wall mount panel 40 and bottom wall mount panel 44 define a plurality of slots 42, 46 extending substantially through the outer surface 26 and inner surface 28. The central panel 30 further comprises first side mounting region 32, second side mounting region 34, first side handle openings 36 and second side handle openings 38, with the first side mounting region 32 and second side mounting region 34 both defining a plurality of openings 33, 35 extending substantially through the outer surface 26 and inner surface 28. It is contemplated that the upper wall mount bracket (as well as the lower wall mount bracket) are formed from a single material, wherein the various panels have substantially the same thickness therethrough. As used herein with respect to all embodiments, the "vertical" direction refers to the direction that is parallel to the wall surface 700 and perpendicular to the ground, i.e., in the direction of spacing between the upper and lower rack mount assemblies 12, 14; the "horizontal" direction refers to the direction that is parallel to the wall surface 700 and parallel to the ground, i.e., in the direction of spacing between the first and second ends 24 of the upper wall mount bracket 20; and the "longitudinal" direction refers to the direction that is perpendicular to the wall surface 700 and parallel to the ground, i.e., in the direction of spacing between the outer and inner surfaces 26, 28 of the upper wall mount bracket 20.

The first end 22 and second end 24 are substantially opposite one another with the outer surface 26 and inner surface 28 extending substantially between each end. The outer surface 26 and inner surface are substantially opposite one another in reference to the upper wall mount bracket 20 with the outer surface 26 facing substantially opposite the inner surface 24. The first side mounting region 32 of the central panel is proximate to the first side end 22 and the second side mounting region 34 of the central panel 30 is proximate to the second side end 24. Openings 33 of the first side mounting region 32, in the configuration shown, are separated by a general amount of material along the central panel 30, being proximate to the first side end 22 generally more than the first side handle opening 36. Openings 35 of the second side mounting region 34, in the configuration shown, are separated by a general amount of material along the central panel 30, being proximate to the second side end 24 generally more than the second side handle opening 38. The first side handle opening 36 and the second side handle opening 38 extend generally through the outer surface 26 and inner surface 28 and are proximate to the central axis of the upper rack mount assembly 12. The first and second side handle openings 36, 38 in the embodiment of FIGS. 1-7 are located entirely within the central panel 30, between the first and second side mounting regions 32, 34, and between the first and second offset panels 48, 49. It is to be understood the size of the openings 33, 35, the first side handle opening 36, and second side handle opening 38 as well as the distance of separation between them along the upper wall mount bracket 20 in the exemplary figure are variable and subject to change in contemplated configurations of the design.

The central panel 30, top wall mount panel 40, and bottom wall mount panel 44 extend from the first side end 22 to the second side end 24 and are parallel in reference to one another. In the configuration shown, the top wall mount panel 40 and bottom wall mount panel 44 are substantially coplanar in reference to one another such that a suitably flat surface mated to the inner surface 28 of the top wall mount panel 40 will be substantially mated to the inner surface 28 of the bottom wall mount panel 44. In the vertical plane, the central panel is substantially between the top wall mount panel 40 and bottom wall mount panel 44, with the bottom wall mount panel substantially beneath the central panel 30 and top wall mount panel 40. In the configuration shown, the plurality of slots 42 defined by the top wall mount panel 40 and the plurality of the slots 46 defined by the bottom wall mount panel 44 extend from first end 22 towards second end 24. It is to be understood the number of slots 42, 46 and the sizing in reference to the horizontal and vertical distance are variable and subject to change in contemplated configurations of the design.

The central panel 30 and top wall mount panel 40 are coupled through the first offset panel 48. In the configuration shown, the first offset panel 48 is oblique to each of the parallel surface of the central panel 30 and top wall mount panel 40. It is to be understood the angle of offset of the first offset panel 48 may be of any suitable amount such that the central panel 30 and top wall mount panel 40 are separated with reference to the horizontal plane. The central panel 30 and bottom wall mount panel 44 are coupled through the second offset panel 49. In the configuration shown, the second offset panel 49 is oblique to each of the central panel 30 and bottom wall mount panel 44. The first and second offset panels 48, 49, as well as the junctures between the offset panels 48, 49 and the central panel 30 and the top and bottom wall mount panels 40, 44, extend the entire width of the upper wall mount bracket 20, i.e., between the first end 22 and the second end 24. It is to be understood in contemplated configurations of the design, the angle of offset of the second offset panel 49 may be of any suitable amount such that the central panel 30 and bottom wall mount panel 44 are separated with reference to the horizontal plane, including the central panel 30 being moved in such a way that the top wall mount panel 40 and bottom wall mount panel 44 are switched in reference to the horizontal plane. The offset panels 48, 49 create an offset between the central panel 30 and the top and bottom wall mount panels 40, 44, which defines a space 39 between the central panel 30 and the wall surface 700. This space 39 extends the entire distance between the ends 22, 24 in one embodiment.

Figure 29:
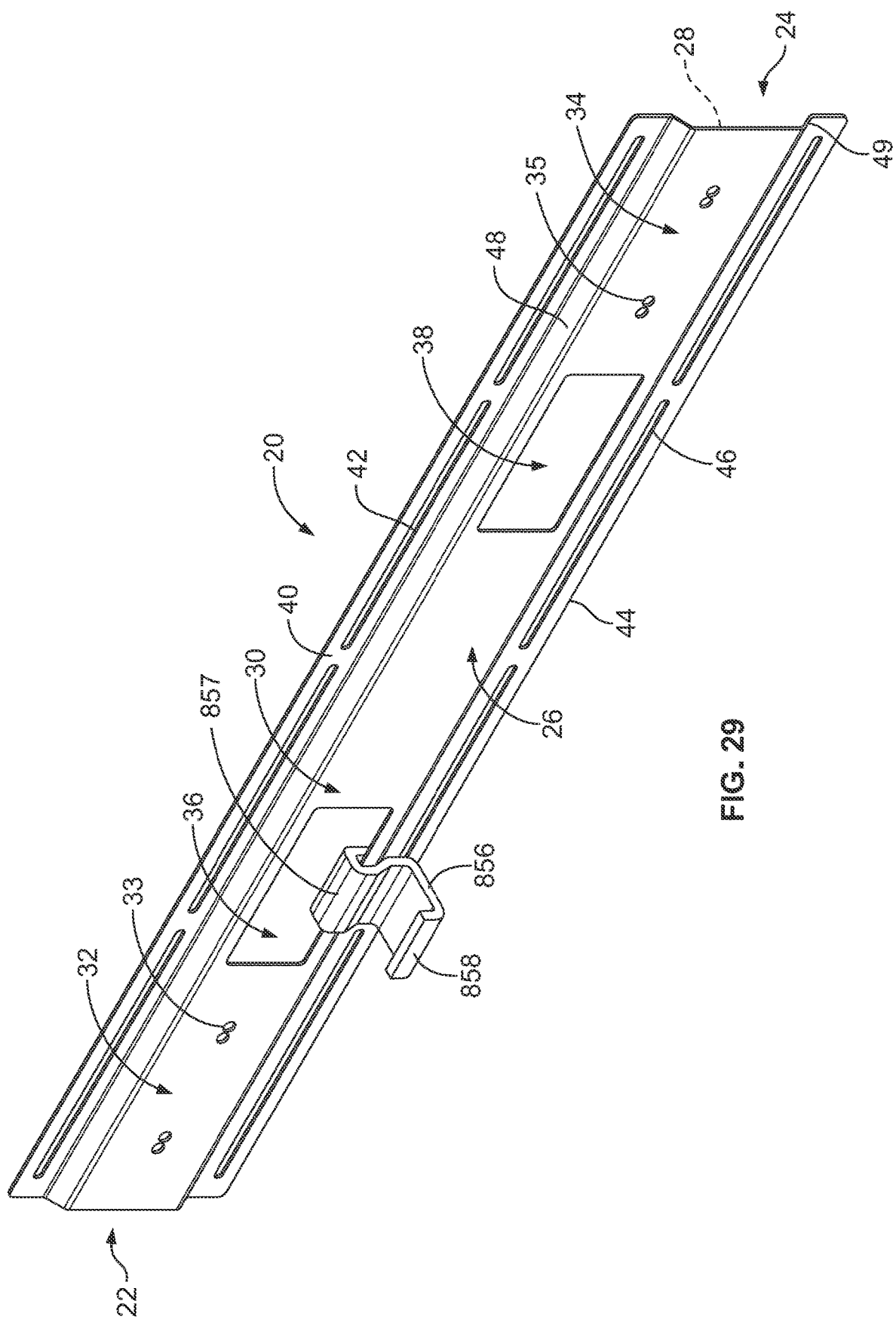
FIG. 29 of the drawings is a perspective view of the upper wall mount bracket of FIG. 5 with an accessory according to aspects of the present disclosure, in the form of a hook connected to the upper wall mount bracket.

The side handle openings 36, 38 of the wall mount bracket 20 of FIGS. 1-7 may also be used for mounting of one or more accessories. Such accessories may be mounted using various mechanical engagement structures for engaging one or more edges of the side handle openings 36, 38, such as hooks, clamps, jaws, flanges, tabs, or other such structures, which may be fixed or moveable (e.g., lockable and/or releasable). FIG. 29 illustrates one example of an accessory in the form of a hook accessory 856, which includes a mounting hook 857 at one end configured to receive a portion of the edge of the side handle opening 36 for mounting the hook accessory 856 and a support hook 858 at the other end configured to support another accessory or device. The body of the hook accessory 856 in this embodiment is contoured similarly to the surface of the wall mount bracket 20 and generally extends in surface-to-surface contact with portions of the central panel 30, the second offset panel 49, and the bottom wall mount panel 44 located below the side handle opening 36. The mounting structure in FIG. 29 (i.e., mounting hook 857) may be used with other accessories as well. It is understood that such accessories may be used similarly in connection with other embodiments disclosed herein.

Figure 4:
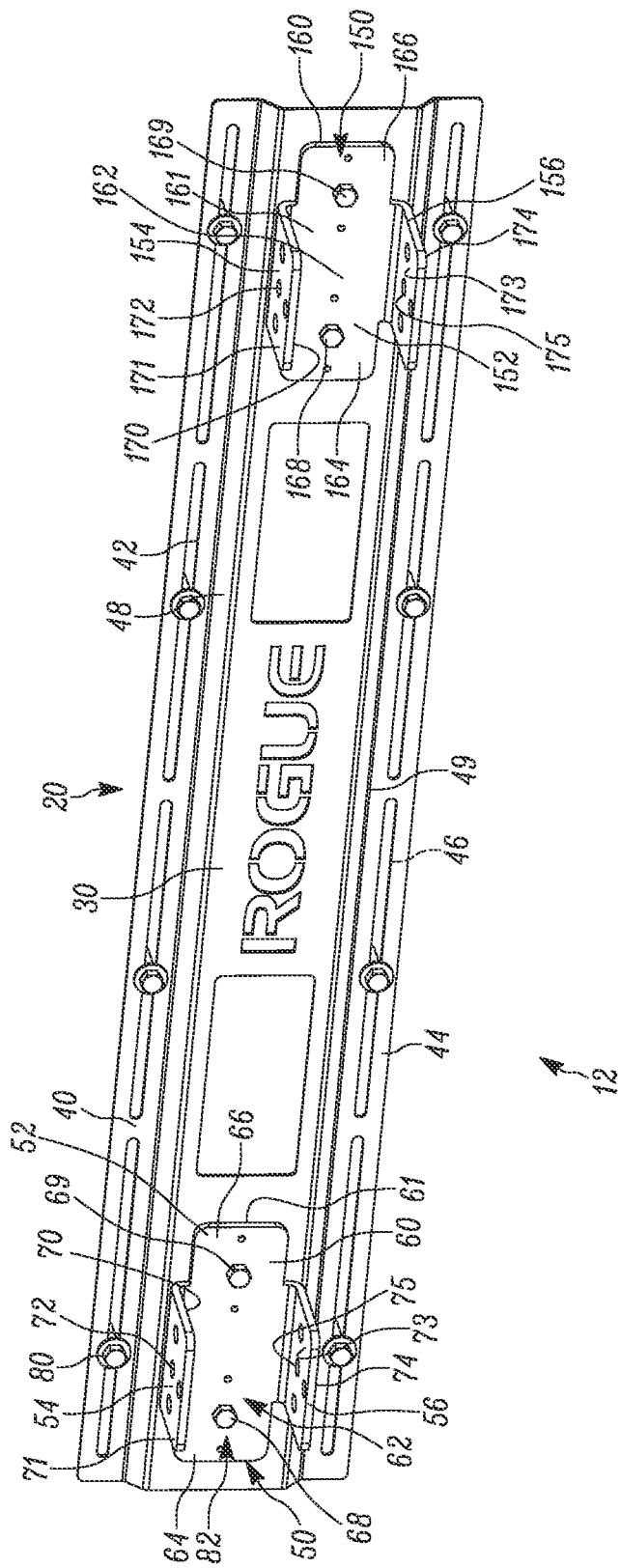
FIG. 4 of the drawings is a perspective view of the upper rack mount assembly of FIG. 3.

The first side upper rack pivot bracket 50, shown in FIG. 4, comprises base 52, upper pivot wall 54, and lower pivot wall 56. The base 52 comprise outer surface 60, inner surface 61, central region 62, first side wing region 64, second side wing region 66, first side mounting opening 68, and second side mounting opening 69. The upper pivot wall 54 comprise inner surface 70, outer surface 71, and pivot opening 72. The lower pivot wall 56 comprise inner surface 73, outer surface 74, and pivot opening 75. It is to be understood the base 52 connects the upper pivot wall 54 and lower pivot wall 56 through extension of the central region 62. In the exemplary figure, the upper pivot wall 54 and lower pivot wall 56 are generally parallel in reference to one another, while other configurations are contemplated.

The inner surface 61 of the base 52 is generally mated to the outer surface 26 of the upper wall mount bracket 20 with the outer surface 60 generally opposite the inner surface 61. Generally, the base 52 extends from first side wing region 64, through central region 62, and to the second side wing region 66. The first side wing region 64 defines opening first side mounting opening 68 and the second side wing region 66 defines opening second side mounting opening 69. It is to be understood the wing regions of the base 52 are connected to the central region 62 of the base. The mounting openings 68, 69 are coaxially aligned with the openings 33 of the first side mounting region 32 of the upper wall mount bracket 20. It is to be understood any alteration of the position of the openings 33 of the upper wall mount bracket is to be substantially similar to alterations in the positions of the openings 68, 69. Further, the mounting openings 68, 69 in the configuration shown are of a variable size that is subject to change in contemplated configurations.

The inner surface 70 and outer surface 71 of the upper pivot wall 54 are generally opposite one another with pivot opening 72 defined by the upper pivot wall 54 and extending through the inner surface 70 and outer surface 71. The inner surface 73 and outer surface 74 of the lower pivot wall 56 are generally opposite one another with pivot opening 75 defined by the lower pivot wall 56 and extending through the inner surface 73 and outer surface 74. The inner surface 70 of upper pivot wall 54 and inner surface 73 of the lower pivot wall 56 generally face one another in such a way the corresponding outer surfaces 71, 74 face opposite in reference to one another. The pivot openings 72, 75 of the upper pivot wall 54 and lower pivot wall 56 are generally coaxial in reference to one another. It is to be understood the sizing of the openings 72, 75 in the exemplary figure is variable and subject to change in contemplated configurations of the design.

The second side upper rack pivot bracket 150, shown in FIG. 4, comprise base 152, upper pivot wall 154, and lower pivot wall 156. The base 152 comprise outer surface 160, inner surface 161, central region 162, first side wing region 164, second side wing region 166, first side mounting opening 168, and second side mounting opening 169. The upper pivot wall 154 comprise inner surface 170, outer surface 171, and pivot opening 172. The lower pivot wall 156 comprise inner surface 173, outer surface 174, and pivot opening 175. It is to be understood the base 152 connects the upper pivot wall 154 and lower pivot wall 156 through extension of the central region 162. In the exemplary figure, the upper pivot wall 154 and lower pivot wall 156 are generally parallel in reference to one another, but is subject to change in contemplated configurations and future iterations of the design.

The inner surface 161 of the base 152 is mated to the outer surface 126 of the upper wall mount bracket 20 with the outer surface 160 generally opposite the inner surface 161. Generally, the base 152 extends from first side wing region 164, through central region 162, and to the second side wing region 166. The first side wing region 164 defines opening first side mounting opening 168 and the second side wing region 166 defines opening second side mounting opening 169. It is to be understood the wing regions of the base 152 are connected to the central region 162 of the base. The mounting openings 168, 169 are coaxially aligned with the openings 35 of the second side mounting region 34 of the upper wall mount bracket 20. It is to be understood any alteration of the position of the openings 133 of the upper wall mount bracket is to be substantially similar to alterations in the positions of the openings 168, 169. Further, the mounting openings 168, 169 in the exemplary figure are of a variable size that is subject to change in contemplated configurations.

The inner surface 170 and outer surface 171 of the upper pivot wall 154 are generally opposite one another with pivot opening 172 defined by the upper pivot wall 154 and extending through the inner surface 170 and outer surface 171. The inner surface 173 and outer surface 174 of the lower pivot wall 156 are opposite one another with pivot opening 175 defined by the lower pivot wall 156 and extending through the inner surface 173 and outer surface 174. The inner surface 170 of upper pivot wall 154 and inner surface 173 of the lower pivot wall 156 generally face one another in such a way the corresponding outer surfaces 171, 174 face opposite in reference to one another. The pivot openings 172, 175 of the upper pivot wall 154 and lower pivot wall 156 are generally coaxial in reference to one another. It is to be understood the sizing of the openings 172, 175 in the exemplary figure is variable and subject to change in contemplated configurations of the design.

Shown in FIGS. 1 through 4, mounting and assembly of the upper rock mount assembly uses wall mount fasteners 80, pivot bracket mount fasteners 82, and pivot pins 84. The upper wall mount bracket 20, first side upper rack pivot bracket 50, and second side upper rack pivot bracket 150 in the exemplary figures are coupled together through pivot bracket mount fasteners 82. The pivot bracket mount fasteners 82 fit substantially and concentrically with the mounting openings 68, 69, 168, 169 of the upper rack pivot brackets and the openings 33, 35 of the upper wall mount bracket. The first side upper rack pivot bracket 50 and the second side upper rack pivot bracket 150 are generally aligned in reference to the vertical plan and separated along the horizontal plane by the upper wall mount bracket 20.

In the configuration shown, the first side upper rack pivot bracket 50 and the second side upper rack pivot bracket 150 mate to the upper wall mount bracket 20 by the pivot bracket mount fasteners. In the exemplary figure, the upper wall mount bracket 20 is generally coupled to the wall surface 700 by wall mount fasteners 80. The wall mount fasteners 80 couple the upper wall mount bracket 20 to wall surface 70 through slots 42, 46 of the top wall mount panel 40 and bottom wall mount panel 44 to the studs 702 of the wall surface 700. It is to be understood the wall mount fasteners 80 are aligned in such a way to provide a substantial enough force to limit vertical and horizontal movement of the upper wall mount bracket 20 while coupled to the wall surface 700, additionally resisting external forces. Pivot pins 84 couple to the first side upper rack pivot bracket 50 and second side upper rack pivot bracket 150 through the pivot openings 72, 75, 172, and 175 to pivotably connect the first side rack assembly 16 and the second side rack assembly 18 to the first side upper rack pivot bracket 50 and the second side upper rack pivot bracket 150, respectively. The pivot pins 84 are generally concentric to the openings and fit in such a way that rotational movement is not generally limited. The pivot pins 84 are vertically oriented and permit pivoting or rotational movement of the first and second side rack assemblies 16, 18 parallel to the ground. It is to be understood the number of fasteners, as well as their sizing and method of attachment, used in the shown figures is exemplary and is subject to change in contemplated configurations of the design.

Shown in FIGS. 1, 2, 8 and 9, the lower rack mount assembly 14 is substantially identical to the upper rack mount assembly 12. As such, the same components have the same reference numbers augmented by 200. In particular, the lower rack mount assembly comprises lower wall mount bracket 220, first side lower rack pivot bracket 250, second side lower rack pivot bracket 350, wall mount fasteners 280, pivot bracket mount fasteners 282, and pivot pins 284. The lower wall mount bracket 220 comprises a first side end 222, second side end 224, outer surface 226, inner surface 228, central panel 230, top wall mount panel 240, bottom wall mount panel 244, first end offset panels 248, and second offset panels 249. Further, the top wall mount panel 240 and bottom wall mount panel 244 define a plurality of slots 242, 246 extending generally through the outer surface 226 and inner surface 228. The central panel 230 further comprises first side mounting region 232, second side mounting region 234, first side handle openings 236 and second side handle openings 238, with the first side mounting region 232 and second side mounting region 234 both defining a plurality of openings 233, 235 extending generally through the outer surface 226 and inner surface 228.

The first end 222 and second end 224 are generally opposite one another with the outer surface 226 and inner surface 228 extending generally from and to each end. The outer surface 226 and inner surface are opposite one another in reference to the lower wall mount bracket 220 with the outer surface 226 facing opposite the inner surface 224. The first side mounting region 232 of the central panel is proximate to the first side end 222 and the second side mounting region 234 of the central panel 230 is proximate to the second side end 224. Openings 233 of the first side mounting region 232, in the configuration shown, are separated by a general amount of material along the central panel 230, being proximate to the first side end 222 generally more than the first side handle opening 236. Openings 235 of the second side mounting region 234, in the configuration shown, are separated by a general amount of material along the central panel 230, being proximate to the second side end 224 generally more than the second side handle opening 238. The first side handle opening 236 and the second side handle opening 238 extend generally through the outer surface 226 and inner surface 228 and are proximate to the central axis of the lower rack mount assembly 14. It is to be understood the size of the openings 233, 235, the first side handle opening 236, and second side handle opening 238 as well as the distance of separation between them along the lower wall mount bracket 220 in the exemplary figure are variable and subject to change in contemplated configurations of the design.

The central panel 230, top wall mount panel 240, and bottom wall mount panel 244 extend generally from the first side end 222 to the second side end 224 and are parallel in reference to one another. In the configuration shown, the top wall mount panel 240 and bottom wall mount panel 244 are coplanar in reference to one another such that a suitably flat surface mated to the inner surface 228 of the top wall mount panel 240 will be generally mated to the inner surface 228 of the bottom wall mount panel 244. In the vertical plane, the central panel is generally between the top wall mount panel 240 and bottom wall mount panel 244, with the bottom wall mount panel generally beneath the central panel 230 and top wall mount panel 240. In the exemplary figure, the plurality of slots 242 defined by the top wall mount panel 240 and the plurality of the slots 246 defined by the bottom wall mount panel 244 extend from first end 222 towards second end 224. It is to be understood the number of slots 242, 246 and the sizing in reference to the horizontal and vertical distance are variable and subject to change in contemplated configurations of the design.

The central panel 230 and top wall mount panel 240 are coupled through the first offset panel 248. In the configuration shown, the first offset panel 248 is oblique to the parallel surface of the central panel 230 and top wall mount panel 240. It is to be understood the angle of offset of the first offset panel 248 may be of any suitable amount such that the central panel 230 and top wall mount panel 240 are generally separated with reference to the horizontal plane. The central panel 230 and bottom wall mount panel 244 are coupled through the second offset panel 249. In the configuration shown, the second offset panel 249 is oblique to the parallel surface of the central panel 230 and bottom wall mount panel 244. The first and second offset panels 248, 249, as well as the junctures between the offset panels 248, 249 and the central panel 230 and the top and bottom wall mount panels 240, 244, extend the entire width of the bottom wall mount bracket 220, i.e., between the first end 222 and the second end 224. It is to be understood in contemplated configurations of the design, the angle of offset of the second offset panel 249 may be of any suitable amount such that the central panel 230 and bottom wall mount panel 244 are generally separated with reference to the horizontal plane, including the central panel 230 being moved in such a way that the top wall mount panel 240 and bottom wall mount panel 244 are switched in reference to the horizontal plane.

Figure 8:
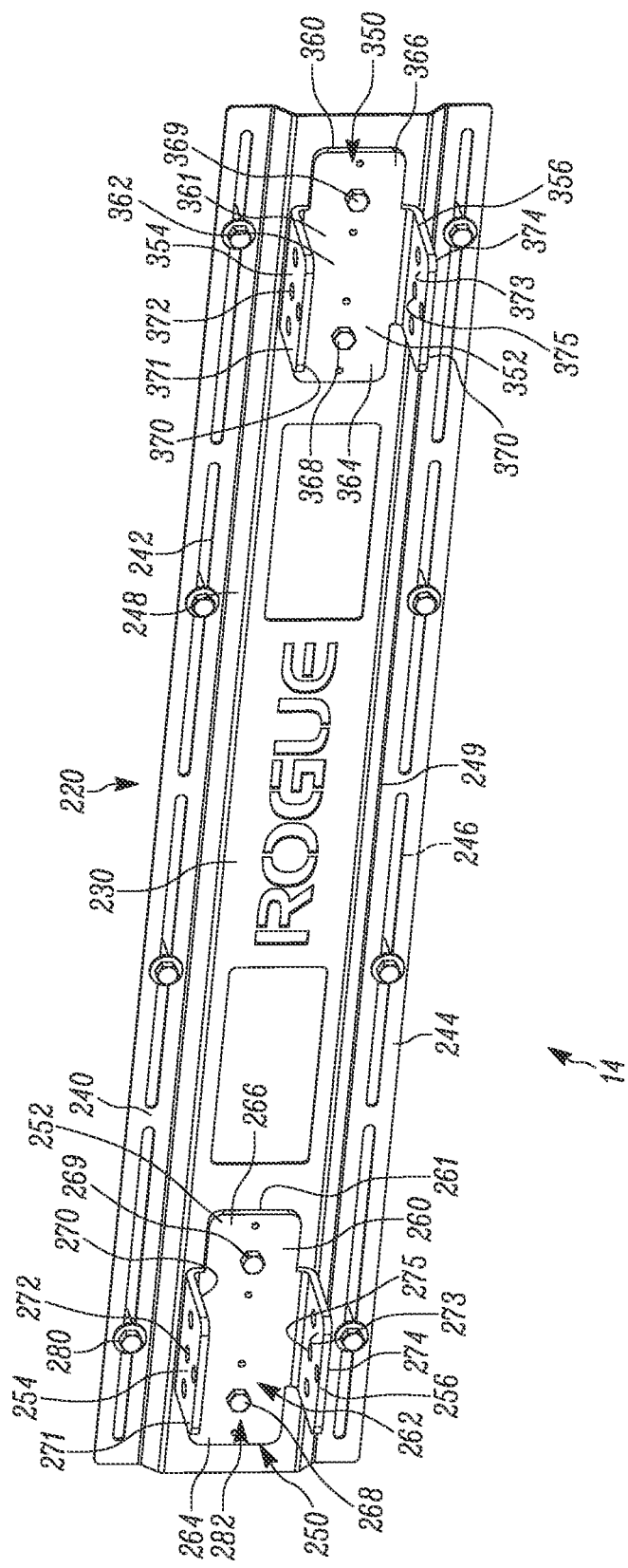
FIG. 8 of the drawings is a partial perspective view of the weightlifting rack assembly of FIG. 1, showing, in particular, a lower rack mount assembly.
Figure 9:
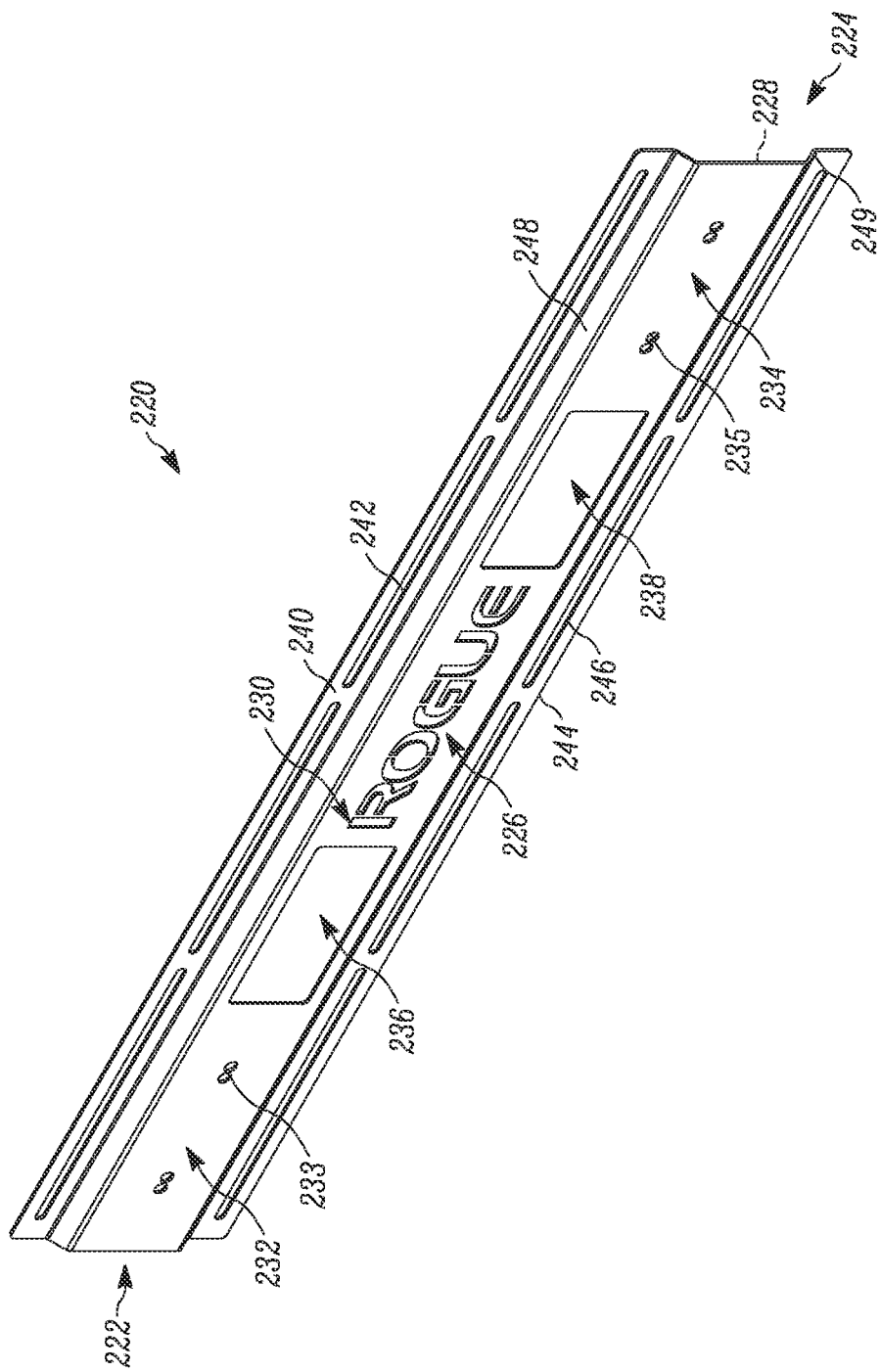
FIG. 9 of the drawings is a perspective view of a lower wall mount bracket of the lower rack mount assembly of FIG. 8.

The first side lower rack pivot bracket 250, shown in FIGS. 8 and 9, comprise base 252, upper pivot wall 254, and lower pivot wall 256. The base 252 comprise outer surface 260, inner surface 261, central region 262, first side wing region 264, second side wing region 266, first side mounting opening 268, and second side mounting opening 269. The upper pivot wall 254 comprise inner surface 270, outer surface 271, and pivot opening 272. The lower pivot wall 256 comprise inner surface 273, outer surface 274, and pivot opening 275. It is to be understood the base 252 connects the upper pivot wall 254 and lower pivot wall 256 through extension of the central region 262. In the exemplary figure, the upper pivot wall 254 and lower pivot wall 256 are generally parallel in reference to one another, but is subject to change in contemplated configurations and future iterations of the design.

The inner surface 261 of the base 252 is mated to the outer surface 226 of the lower wall mount bracket 220 with the outer surface 260 generally opposite the inner surface 261. Generally, the base 252 extends from first side wing region 264, through central region 262, and to the second side wing region 266. The first side wing region 264 defines opening first side mounting opening 268 and the second side wing region 266 defines opening second side mounting opening 269. It is to be understood the wing regions of the base 252 are connected to the central region 262 of the base. The mounting openings 268, 269 are generally coaxially aligned with the openings 233 of the first side mounting region 232 of the lower wall mount bracket 220. It is to be understood any alteration of the position of the openings 233 of the lower wall mount bracket 220 is to be generally similar to alterations in the positions of the openings 268, 269. Further, the mounting openings 268, 269 in the exemplary figure are of a variable size that is subject to change in contemplated configurations.

The inner surface 270 and outer surface 271 of the upper pivot wall 254 are generally opposite one another with pivot opening 272 defined by the upper pivot wall 254 and extending through the inner surface 270 and outer surface 271. The inner surface 273 and outer surface 274 of the lower pivot wall 256 are generally opposite one another with pivot opening 275 defined by the lower pivot wall 256 and extending through the inner surface 273 and outer surface 274. The inner surface 270 of upper pivot wall 254 and inner surface 273 of the lower pivot wall 256 generally face one another in such a way the corresponding outer surfaces 271, 274 face opposite in reference to one another. The pivot openings 272, 275 of the upper pivot wall 254 and lower pivot wall 256 are generally coaxial in reference to one another. It is to be understood the sizing of the openings 272, 275 in the exemplary figure is variable and subject to change in contemplated configurations of the design.

The second side lower rack pivot bracket 350, shown in FIGS. 8 and 9, is substantially identical to each one of the rack pivot brackets, and, generally comprises base 352, upper pivot wall 354, and lower pivot wall 356. The base 352 comprise outer surface 360, inner surface 361, central region 362, first side wing region 364, second side wing region 366, first side mounting opening 368, and second side mounting opening 369. The upper pivot wall 354 comprise inner surface 370, outer surface 371, and pivot opening 372. The lower pivot wall 356 comprise inner surface 373, outer surface 374, and pivot opening 375. It is to be understood the base 352 connects the upper pivot wall 354 and lower pivot wall 356 through extension of the central region 362. In the exemplary figure, the upper pivot wall 354 and lower pivot wall 356 are generally parallel in reference to one another, but is subject to change in contemplated configurations and future iterations of the design.

The inner surface 361 of the base 352 is mated to the outer surface 326 of the lower wall mount bracket 220 with the outer surface 360 generally opposite the inner surface 361. Generally, the base 352 extends from first side wing region 364, through central region 362, and to the second side wing region 366. The first side wing region 364 defines opening first side mounting opening 368 and the second side wing region 366 defines opening second side mounting opening 369. It is to be understood the wing regions of the base 352 are connected to the central region 362 of the base. The mounting openings 368, 369 are generally coaxially aligned with the openings 235 of the second side mounting region 234 of the lower wall mount bracket 220. It is to be understood any alteration of the position of the openings 333 of the lower wall mount bracket 220 is to be generally similar to alterations in the positions of the openings 368, 369. Further, the mounting openings 368, 369 in the exemplary figure are of a variable size that is subject to change in contemplated configurations.

The inner surface 370 and outer surface 371 of the upper pivot wall 354 are generally opposite one another with pivot opening 372 defined by the upper pivot wall 354 and extending through the inner surface 370 and outer surface 371. The inner surface 373 and outer surface 374 of the lower pivot wall 356 are generally opposite one another with pivot opening 375 defined by the lower pivot wall 356 and extending through the inner surface 373 and outer surface 374. The inner surface 370 of upper pivot wall 354 and inner surface 373 of the lower pivot wall 356 generally face one another in such a way the corresponding outer surfaces 371, 374 face opposite in reference to one another. The pivot openings 372, 375 of the upper pivot wall 354 and lower pivot wall 356 are generally coaxial in reference to one another. It is to be understood the sizing of the openings 372, 375 in the exemplary figure is variable and subject to change in contemplated configurations of the design.

Figure 7:
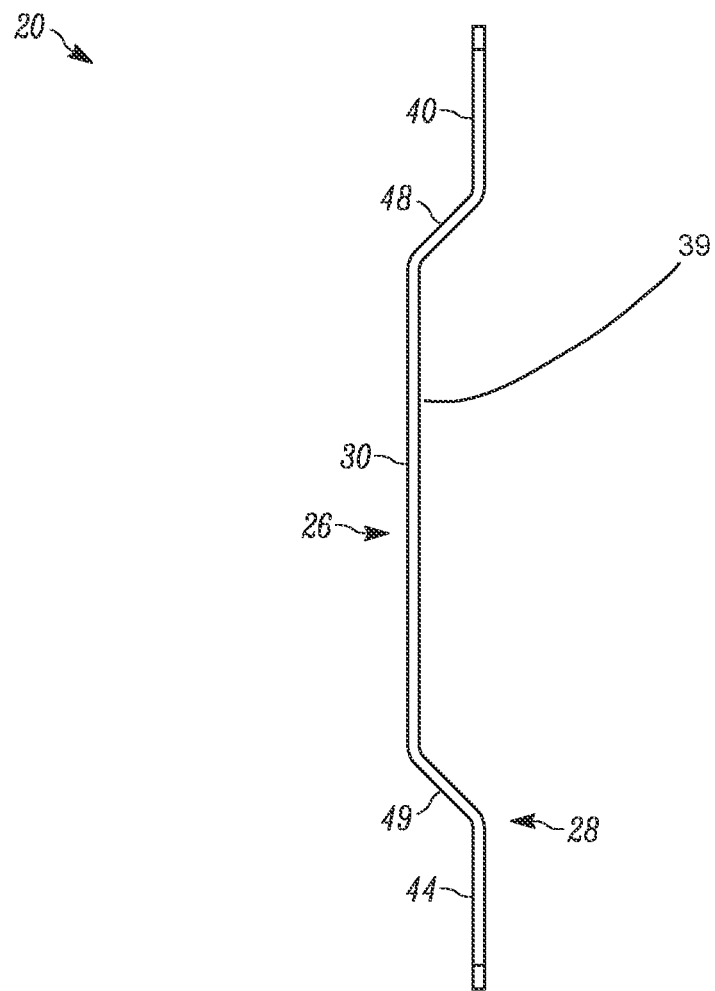
FIG. 7 of the drawings is a side elevation view of the upper wall mount bracket of FIG. 5.

Shown in FIGS. 1 and 7, mounting and assembly of the lower rack mount assembly uses wall mount fasteners 80, pivot bracket mount fasteners 82, and pivot pins 84. The lower wall mount bracket 220, first side lower rack pivot bracket 250, and second side lower rack pivot bracket 350 in the exemplary figures are coupled together through pivot bracket mount fasteners 82. The pivot bracket mount fasteners 82 fit concentrically with the mounting openings 268, 269, 368, 369 of the lower rack pivot brackets and the openings 233, 235 of the lower wall mount bracket 220. The first side lower rack pivot bracket 250 and the second side lower rack pivot bracket 350 are generally aligned in reference to the vertical plan and separated along the horizontal plane by the lower wall mount bracket 220.

Figure 12:
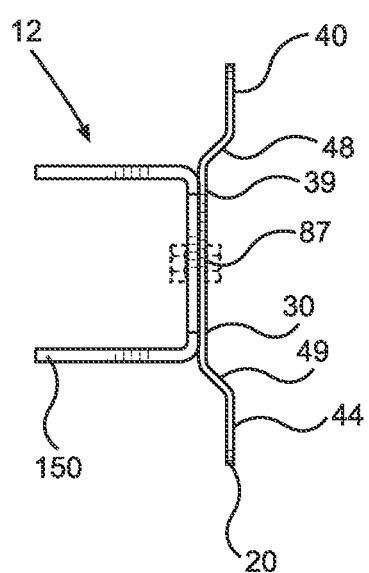
FIG. 12 of the drawings is a left side view of the upper rack mount assembly of FIG. 4.
Figure 13:
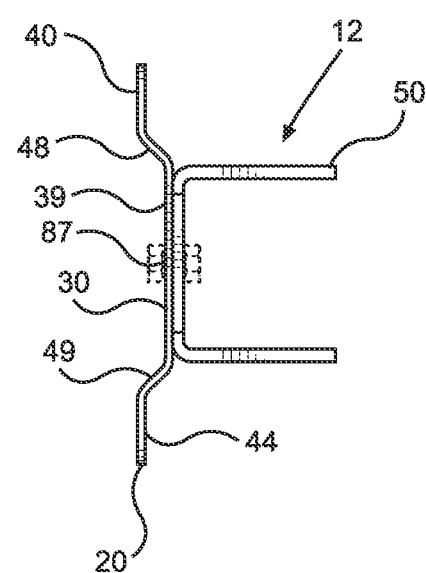
FIG. 13 of the drawings is a right side view of the upper rack mount assembly of FIG. 4.
Figure 14:
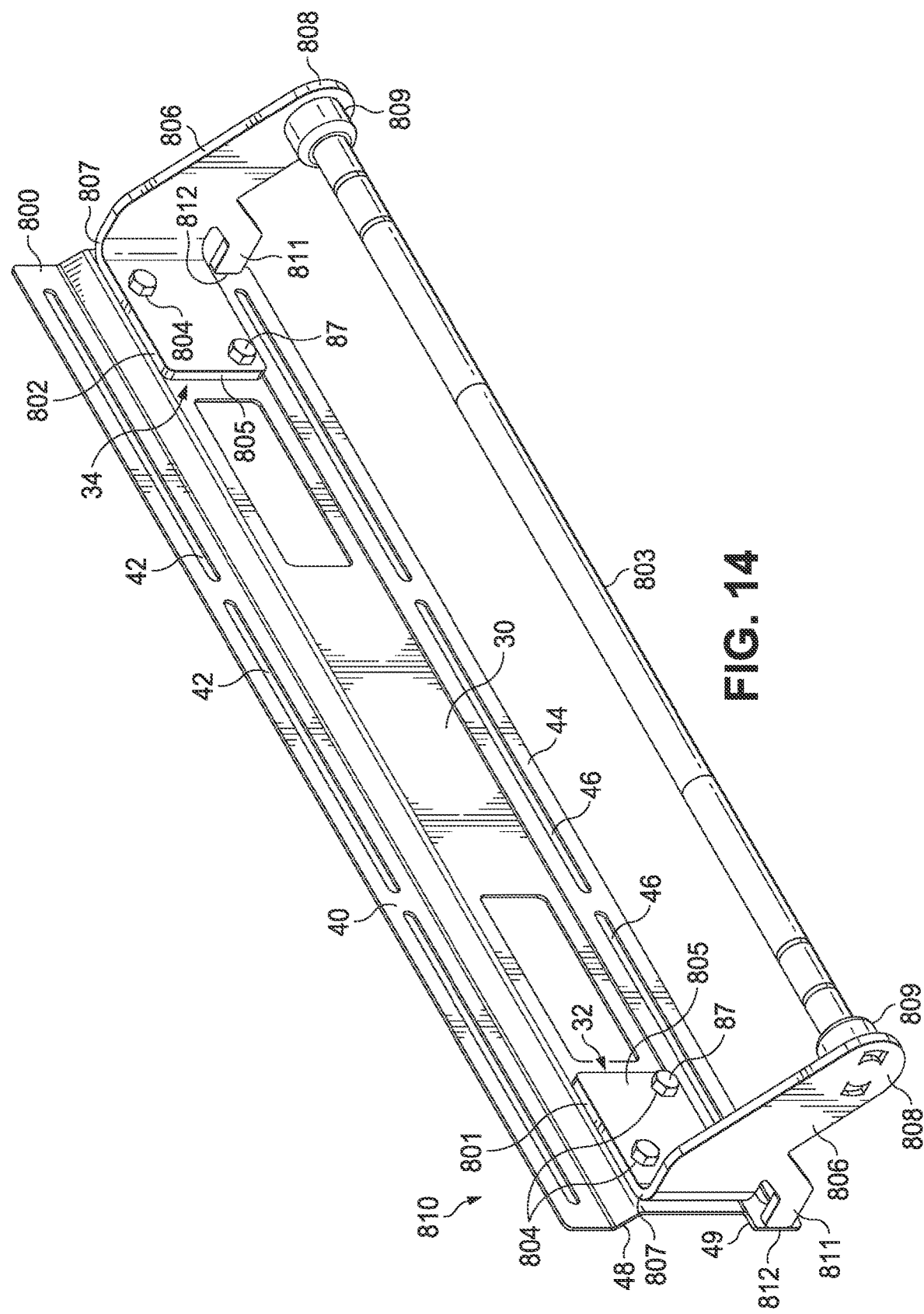
FIG. 14 of the drawings is a perspective view of another embodiment of a weightlifting rack assembly according to aspects of the present disclosure, in the form of a wall-mounted pull-up bar.
Figure 15:
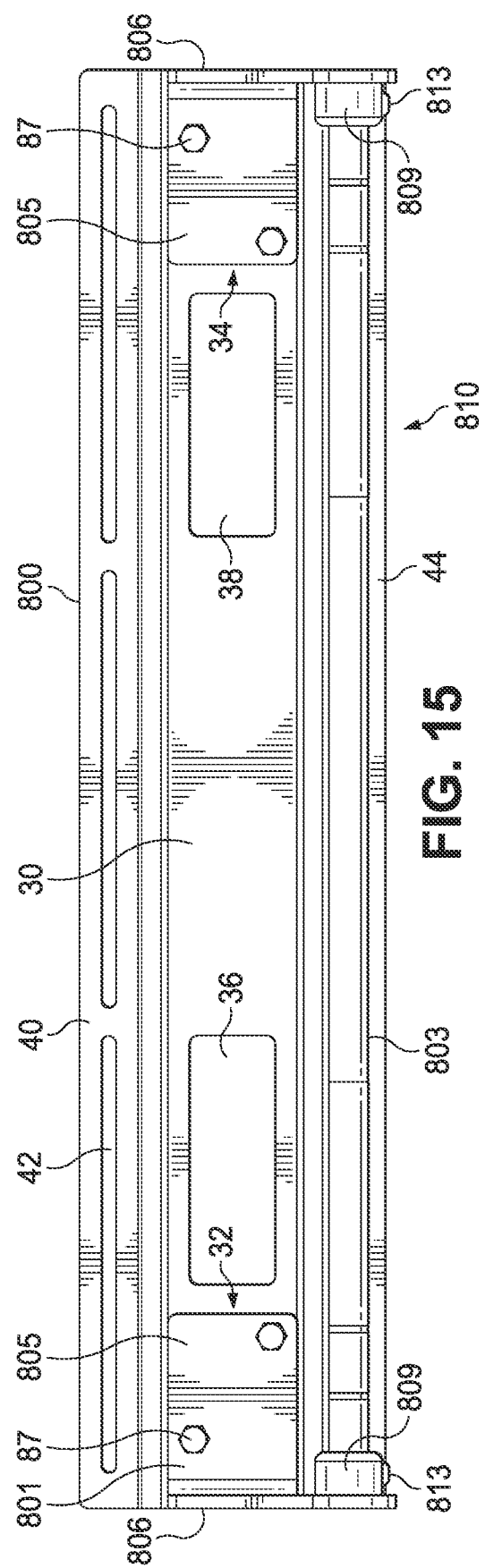
FIG. 15 of the drawings is a front view of the weightlifting rack assembly of FIG. 14.

In the configuration shown, the first side lower rack pivot bracket 250 and the second side lower rack pivot bracket 350 mate to the lower wall mount bracket 220 by the pivot bracket mount fasteners. In the configuration shown, the lower wall mount bracket 220 is coupled to the wall surface 700 by wall mount fasteners 80. The wall mount fasteners 280 couple the lower wall mount bracket 220 to wall surface 270 through slots 42, 246 of the top wall mount panel 240 and bottom wall mount panel 244 to the studs 702 of the wall surface 700. It is to be understood the wall mount fasteners 280 are aligned in such a way to provide enough force to limit vertical and horizontal movement of the lower wall mount bracket 220 whilst coupled to the wall surface 700, additionally resisting external forces. Pivot pins 84 couple to the first side lower rack pivot bracket 250 and second side lower rack pivot bracket 350 through the pivot openings 272, 275, 372, and 375. The pivot pins 84 are generally concentric to the openings and fit in such a way that rotational movement is not substantially limited, but vertical and horizontal movement is. The pivot pins 84 associated with the lower wall mount bracket 220 are configured similarly to the pivot pins 84 associated with the upper wall mount bracket 20 described herein. It is to be understood the number of fasteners, as well as their sizing and method of attachment, used in the shown figures is exemplary and is subject to change in contemplated configurations of the design. In each of the upper and lower wall mount brackets, the offset central panel 30, 230 is spaced apart from the underlying wall surface 700 so as to allow for suitable fasteners 87 to be used to couple the pivot brackets 50, 150, 250, 350 thereto, e.g., by the fasteners 87 being received through the mounting openings 68, 69, 168, 169, 268, 269, 368, 369, and the openings 33, 35, 233, 235. FIGS. 12 and 13 illustrate the clearance provided to the fasteners 87 by this offset.

Figure 5:
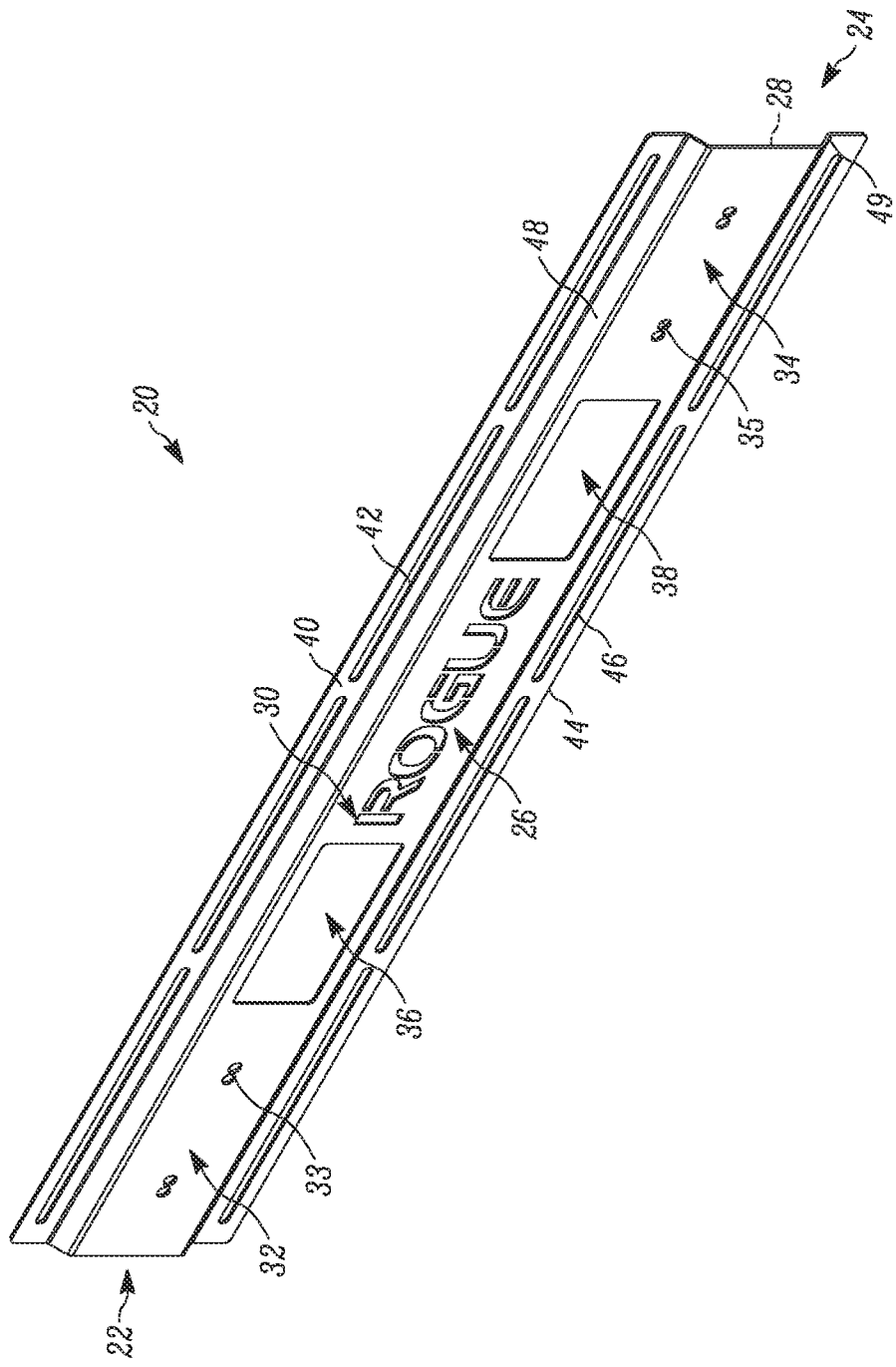
FIG. 5 of the drawings is perspective view of an upper wall mount bracket of the upper rack mount assembly of FIG. 3.
Figure 6:
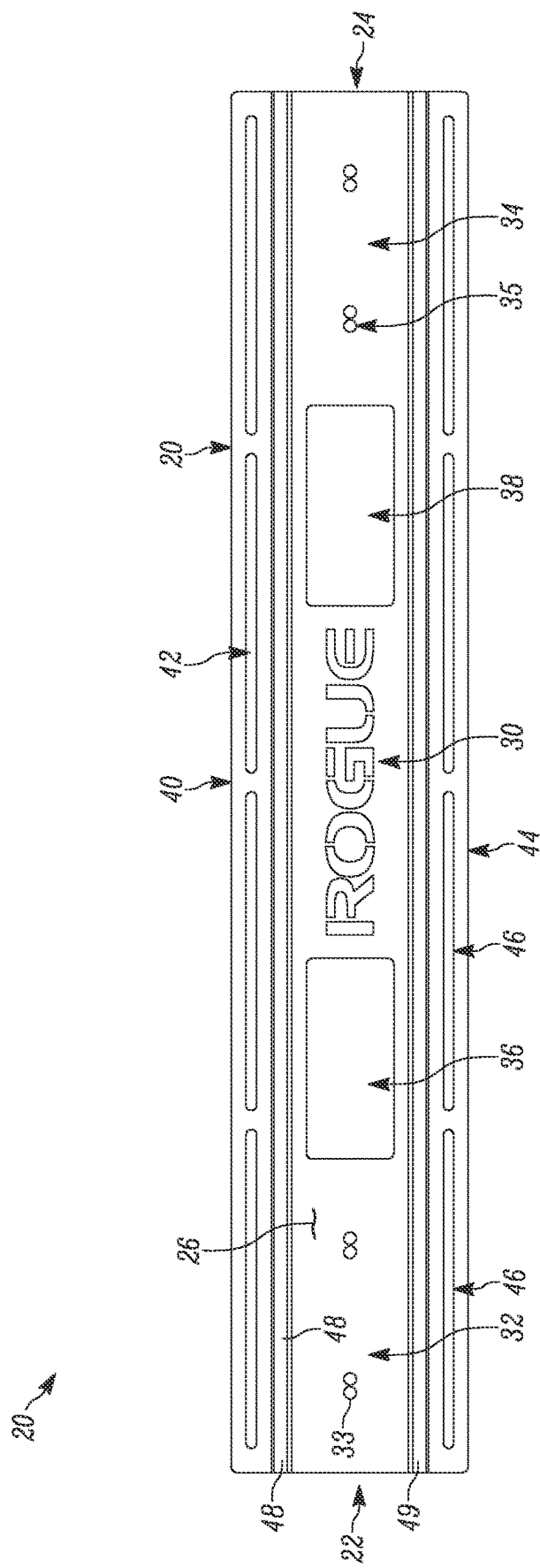
FIG. 6 of the drawings is a front elevation view of the upper wall mount bracket of FIG. 5.

Shown in FIG. 5, the first side rack assembly 16 comprises a main bar 400, upper cross bar 402, and lower cross bar 404. The main bar comprises upper end 406, lower end 408, and openings 409. The upper cross bar 402 comprises proximal end 410, distal end 411, front flange 412, openings 414, and pivot opening 416. The lower cross bar 404 comprises proximal end 420, distal end 421, front flange 422, openings 424, and pivot opening 426. It is to be understood the main bar 400, upper cross bar 402, and lower cross bar 404 are have square, rectangular, or other generally similarly shaped cross-sections. In the exemplary configuration, the main bar 400 is generally perpendicular in relation to the upper cross bar 402 and lower cross bar 404. Further, the upper cross bar 402 is generally parallel to the lower cross bar 404. It is to be understood by those with sufficient skill in the art that the bars present may be solid bars or shells of appropriately stiff materials, such as metal alloys. In the exemplary figure, the thickness of the metal is isometric throughout the extension of the bar systems, but it is contemplated to change in future iterations of the device. Further, the length of the main bar 400, upper cross bar 402, and lower cross bar 404 are variable and subject to change in future iterations of the device.

The upper end 406 and lower end 408 of the main bar 400 are generally opposite one another with the main bar extended the distance between both ends. The openings 409 are defined by main bar 400 and extend generally through both the front, back, and opposing sides of the main bar 400. The upper cross bar 402 has proximal end 410 proximal to the wall surface 700 and distal end 411 proximal to the main bar 400 while being generally opposite one another in relation to the upper cross bar 402. The front flange 412 is on distal end 411 of the upper cross bar and mates to the main bar 400. The extension of the flange is variable and subject to alteration in future iterations of the device. Openings 414 are defined by upper cross bar 404 and extend generally through both the front, back, and opposing sides of the upper cross bar 404, with the pivot opening 416 extending through the proximal end 410 along the vertical plane of the upper cross bar 404. The lower cross bar 404 has proximal end 420 proximal to the wall surface 700 and distal end 421 proximal to the main bar 400 while being generally opposite one another in relation to the lower cross bar 404. The front flange 422 is on distal end 421 of the lower cross bar and mates to the main bar 400. The extension of the flange is variable and subject to alteration in future iterations of the device. Openings 424 are defined by lower cross bar 404 and extend generally through both the front, back, and opposing sides of the lower cross bar 404, with the pivot opening 426 extending through the proximal end 420 along the vertical plane of the lower cross bar 404. It is to be understood the number of openings, as well as their size, is variable and subject to change in contemplated configurations.

Shown in FIG. 9, the second side rack assembly 18 is a substantial mirror image of the first side rack assembly, and comprises a main bar 500, upper cross bar 502, and lower cross bar 504. The main bar comprises upper end 506, lower end 508, and openings 509. The upper cross bar 502 comprises proximal end 510, distal end 511, front flange 512, openings 514, and pivot opening 516. The lower cross bar 504 comprises proximal end 520, distal end 521, front flange 522, openings 524, and pivot opening 526. It is to be understood the main bar 500, upper cross bar 502, and lower cross bar 504 are have square, rectangular, or other generally similarly shaped cross-sections. In the exemplary configuration, the main bar 500 is generally perpendicular in relation to the upper cross bar 502 and lower cross bar 504. Further, the upper cross bar 502 is generally parallel to the lower cross bar 504. It is to be understood by those with sufficient skill in the art that the bars present may be solid bars or shells of appropriately stiff materials, such as metal alloys. In the exemplary figure, the thickness of the metal is isometric throughout the extension of the bar systems, but it is contemplated to change in future iterations of the device. Further, the length of the main bar 500, upper cross bar 502, and lower cross bar 504 are variable and subject to change in future iterations of the device.

The upper end 506 and lower end 508 of the main bar 500 are generally opposite one another with the main bar extended the distance between both ends. The openings 509 are defined by main bar 500 and extend generally through both the front, back, and opposing sides of the main bar 500. The upper cross bar 502 has proximal end 510 proximal to the wall surface 700 and distal end 511 proximal to the main bar 500 while being generally opposite one another in relation to the upper cross bar 502. The front flange 512 is on distal end 511 of the upper cross bar and mates to the main bar 500. The extension of the flange is variable and subject to alteration in future iterations of the device. Openings 514 are defined by upper cross bar 504 and extend generally through both the front, back, and opposing sides of the upper cross bar 504, with the pivot opening 516 extending through the proximal end 510 along the vertical plane of the upper cross bar 504. The lower cross bar 504 has proximal end 520 proximal to the wall surface 700 and distal end 521 proximal to the main bar 500 while being generally opposite one another in relation to the lower cross bar 504. The front flange 522 is on distal end 521 of the lower cross bar and mates to the main bar 500. The extension of the flange is variable and subject to alteration in future iterations of the device. Openings 524 are defined by lower cross bar 504 and extend generally through both the front, back, and opposing sides of the lower cross bar 504, with the pivot opening 526 extending through the proximal end 520 along the vertical plane of the lower cross bar 504. It is to be understood the number of openings, as well as their size, is variable and subject to change in contemplated configurations.

With each of the first and second side rack assemblies, a pin may be inserted through the proximal end of the upper and lower cross bars and through the pivot brackets to rotationally lock the two structures together, and to generally preclude any substantial rotative relative movement. Such pins may be configured to be removably slidable through corresponding openings in each of the structures.

The cross bar assembly 19, shown in FIGS. 1 and 4, comprises central bar portion 600, first side rack coupling 602, second side rack coupling 604, first pin member 606, and second pin member 608. The central bar portion 600 comprises first end 610 and second end 612, the first side rack coupling 602 comprises outward channel 614 and pin openings 616, the second side rack coupling 604 comprises outwards channel 624 and pin openings 626. The first end 610 of the central bar portion 600 is proximal to the first side rack assembly 16 and the second end 612 of the central bar portion 600 is proximal to the second side rack assembly 18. The outward channel 614 of the first side rack coupling 602 extends and generally surrounds the first side rack assembly 16. The pin openings 616 are defined by the outwards channel 614 and are axially aligned with openings along the first side rack assembly 16. The outward channel 624 of the second side rack coupling 604 extends and generally surrounds the second side rack assembly 18. The pin openings 626 are defined by the outwards channel 624 and are axially aligned with openings along the second side rack assembly 18. The first pin member 606 is a pin of suitable size to extend through pin openings 616 of the first side rack coupling and openings of the first side rack assembly 16. The first pin member 606 is known to be generally axially aligned with openings and generally prevent vertical and horizontal motion. The second pin member 608 is a pin of suitable size to extend through pin openings 626 of the second side rack coupling and openings of the second side rack assembly 18. The second pin member 608 is known to be generally axially aligned with openings and generally prevent vertical and horizontal motion. It is contemplated in future configurations of the device that the number of openings and pins, and size therein, are variable and are subject to change.

Described herein is a method for assembly of the foldable weightlifting rack assembly to the exemplary system shown. The method, order, and tools necessary for assembly of the weightlifting rack are contemplated to vary in various configurations, depending upon size, weight, and materials used to construct and hold the metal bars and brackets in place. For example, heavier structures may use similar components, but may involve a greater number of wall mounting fasteners and slots thereto.

Assembly may begin through identifying the studs 702 beneath the wall surface 700 and lining with the upper wall mount bracket 20. The plurality of slots 42, 46 of the upper wall mount bracket, including length of slots between first send end 22 and second side end 24, allow for a range of stud 702 distances to be used. Holes may be pre-drilled into the wall surface 700 into the studs 702. These drill holes are to be done both an appropriate number of times along the upper end of the studs 702 but also the lower end to a distance generally similar to the main bars 400, 500 of the first and second side rack assembly. It is recommended to use the upper wall mount bracket 20 to mark the necessary locations before drilling.

During the time of drilling the holes, the first side upper rack pivot brackets 50, 250 and second side rack pivot brackets 150, 350 are appropriately coupled to the upper wall mount bracket 20 and lower wall mount bracket 220. The mounting openings of the rack pivot brackets are generally aligned axially to the openings of the appropriate wall mount brackets. The pivot bracket mount fasteners 82, 282 are used to couple the brackets together, in a manner that may include, but is not limited to, screwing, bolting, adhesive attachment, or other such methods of pin coupling, and preferably through the use of bolts and nuts, as is shown. It will be understood that multiple pairs or groups of openings may be provided to alter the spacing, for example, to make the upper wall mount bracket usable with differently sized rack assemblies (i.e., wherein, for example, the generally square/rectangular tubing of the rack assemblies have different cross-sectional dimensions)

Following, the upper rack mount assembly 12 is position over the pre-drilled holes in the wall surface, with the wall mount fasteners inserted in such a way they are suitably able to hold the mount assembly along the wall. At this time, a leveling tool may be used to ensure the extension of the wall mounting assembly is generally parallel in reference to the ground. When satisfied, the wall mount fasteners 80 may be tightened into the wall surface 700 and studs 702. The same process is repeated for the lower rack mount assembly 14, with the additional step of ensuring the brackets, ends and appropriate holes are sufficiently aligned in reference to the horizontal plane.

The first side rack assembly 16 and second side rack assembly 18 are assembled separated from the upper and lower rack mount assemblies 12, 14. The upper cross bar 402 and lower cross bar 404 are coupled to the main bar 400 through the appropriate front flange 412, 424 and fasteners extending therebetween.

The first side rack assembly 16 and second side rack assembly 18 are lifted towards the upper and lower rack mount assembly 12, 14 in such a way that the proximal ends 410, 420 are proximal to the wall surface and rack mount assemblies. These proximal ends are fitted into the rack pivot brackets appropriately. That is to say, for the first side rack assembly 16, the proximal end 410 of the upper cross bar 402 is fitted to the first side upper rack pivot bracket 50 and the proximal end 420 of the lower cross bar 404 is fitted to the first side lower rack pivot bracket 250. Then further, the second side rack assembly 18, the proximal end 510 of the upper cross bar 502 is fitted to the second side upper rack pivot 150 and the proximal end 520 of the lower cross bar 504 is fitted to the second side lower rack pivot bracket 350. Once the bars are appropriately placed within the pivot brackets, pivot pins 84, 284 are placed vertically through the pivot openings of the brackets and the cross bars. This couples the rack assemblies to the wall mount assemblies in such a way to generally prevent the horizontal and vertical motion of the rack assemblies in relation to the wall surface 702, but allowing a suitable amount of rotational movement about the pivot pins 84,284. As described above, the rack assembly 10 may be moved between an articulated configuration as shown in FIGS. 1-3 and a folded configuration as shown in FIGS. 10-11, by pivoting the first and second side rack assemblies 16, 18 toward the wall surface 700. FIGS. 10-11 show the first and second side rack assemblies 16, 18 both pivoted toward each other (i.e., inward) to place the rack assembly 10 in the folded configuration, and it is understood that one or both of the first and second side rack assemblies 16, 18 may be pivoted away from the other (i.e., outward) in other configurations. Additionally, locking pins 85 may be inserted in additional corresponding locking pin openings 86 to engage the first side rack assembly 16 and the first side upper rack pivot bracket 50 and also to engage with the second side rack assembly 18 and the second side upper rack pivot bracket 150, so as to limit relative rotational movement between. These locking pins 85 generally define an axis that is substantially parallel to that of the pivot pins 84, and spaced therefrom. The first side upper rack pivot bracket 50 and the second side upper rack pivot bracket 150 each have three different pairs of locking pin openings 86 to receive the locking pins 85, allowing the first and second side rack assemblies 16, 18 to be locked in three different positions. The locking pins 85 may be cotter pins or other pins with a releasable retaining structure in one embodiment. The locking pins 85 as illustrated in FIGS. 10-11 are received in locking pin openings 86 to abut the ends of the cross members 402, 404, 502, 504, but may be received in the locking pin openings 86 on the opposite sides of the pivot brackets 50, 150, 250, 350 to be received through holes in the cross members 402, 404, 502, 504, as similarly shown in FIGS. 1 and 3.

The cross bar assembly 19 may be attached when the rack assemblies are positioned in a suitable manner, fitting over the first end of the main bars to each assembly. The cross bar assembly 19 may be further secured to the assemblies through first pin member into openings of the main bar of the first assembly and the second pin member into openings of the main bar of the second assembly, both going through the appropriate side rack coupling portions. This coupling secures the cross bar assembly 19 to the first side rack assembly 16 and second side rack assembly 18. The user can use the cross bar for chin-ups, pull-ups and the like. Additionally, the cross bar maintains the desired fixed orientation of the main bars so as to limit shearing forces on the pins and so as to maintain relative position, even with heavier weights.

When disengaging the foldable weightlifting bar assembly 10, the cross bar assembly 19 is decoupled from the side assemblies by unlocking pin members and removing the bar assembly. Additionally, any pins locking the pivot brackets to the upper and lower cross bars are removed, to permit relative rotation therebetween. Once removed, the first side and second side bar assemblies may be rotated towards the wall rack mount assembly while the main bar of either sides become more proximal to one another. This folding and rotation about the pivot pins 84, 284 collapses the first and second side bar assemblies of the weight lifting rack assembly 10 and reduces the amount of area occupied by the device.

The upper and lower wall mount brackets allow for the mounting of the foldable weightlifting bar assembly on a wall in multiple positions, and generally does not require additional structures to be built or added to the wall surface (such as horizontal studs or the like). Thus, a more compact and less intrusive structure is permitted. Additionally, the upper and lower wall mount brackets allow for the variable position of the foldable weightlifting bar assembly on the wall, without being limited to particular and discrete positions based on the underlying position of the studs. Therefore, not only can the assembly be positioned in more locations, but will generally maintain as compact of a configuration when folded as possible.

Figure 20:
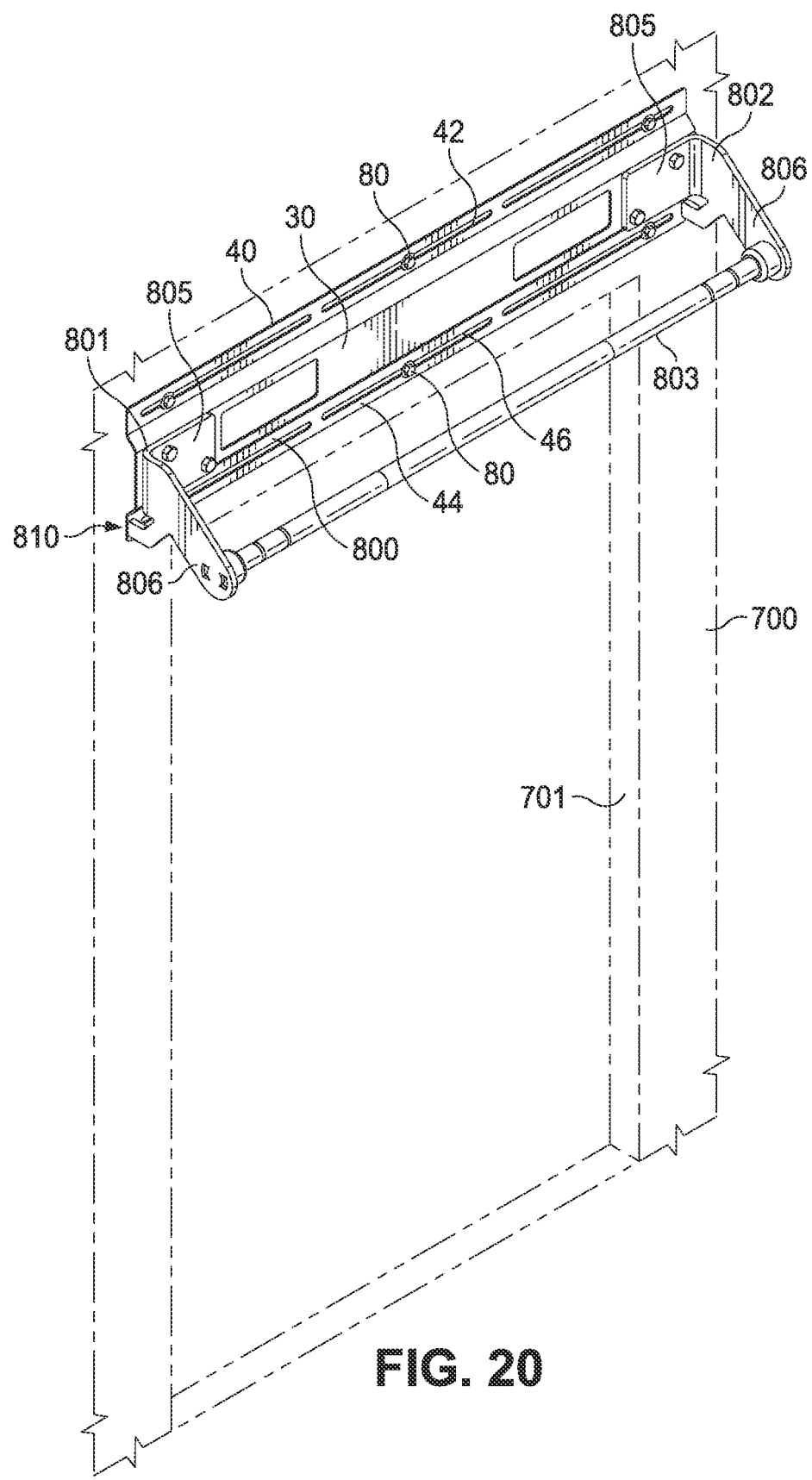
FIG. 20 of the drawings is a perspective view of the weightlifting rack assembly of FIG. 14 mounted on a wall surface shown in broken lines.

FIGS. 14-20 illustrate another embodiment of a weightlifting rack assembly 810 that is configured for mounting to a wall surface 700. The rack assembly 810 uses a wall mount bracket 800 that is configured similar to the upper wall mount bracket 20 of FIGS. 1-7 and 10-13. For the sake of brevity, the shared components and features of the upper wall mount bracket 20 already described herein will not be re-described herein in detail, and the same reference numbers will be used in describing the wall mount bracket 800 of FIGS. 14-20 and the upper wall mount bracket 20 of FIGS. 1-7 and 10-13. The wall mount bracket 800 in FIGS. 14-20 will therefore be described primarily with respect to the differences between the wall mount bracket 800 and the upper wall mount bracket 20 of FIGS. 1-7. For example, one difference is that the wall mount bracket 800 of FIGS. 14-20 has three slots 42 in the top wall mount panel 40 three slots 46 in the bottom wall mount panel 44, while the upper wall mount bracket 20 of FIGS. 1-7 and 10-13 has four of each of such slots 42, 46. It is noted that the single mount bracket 800 enables the rack assembly 810 of FIGS. 14-20 to be mounted on a wall surface 700 above a doorway 701, as shown in FIG. 20.

The rack assembly 810 in FIGS. 14-20 is configured for use as a fixed pull-up bar, and includes a first side mount bracket 801, a second side mount bracket 802, and a bar 803 connected to the mount brackets 801, 802 and extending between the mount brackets 801, 802. Each of the mount brackets 801, 802 includes a base 805 configured for connection to the wall mount bracket 800 and a support arm 806 extending outward from the base 805 to support the bar 803. The base 805 is formed as a rectangular plate in the embodiment of FIGS. 14-20, but may be formed of a differently shaped plate or another structure in other embodiments. The first side mount bracket 801 is connected to the first side mounting region 32 and the second side mount bracket 802 is connected to the second side mounting region 34 by fasteners 87 received through mounting openings 804 in the bases 805 of the mount brackets 801, 802 and openings 33, 35 in the central panel 30 of the wall mount bracket 800. The openings 33, 35 in the wall mount bracket 800 of FIGS. 14-20 (not shown) are positioned differently from the openings 33, 35 in the upper wall mount bracket 20 of FIGS. 1-7, which are vertically aligned with and horizontally spaced from each other. In the wall mount bracket 800 of FIGS. 14-20, the openings 33, 35 are offset and spaced from each other both vertically and horizontally, and the mounting openings 804 in the bases 805 of the mount brackets 801, 802 are positioned similarly in order to align with the openings 33, 35 in the wall mount bracket 800.

Figure 16:
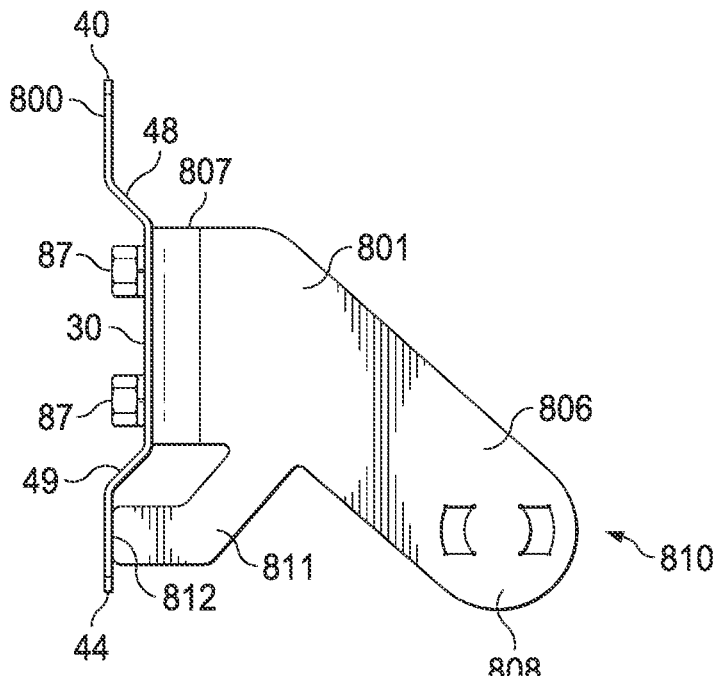
FIG. 16 of the drawings is a right side view of the weightlifting rack assembly of FIG. 14.
Figure 17:
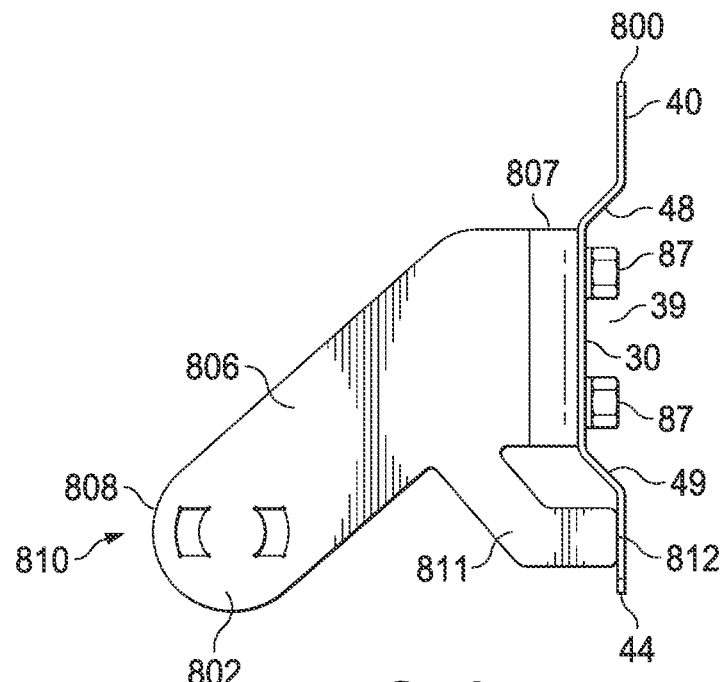
FIG. 17 of the drawings is a left side view of the weightlifting rack assembly of FIG. 14.
Figure 18:
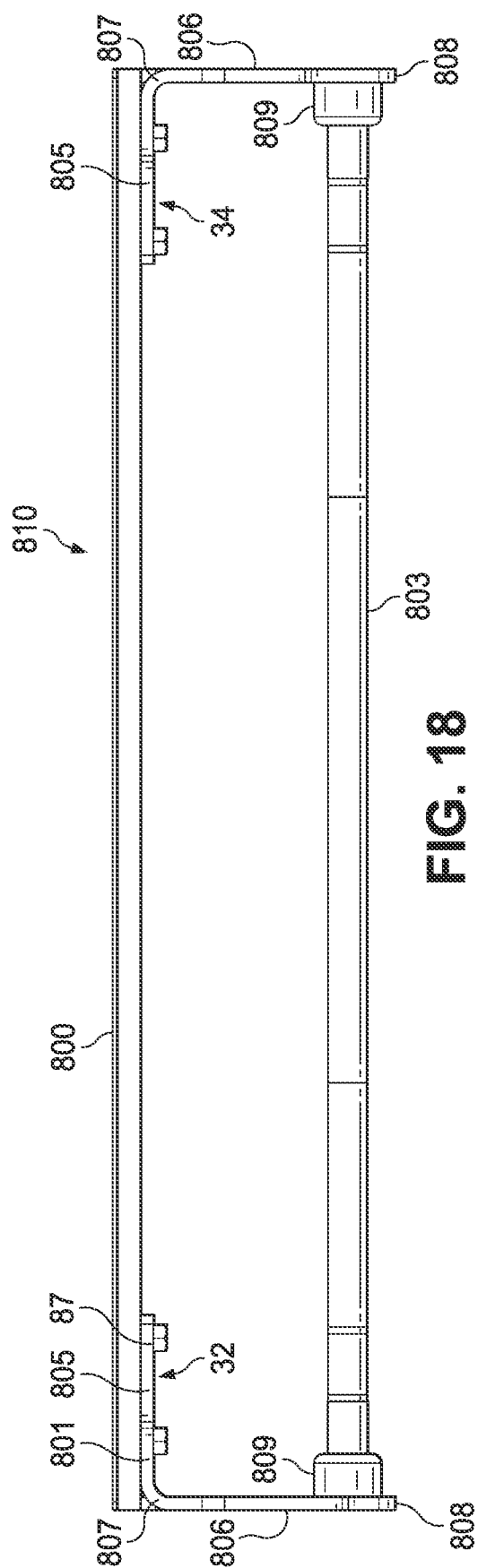
FIG. 18 of the drawings is a top view of the weightlifting rack assembly of FIG. 14.
Figure 19:
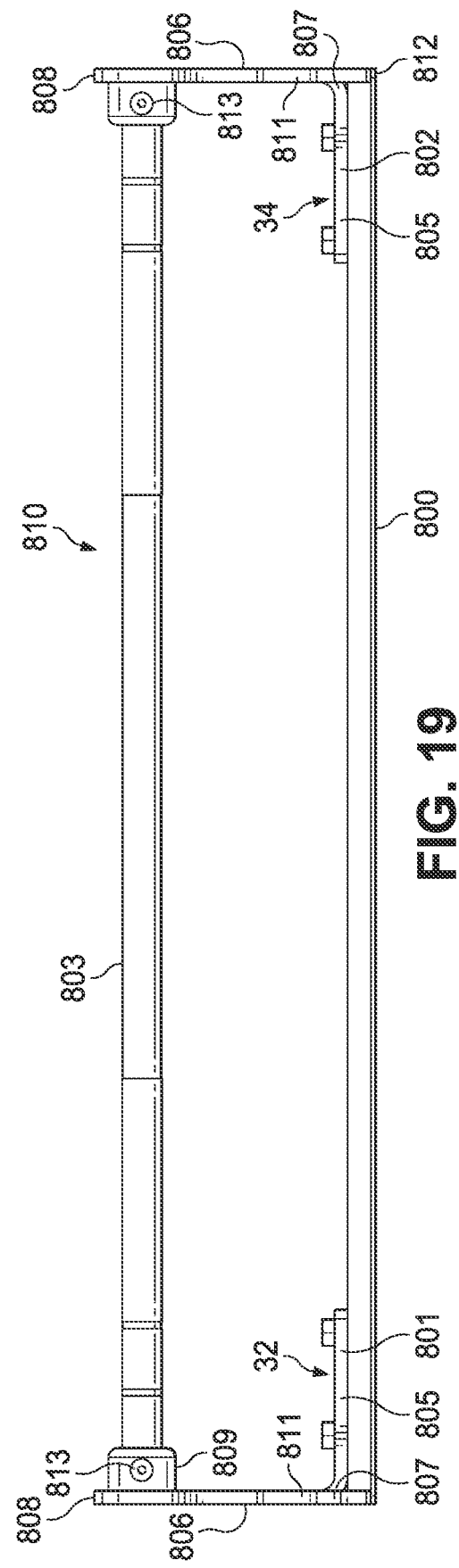
FIG. 19 of the drawings is a bottom view of the weightlifting rack assembly of FIG. 14.

The arms 806 of the mount brackets 801, 802 each have a first end 807 connected to the base 805 and a second or distal end 808 having connecting structure for connection to the bar 803. In the embodiment of FIGS. 14-20, the arm 806 of each mount bracket 801, 802 is formed of a single, integral piece (e.g., of metal plate) with the base 805, and the juncture between the arm 806 and the base 805 is formed by a bend (e.g., 90°) in the material of the mount bracket 801, 802. Each arm 806 extends outward from the respective base 805 as well as downward from the first end 807, and in one embodiment, the second ends 808 of the arms 806 extend downward below the lowermost point of the wall mount bracket 800 (e.g., the bottom edge of the bottom wall mount panel 44), as shown in FIGS. 16-17. The connecting structure of each arm 806 in the embodiment of FIGS. 14-20 is in the form of a receiver 809 connected to the second end 808 of the arm 806 and configured to receive an end of the bar 803 therein. The receivers 809 in FIGS. 14-20 are separate pieces connected to the arms 806, such as by welding and/or fasteners, but may each be part of a single, integral piece with the corresponding arm 806 in another embodiment. The receivers 809 in this embodiment include set screws 813 (FIG. 19) to engage the ends of the bar 803 and secure the bar 803 within the receivers 809. Each of the mount brackets 801, 802 in FIGS. 14-20 also includes a brace 811 extending downward and rearward from the arm 806 and having a distal or free end 812 configured to engage a vertical surface (e.g., the wall mount bracket 20 or the wall surface 700). The free ends 812 of the braces 811 in FIGS. 14-20 abuttingly engage the bottom wall mount panel 44 of the wall mount bracket 800. These braces 811 provide support and rigidity to the arms 806 against cantilever bending forces exerted on the bar 803. The braces 811 in FIGS. 14-20 are also formed of part of the single, integral piece with the arms 806 and the bases 805 of the corresponding mount brackets 801, 802. It is understood that the mount brackets 801, 802, including the bases 805, the arms 806, the connecting structure, and the braces 811, may have different configurations in other embodiments. For example, in another embodiment, the mount brackets 801, 802 may be configured to support a different type of weightlifting equipment other than a pull-up bar 803.

Figure 21:
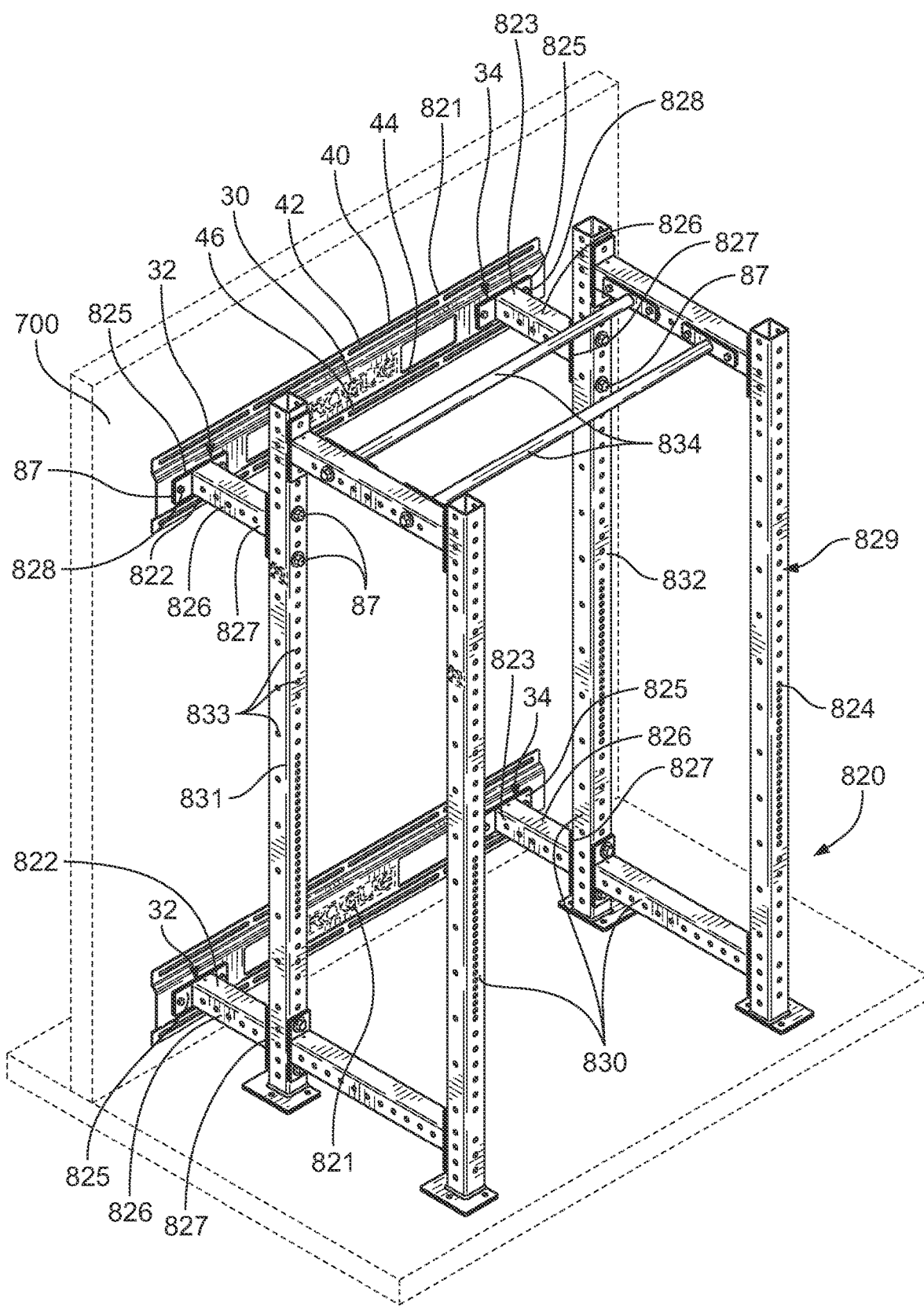
FIG. 21 of the drawings is a perspective view of another embodiment of a weightlifting rack assembly according to aspects of the present disclosure, in the form of a fixed weightlifting rack mounted on a wall surface shown in broken lines.
Figure 22:
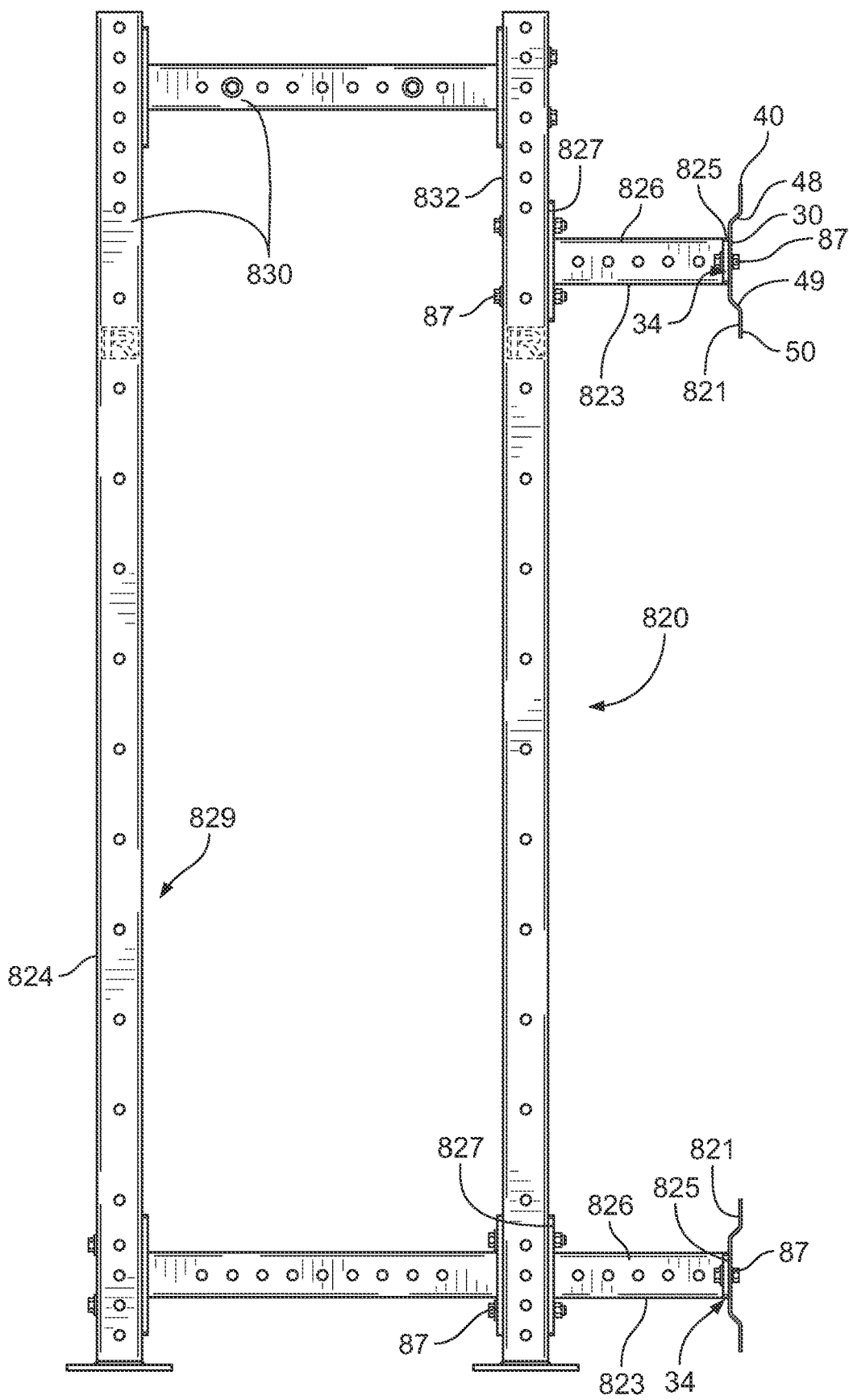
FIG. 22 of the drawings is a left side view of the weightlifting rack assembly of FIG. 21.

FIGS. 21-22 illustrate another embodiment of a weightlifting rack assembly 820 that is configured for mounting to a wall surface 700. The rack assembly 820 uses upper and lower wall mount brackets 821 that are configured similar or identical to the upper and lower wall mount brackets 20, 220 of FIGS. 1-13. For the sake of brevity, the upper and lower wall mount brackets 821 in FIGS. 21-22 will be described with reference to the upper wall mount bracket 20 of FIGS. 1-7 and 10-13, and the shared components and features of the upper wall mount bracket 20 already described herein will not be re-described herein in detail. The same reference numbers will be used in describing the wall mount brackets 821 of FIGS. 21-22 and the upper wall mount bracket 20 of FIGS. 1-7 and 10-13. The wall mount brackets 821 in FIGS. 21-22 will therefore be described primarily with respect to the differences between the wall mount brackets 821 and the upper wall mount bracket 20 of FIGS. 1-7 and 10-13. It is understood that while the upper and lower wall mount brackets 821 of FIGS. 21-22 are identical to each other, the rack assembly 820 may include upper and lower wall mount brackets 821 that are different from each other.

The rack assembly 820 in FIGS. 21-22 is configured for use as a fixed weightlifting rack, and includes a first side mount bracket 822 and a second side mount bracket 823 connected to each of the upper and lower wall mount brackets 821. The mount brackets 822, 823 are configured for connection to a fixed weightlifting rack 824 to support the weightlifting rack 824 and fix the weightlifting rack 824 in position. Each of the mount brackets 822, 823 includes a base 825 configured for connection to the wall mount brackets 821, a beam 826 extending outward from the base 825, and a connection end 827 configured for connection to the weightlifting rack 824. The base 825 and the connection end 827 of each of the mount brackets 822, 823 in FIGS. 21-22 are each formed as a rectangular plate in the embodiment of FIGS. 21-22, but may be formed of a differently shaped plate or another structure in other embodiments. Additionally, the rectangular shapes of the base 825 and the connection end 827 in FIGS. 21-22 are elongated in perpendicular directions, such that the base 825 is elongated horizontally and the connection end 827 is elongated vertically. In one embodiment, the base 825 and the connection end 827 each have a plurality of openings 828 to receive fasteners 87 for connection to the wall mount brackets 821. The base 825 has two openings 828 on opposite horizontal sides of the beam 826, and the connection end 827 has two openings 828 on opposite vertical sides of the beam 826 in the embodiment of FIGS. 21-22. The first side mount bracket 822 is connected to the first side mounting region 32 of the upper or lower wall mount bracket 821 and the second side mount bracket 823 is connected to the second side mounting region 34 of the upper or lower wall mount bracket 821 by fasteners 87 received through the mounting openings 828 in the bases 825 of the mount brackets 822, 823 and openings 33, 35 in the central panel 30 of the respective wall mount bracket 821. The openings 33, 35 in the upper and lower wall mount brackets 821 of FIGS. 21-22 are positioned similarly or identically to the openings 33, 35 in the upper wall mount bracket 20 of FIGS. 1-7, which are vertically aligned with and horizontally spaced from each other.

The weightlifting rack 824 is a fixed weightlifting rack that includes a frame 829 formed by a plurality of frame members 830 connected together and one or more articles of weightlifting equipment connected to the frame 829. The frame 829 is configured to rest on the floor and support any such weightlifting structures, including any of the weightlifting structures shown and described elsewhere herein. The frame 829 may have various different forms, and in one embodiment as shown in FIGS. 21-22, the frame 829 includes at least a first vertical member 831 located toward the first ends 22 of the wall mount brackets 821 and a second vertical member 832 located toward the second ends 24 of the wall mount brackets 821. The first and second vertical members 831, 832 engage the ground and are also connected to and/or support other frame members 830. At least some of the frame members 830 include a plurality of openings 833 for receiving fasteners for connection to other components. In the embodiment of FIGS. 21-22, all of the frame members 830, including the first and second vertical members 831, 832, have a plurality of openings 833 distributed axially along the length of each of the frame members 830 and along all four sides of the frame members 830. The frame 829 in FIGS. 21-22 has two bars 834 connected between two longitudinally-extending frame members 830 using fasteners received in the openings 833, and it is understood that other weightlifting equipment can be connected in the same or a similar manner.

The mount brackets 822, 823 are connected to the weightlifting rack 824 to anchor the weightlifting rack 824 to the wall and more securely support the weightlifting rack 824. The connection end 827 of each of the mount brackets 822, 823 in FIGS. 21-22 is connected to one of the vertical members 831, 832 of the weightlifting rack 824 by fasteners 88 received through the openings 828 and openings 833 in the vertical members 831, 832. It is understood that the fasteners 87 connecting the mount brackets 822, 823 to the wall mount brackets 821 and the fasteners 88 connecting the mount brackets 822, 823 to the weightlifting rack 824 may be the same or different fasteners. As shown in FIGS. 21-22, both the upper and lower wall mount brackets 821 have a first side mount bracket 822 connecting the wall mount bracket 821 to the first vertical member 831 and a second side mount bracket 823 connecting the wall mount bracket 821 to the second vertical member 832. In another embodiment, the first and/or second side mount brackets 822 may be configured for connection to a horizontal frame member 830 or for connection to multiple frame members 830.

FIGS. 23-28 illustrate another embodiment of a weightlifting rack assembly 840 that is configured for mounting to a wall surface 700. The rack assembly 840 uses a wall mount bracket 841 that is configured similar in some respects to the upper wall mount bracket 20 of FIGS. 1-7 and 10-13. For the sake of brevity, the shared components and features of the upper wall mount bracket 20 already described herein will not be re-described herein in detail, and the same reference numbers will be used in describing the wall mount bracket 841 of FIGS. 23-28 and the upper wall mount bracket 20 of FIGS. 1-7 and 10-13. The wall mount bracket 841 in FIGS. 23-28 will therefore be described primarily with respect to the differences between the wall mount bracket 841 and the upper wall mount bracket 20 of FIGS. 1-7. For example, one difference is that the wall mount bracket 841 of FIGS. 23-28 has a greater height (parallel to the wall), and the central panel 30 has mounting regions 32, 34 that are configured for attachment to brackets 842, 843 that are elongated vertically, e.g., by having holes 33, 35 aligned horizontally and spaced vertically, while the upper wall mount bracket 20 of FIGS. 1-7 and 10-13 has a smaller height and vertically-aligned holes 33, 35. As another example, the wall mount bracket 841 of FIGS. 23-28 has side handle openings 839 that have greater heights and/or smaller horizontal widths than the side handle openings 36, 38 of the embodiment of FIGS. 1-7.

Figure 23:
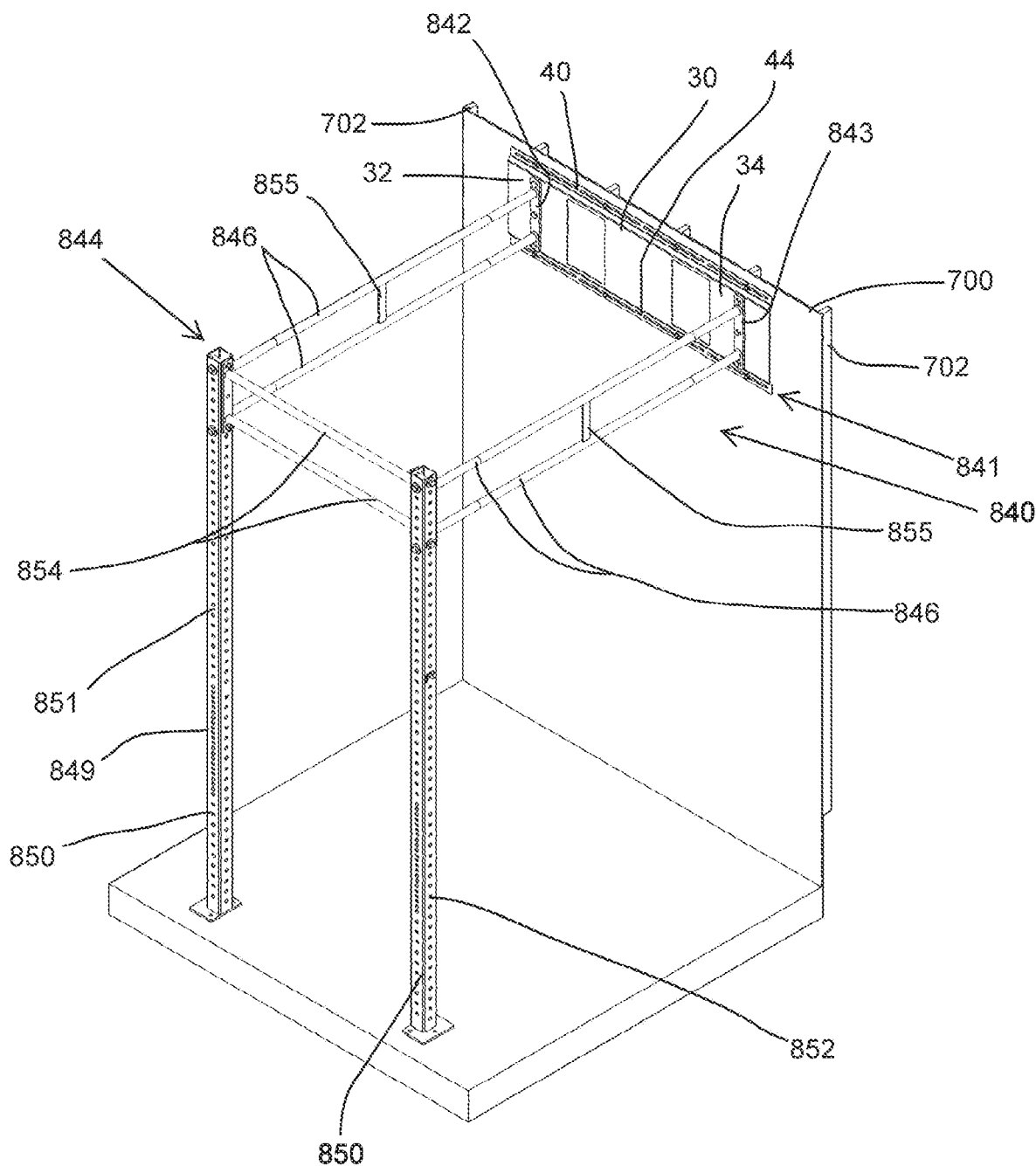
FIG. 23 of the drawings is a perspective view of another embodiment of a weightlifting rack assembly according to aspects of the present disclosure, in the form of a wall-mount weightlifting rack mounted on a wall surface.
Figure 24:
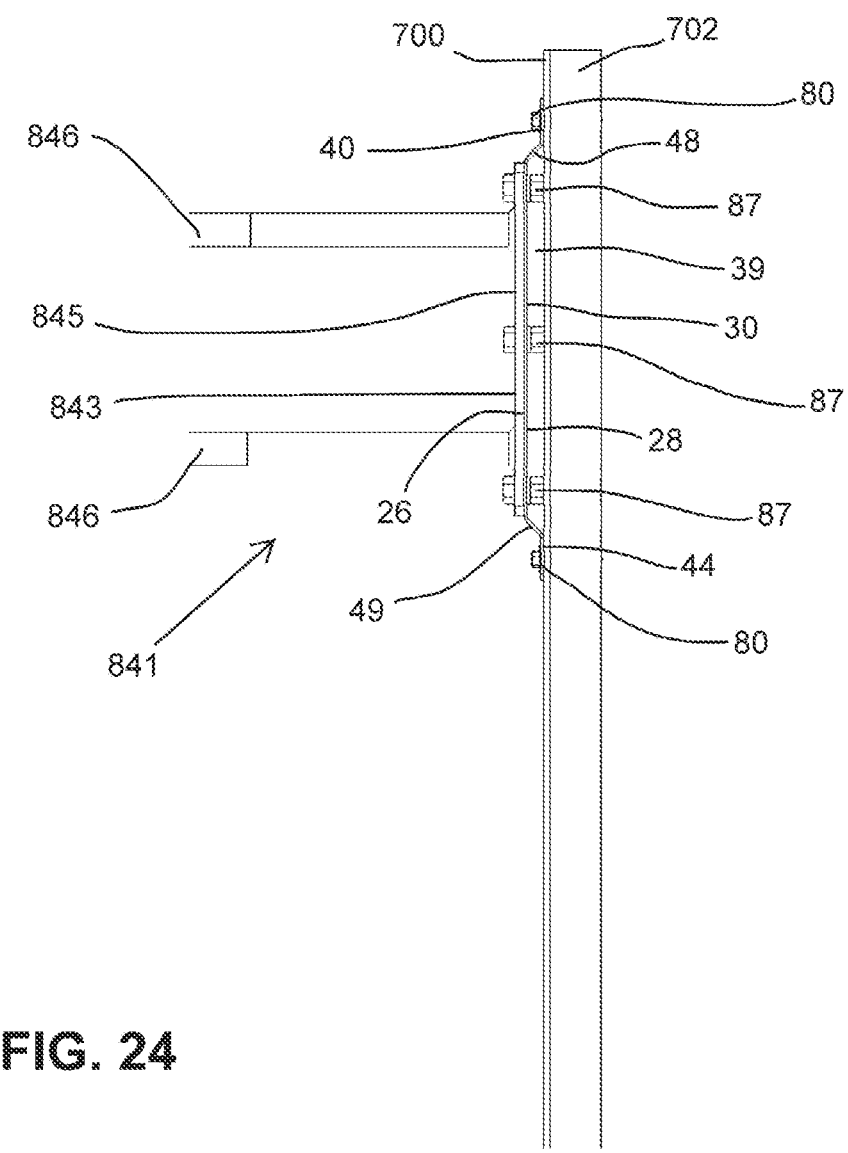
FIG. 24 of the drawings is a partial side view of the weightlifting rack assembly of FIG. 23.
Figure 25:
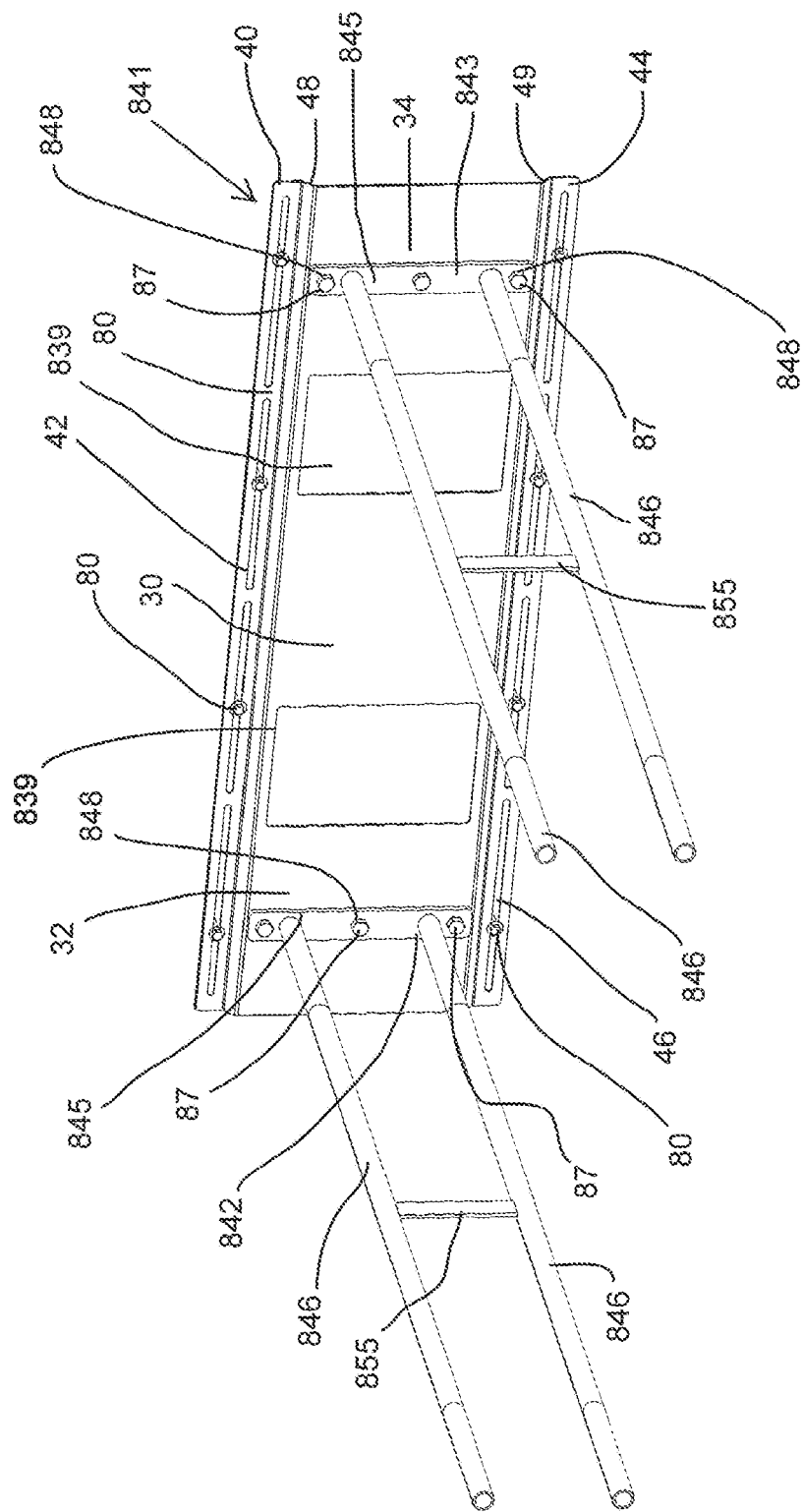
FIG. 25 of the drawings is a partial perspective view of the weightlifting rack assembly of FIG. 23.
Figure 26:
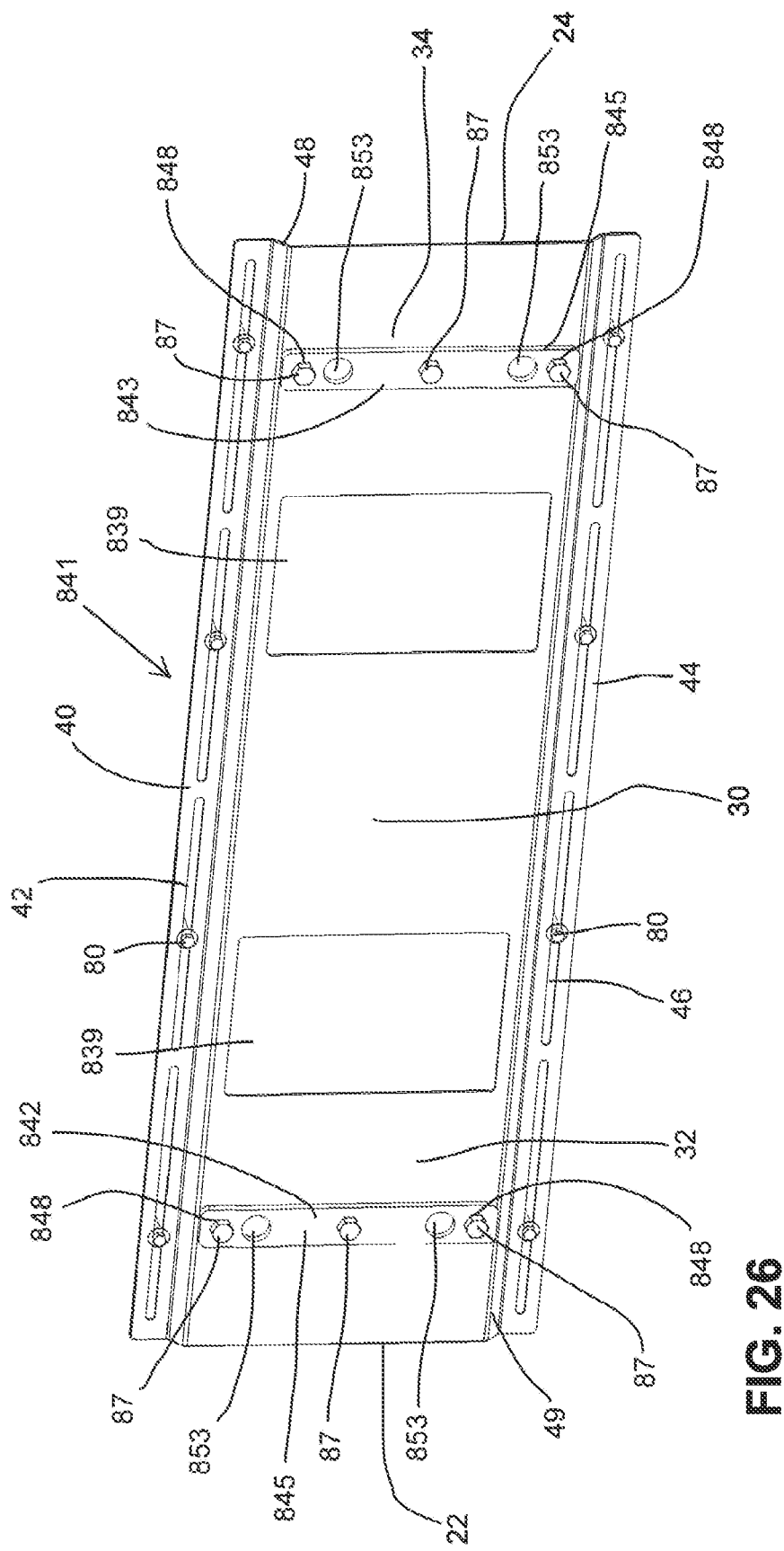
FIG. 26 of the drawings is a perspective view of an upper rack mount assembly of the weightlifting rack assembly of FIG. 23.
Figure 27:
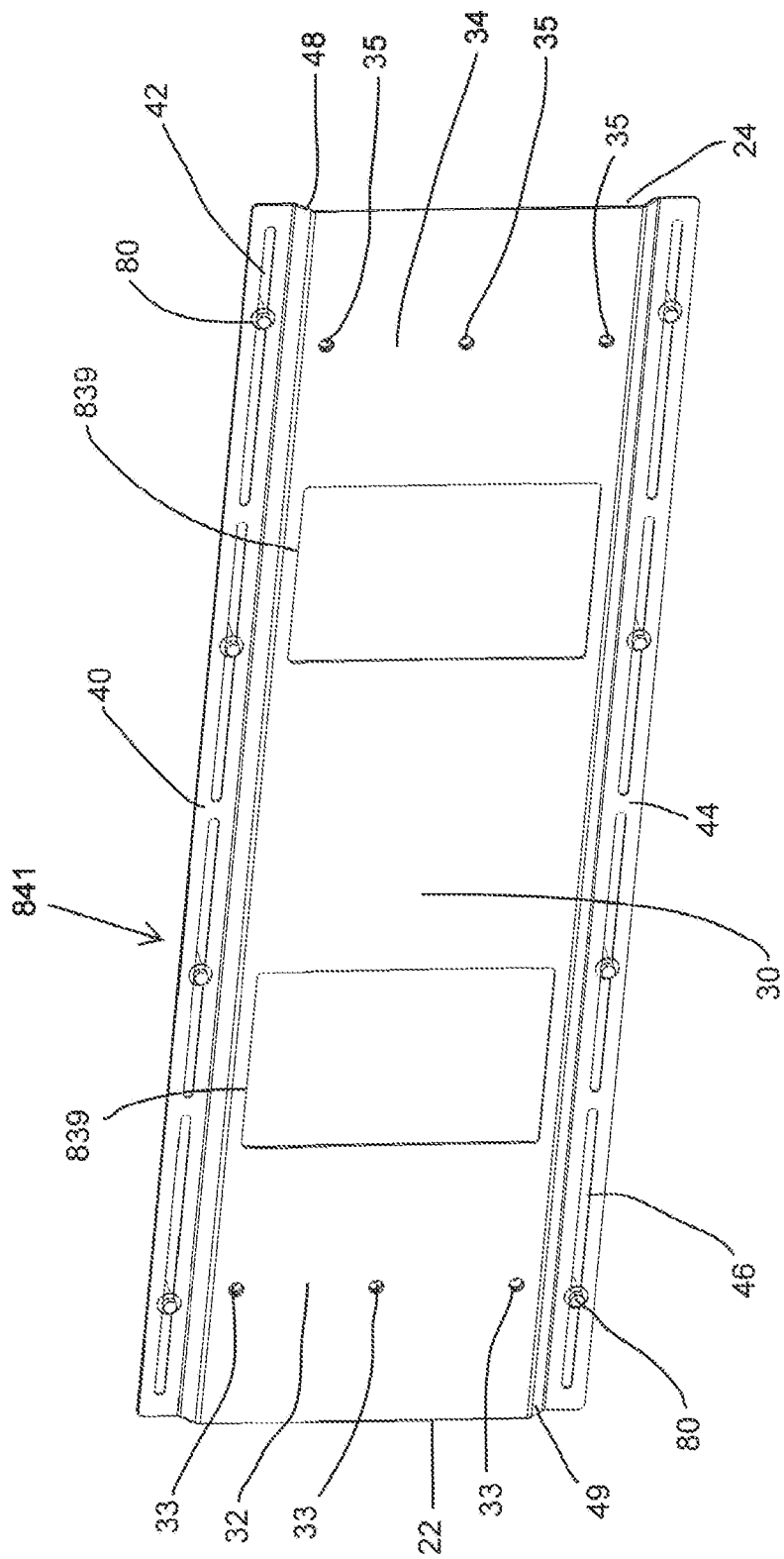
FIG. 27 of the drawings is a perspective view of an upper wall mount bracket of the upper rack mount assembly of FIG. 26.
Figure 28:
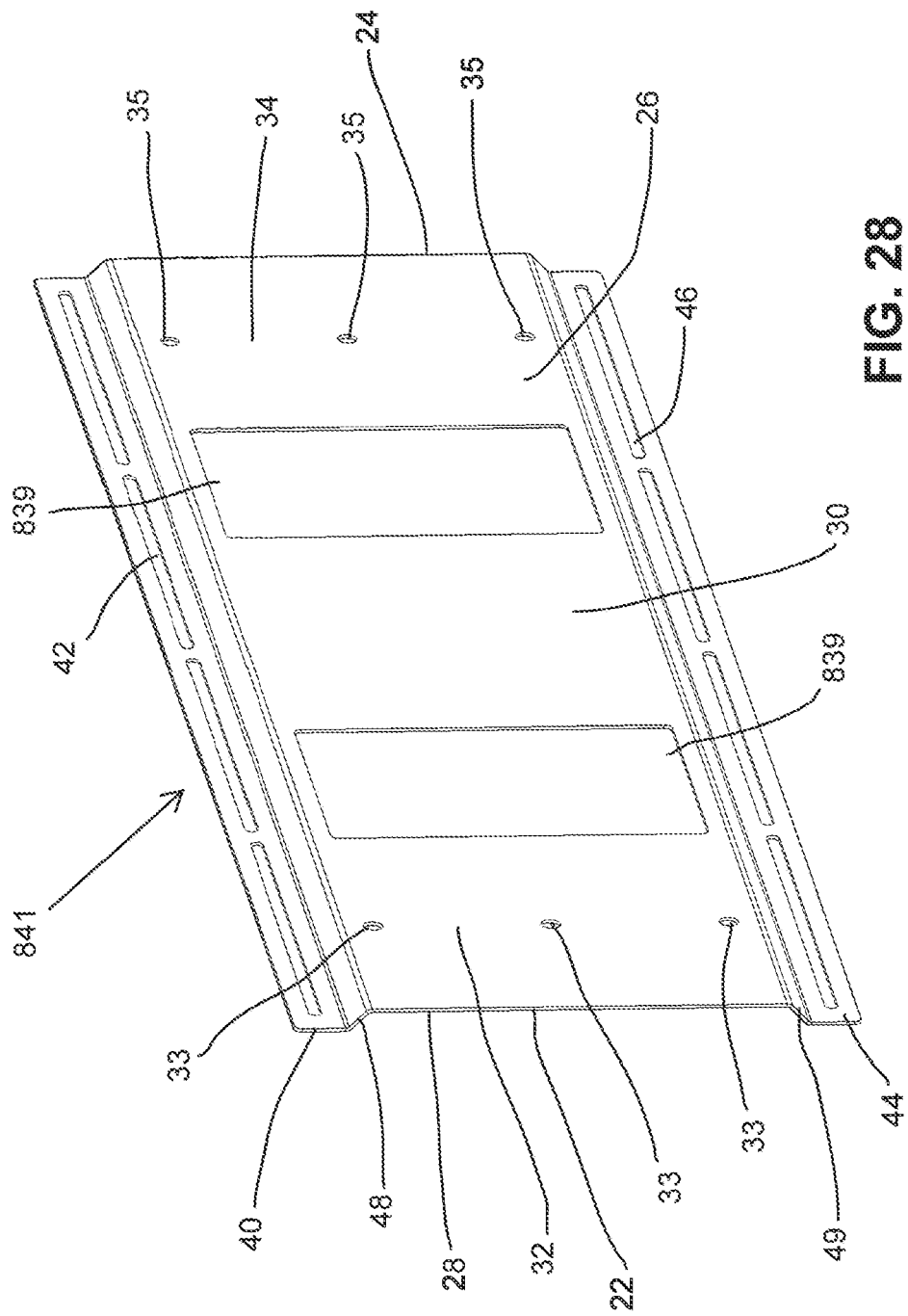
FIG. 28 of the drawings is a perspective view of the upper wall mount bracket of FIG. 27.

The rack assembly 840 in FIGS. 23-28 is configured for use as a fixed weightlifting rack, and includes a first side mount bracket 842 and a second side mount bracket 843 connected to the wall mount bracket 841. The mount brackets 842, 843 are configured for connection to a fixed weightlifting rack 844 to support the weightlifting rack 844 and fix the weightlifting rack 844 in position. Each of the mount brackets 842, 843 includes a base 845 configured for connection to the wall mount bracket 841 and also configured for connection to one or more members of the weightlifting rack 844. In the embodiment of FIGS. 23-25, the weightlifting rack 844 includes one or more beams 846 connected to each base 845 and extending outward from the base 845 to support the weightlifting rack 844. The base 845 of each of the mount brackets 842, 843 in FIGS. 23-28 is each formed as a rectangular plate, but may be formed of a differently shaped plate or another structure in other embodiments. Additionally, the rectangular shape of each base 845 in FIGS. 21-22 is elongated in a direction that is vertical when the mount brackets 842, 843 are connected to the wall mount bracket 841. In one embodiment, the bases 845 of the mount brackets 842, 843 each have a plurality of openings 848 to receive fasteners 87 for connection to the wall mount bracket 841. Each base 845 has three openings 848 in the embodiment of FIGS. 23-25, which are spaced and vertically aligned with each other and located proximate the top end, bottom end, and center of the base 845. As described above, the first and second side mounting regions 32, 34 of the wall mount bracket 841 have three openings 33, 35 that are also vertically aligned and spaced to match the openings 848 in the mount brackets 842, 843. The first side mount bracket 842 is connected to the first side mounting region 32 of the wall mount bracket 841 and the second side mount bracket 843 is connected to the second side mounting region 34 of the wall mount bracket 841 by fasteners 87 received through the mounting openings 848 in the bases 845 of the mount brackets 842, 843 and openings 33, 35 in the central panel 30 of the wall mount bracket 841. The openings 33, 35 in the wall mount bracket 841 of FIGS. 23-28 are horizontally aligned with and vertically spaced from each other, as described above. In one embodiment, illustrated in FIGS. 23-26, the wall mount bracket 841 has at least three openings 33, 35 that are positioned such that one of the openings 33, 35 is positioned above both beams 846, another one of the openings 33, 35 is positioned below both beams 846, and a third of the openings is positioned between the beams 846. The mount brackets 842, 843 have at least three corresponding openings 848 that are positioned in the same way.

The beams 846 of the weightlifting rack 844 may be connected to the mount brackets 842, 843 in various different configurations, including by use of welding, brazing, adhesives or other bonding materials, or various mechanical joining structures such as interlocking structures or screws, bolts, rivets, or other fasteners. In the embodiment of FIGS. 23-26, the beams 846 are received in openings 853 in the mount brackets 842, 843 and then bonded in place by welding, brazing, adhesives, or other bonding materials. The beams 846 are connected to a frame 849 configured to rest on the floor and support various weightlifting structures, including any of the weightlifting structures shown and described elsewhere herein. The frame 849 may include various frame members 850 and have various different forms, and in one embodiment as shown in FIG. 23, the frame 849 includes at least a first vertical member 851 located toward the first end 22 of the wall mount bracket 841 and a second vertical member 852 located toward the second end 24 of the wall mount bracket 841. The first and second vertical members 851, 852 engage the ground and are also connected to and/or support other frame members 850. The frame members 850 may be configured similarly to other frame members described herein, or may have a different configuration. The frame members 850 may further include cross-beams 854 between the vertical members 851, 852, and/or each set of beams 846 may have one or more supports 855 extending between them for strength and stability, such as shown in FIG. 23. In the embodiment of FIGS. 23-28, the beams 846 are connected at or near the tops of the vertical members 851, 852, and the vertical members 851, 852 include no additional support between the vertical members 851, 852 and the wall surface 700. The first side mount bracket 842, the first vertical member 851, and the beams 846 connecting them may be considered to constitute a first side assembly of the weightlifting rack assembly 840, and the second side mount bracket 843, the second vertical member 852, and the beams 846 connecting them may likewise be considered to constitute a second side assembly of the weightlifting rack assembly 840. In one embodiment, the spacing between the wall surface 700 and the first and second vertical members 851, 852 is greater than the lateral spacing between the first and second vertical members 851, 852. In another embodiment, multiple rack assemblies 840 as shown in FIGS. 23-28 may be arranged side by side and mounted along one or more wall surfaces, and such side by side rack assemblies 840 may be connected to each other by additional frame members, e.g., cross beams 854, to form a larger combined rack assembly.

Various embodiments of weightlifting rack assemblies, mount assemblies configured for use with such rack assemblies, and accessories therefor have been described herein, which include various components and features. In other embodiments, these structures may be provided with any combination of such components and features. It is also understood that in other embodiments, the various devices, components, and features of the weightlifting rack assemblies, mount assemblies, and other structures described herein may be constructed with similar structural and functional elements having different configurations, including different ornamental appearances.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Terms such as "top," "bottom," "front," "back," "side," "rear," "proximal," "distal," and the like, as used herein, are intended for illustrative purposes only and do not limit the embodiments in any way. Nothing in this specification should be construed as requiring a specific three dimensional orientation of structures in order to fall within the scope of this invention, unless explicitly specified by the claims. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A weightlifting assembly, comprising:
   a first wall mount bracket configured for mounting to a wall surface, comprising:
   a first central panel having an inner surface configured to face the wall surface and an outer surface opposite the inner surface, the first central panel having a first mounting region and a second mounting region spaced from each other along the first central panel;
   a first top wall mount panel located above the first central panel and configured to overlie the wall surface;
   a first bottom wall mount panel located below the first central panel and configured to overlie the wall surface, wherein the first top and bottom wall mount panels are offset from the first central panel in a first direction perpendicular to the outer surface and the inner surface of the first central panel, wherein the first top wall mount panel has a first upper slot that is elongated along a length of the first top wall mount panel, and the first upper slot is configured to receive a first upper wall mount fastener therethrough to couple the first wall mount bracket to the wall surface, and wherein the first bottom wall mount panel has a first lower slot that is elongated along a length of the first bottom wall mount panel, and the first lower slot is configured to receive a first lower wall mount fastener therethrough to couple the first wall mount bracket to the wall surface; and
   first offset panels respectively extending between the first central panel and the first top wall mount panel and between the first central panel and the first bottom wall mount panel, the first offset panels being respectively angled to each of the first central panel and the first top and bottom wall mount panels;
   a second wall mount bracket configured for mounting to the wall surface at a location below the first wall mount bracket and spaced from the first wall mount bracket, comprising:
   a second central panel having an inner surface configured to face the wall surface and an outer surface opposite the inner surface, the second central panel having a third mounting region and a fourth mounting region spaced from each other along the second central panel;
   a second top wall mount panel located above the second central panel and configured to overlie the wall surface;
   a second bottom wall mount panel located below the second central panel and configured to overlie the wall surface, wherein the second top and bottom wall mount panels are offset from the second central panel in the first direction, wherein the second top wall mount panel has a second upper slot that is elongated along a length of the second top wall mount panel, and the second upper slot is configured to receive a second upper wall mount fastener therethrough to couple the second wall mount bracket to the wall surface, and wherein the second bottom wall mount panel has a second lower slot that is elongated along a length of the second bottom wall mount panel, and the second lower slot is configured to receive a second lower wall mount fastener therethrough to couple the second wall mount bracket to the wall surface; and second offset panels respectively extending between the second central panel and the second top wall mount panel and between the second central panel and the second bottom wall mount panel, the second offset panels being respectively angled to each of the second central panel and the second top and bottom wall mount panels; and a weightlifting rack assembly connected to the first wall mount bracket and the second wall mount bracket, the weightlifting rack assembly comprising a first bracket connected to the first central panel of the first wall mount bracket at the first mounting region by a first fastener, a second bracket connected to the first central panel of the first wall mount bracket at the second mounting region by a second fastener, a third bracket connected to the second central panel of the second wall mount bracket at the third mounting region by a third fastener, and a fourth bracket connected to the second central panel of the second wall mount bracket at the fourth mounting region by a fourth fastener, wherein the first top and bottom wall mount panels being offset from the first central panel is configured to create a first space between the inner surface of the first central panel and the wall surface, to provide clearance for the first and second fasteners, and wherein the second top and bottom wall mount panels being offset from the second central panel is configured to create a second space between the inner surface of the second central panel and the wall surface, to provide clearance for the third and fourth fasteners, and wherein the weightlifting rack assembly is foldable and comprises a first side rack assembly connected to the first bracket and the third bracket and a second side rack assembly connected to the second bracket and the fourth bracket, wherein the first, second, third, and fourth brackets are pivot brackets, and wherein the first side rack assembly is foldable by pivoting at the first and third brackets, and the second side rack assembly is foldable by pivoting at the second and fourth brackets.

2. The weightlifting assembly of claim 1, wherein the first offset panels are respectively oblique to the first central panel and the first top and bottom wall mount panels, and wherein the second offset panels are respectively oblique to the second central panel and the second top and bottom wall mount panels.

3. The weightlifting assembly of claim 1, wherein the first mounting region comprises a first opening in the first central panel receiving the first fastener, the second mounting region comprises a second opening in the first central panel receiving the second fastener, the third mounting region comprises a third opening in the second central panel receiving the third fastener, and the fourth mounting region comprises a fourth opening in the second central panel receiving the fourth fastener.

4. The weightlifting assembly of claim 1, wherein each of the first side rack assembly and the second side rack assembly is moveable by pivoting between a folded configuration adjacent to the wall surface and an articulated configuration distal from the wall surface.

5. The weightlifting assembly of claim 1, wherein the weightlifting rack assembly further comprises a plurality of frame members including a first vertical member and a second vertical member spaced from each other, a first cross bar connecting the first bracket to the first vertical member, a second cross bar connecting the second bracket to the second vertical member, a third cross bar connecting the third bracket to the first vertical member, and a fourth cross bar connecting the fourth bracket to the second vertical member.

6. The weightlifting assembly of claim 5, wherein the first and second vertical members are configured to engage a ground surface that junctures with the wall surface.

7. The weightlifting assembly of claim 5, wherein the plurality of frame members further comprises a cross member connecting the first vertical member to the second vertical member.

8. The weightlifting assembly of claim 1, wherein the first top wall mount panel further has an additional first upper slot that is elongated along the length of the first top wall mount panel, and the additional first upper slot is configured to receive an additional first upper wall mount fastener therethrough to couple the first wall mount bracket to the wall surface, and wherein the first bottom wall mount panel has an additional first lower slot that is elongated along the length of the first bottom wall mount panel, and the additional first lower slot is configured to receive an additional first lower wall mount fastener therethrough to couple the first wall mount bracket to the wall surface, and wherein the second top wall mount panel further has an additional second upper slot that is elongated along the length of the second top wall mount panel, and the additional second upper slot is configured to receive an additional second upper wall mount fastener therethrough to couple the second wall mount bracket to the wall surface, and wherein the second bottom wall mount panel has an additional second lower slot that is elongated along the length of the second bottom wall mount panel, and the additional second lower slot is configured to receive an additional second lower wall mount fastener therethrough to couple the second wall mount bracket to the wall surface.

9. A method for mounting a weightlifting assembly, comprising:

mounting a first wall mount bracket to a wall surface at a first height, the first wall mount bracket comprising:
a first central panel having an inner surface facing the wall surface when the first wall mount bracket is mounted to the wall surface, and an outer surface opposite the inner surface, the first central panel having a first mounting region and a second mounting region spaced from each other along the first central panel;
a first top wall mount panel located above the first central panel, the first top wall mount panel overlying the wall surface when mounted;
a first bottom wall mount panel located below the first central panel and configured to overlie the wall surface, wherein the first top and bottom wall mount panels are offset from the first central panel in a first direction perpendicular to the outer surface and the inner surface of the first central panel, wherein the first top wall mount panel has a first upper slot that is elongated along a length of the first top wall mount panel, and wherein the first bottom wall mount panel has a first lower slot that is elongated along a length of the first bottom wall mount panel; and first offset panels respectively extending between the first central panel and the first top wall mount panel and between the first central panel and the first bottom wall mount panel, the first offset panels being respectively angled to each of the first central panel and the first top and bottom wall mount panels, wherein mounting the first wall mount bracket to the wall surface comprises inserting a first upper wall mount fastener through the first upper slot and inserting a first lower wall mount fastener through the first lower slot, such that the first upper and lower wall mount fasteners engage the wall surface to mount the first wall mount bracket to the wall surface;

mounting a second wall mount bracket to the wall surface at a second height that is lower than the first height, such that the second wall mount bracket is located below and spaced from the first wall mount bracket, the second wall mount bracket comprising:

a second central panel having an inner surface facing the wall surface when the second wall mount bracket is mounted to the wall surface, and an outer surface opposite the inner surface, the second central panel having a third mounting region and a fourth mounting region spaced from each other along the second central panel;

a second top wall mount panel located above the second central panel, the second top wall mount panel overlying the wall surface when mounted;

a second bottom wall mount panel located below the second central panel, the second bottom wall mount panel overlying the wall surface when mounted, wherein the second top and bottom wall mount panels are offset from the second central panel such that a second space is defined between the inner surface of the second central panel and the wall surface when the second wall mount bracket is mounted to the wall surface, wherein the second top wall mount panel has a second upper slot that is elongated along a length of the second top wall mount panel, and wherein the second bottom wall mount panel has a second lower slot that is elongated along a length of the second bottom wall mount panel; and second offset panels respectively extending between the second central panel and the second top wall mount panel and between the second central panel and the second bottom wall mount panel, the second offset panels being respectively angled to each of the second central panel and the second top and bottom wall mount panels, wherein mounting the second wall mount bracket to the wall surface comprises inserting a second upper wall mount fastener through the second upper slot and inserting a second lower wall mount fastener through the second lower slot, such that the second upper and lower wall mount fasteners engage the wall surface to mount the second wall mount bracket to the wall surface;

connecting a weightlifting rack assembly to the first wall mount bracket and the second wall mount bracket, the weightlifting rack assembly comprising a first bracket, a second bracket, a third bracket, a fourth bracket, and a plurality of frame members including a first vertical member and a second vertical member spaced from each other, a first cross bar connecting the first bracket to the first vertical member, a second cross bar connecting the second bracket to the second vertical member, a third cross bar connecting the third bracket to the first vertical member, and a fourth cross bar connecting the fourth bracket to the second vertical member, wherein the weightlifting rack assembly is connected to the first and second wall mount brackets by connecting the first bracket to the first wall mount bracket at the first mounting region on the first central panel, connecting the second bracket to the first wall mount bracket at the second mounting region on the first central panel, connecting the third bracket to the second wall mount bracket at the third mounting region on the second central panel, and connecting the fourth bracket to the second wall mount bracket at the fourth mounting region on the second central panel.

10. The method of claim 9, wherein the first bracket is connected to the first central panel by a first fastener, the second bracket is connected to the first central panel by a second fastener, the third bracket is connected to the second central panel by a third fastener, and the fourth bracket is connected to the second central panel by a fourth fastener, and wherein the first mounting region comprises a first opening in the first central panel receiving the first fastener, the second mounting region comprises a second opening in the first central panel receiving the second fastener, the third mounting region comprises a third opening in the second central panel receiving the third fastener, and the fourth mounting region comprises a fourth opening in the second central panel receiving the fourth fastener.

11. The method of claim 9, wherein the weightlifting rack assembly is foldable and comprises a first side rack assembly including the first bracket, the first cross bar, the third bracket, the third cross bar, and the first vertical member, and a second side rack assembly including the second bracket, the second cross bar, the fourth bracket, the fourth cross bar, and the second vertical member, wherein the first, second, third, and fourth brackets are pivot brackets, and wherein the first side rack assembly is foldable by pivoting at the first and third brackets, and the second side rack assembly is foldable by pivoting at the second and fourth brackets.

12. The method of claim 11, further comprising pivoting the first side rack assembly and the second side rack assembly from folded configurations adjacent to the wall surface to articulated configurations distal from the wall surface, and connecting a central cross member between the first and second side rack assemblies to fix the first and second side rack assemblies in the articulated configurations.

13. The method of claim 9, further comprising assembling the plurality of frame members and the first, second, third, and fourth brackets to form the weightlifting rack assembly.

14. The method of claim 9, wherein the first offset panels are respectively oblique to the first central panel and the first top and bottom wall mount panels, and wherein the second offset panels are respectively oblique to the second central panel and the second top and bottom wall mount panels.

15. A weightlifting assembly, comprising:
a first wall mount bracket configured for mounting to a wall surface, comprising:
a first central panel having an inner surface configured to face the wall surface and an outer surface opposite the inner surface, the first central panel having a first mounting region and a second mounting region spaced from each other along the first central panel;

a first top wall mount panel located above the first central panel and configured to overlie the wall surface;

a first bottom wall mount panel located below the first central panel and configured to overlie the wall surface, wherein the first top and bottom wall mount panels are offset from the first central panel in a first direction perpendicular to the outer surface and the inner surface of the first central panel, wherein the first top wall mount panel has a first upper slot that is elongated along a length of the first top wall mount panel, and the first upper slot is configured to receive a first upper wall mount fastener therethrough to couple the first wall mount bracket to the wall surface, and wherein the first bottom wall mount panel has a first lower slot that is elongated along a length of the first bottom wall mount panel, and the first lower slot is configured to receive a first lower wall mount fastener therethrough to couple the first wall mount bracket to the wall surface; and first offset panels respectively extending between the first central panel and the first top wall mount panel and between the first central panel and the first bottom wall mount panel, the first offset panels being respectively angled to each of the first central panel and the first top and bottom wall mount panels;

a second wall mount bracket configured for mounting to the wall surface at a location below the first wall mount bracket and spaced from the first wall mount bracket, comprising:

a second central panel having an inner surface configured to face the wall surface and an outer surface opposite the inner surface, the second central panel having a third mounting region and a fourth mounting region spaced from each other along the second central panel;

a second top wall mount panel located above the second central panel and configured to overlie the wall surface;

a second bottom wall mount panel located below the second central panel and configured to overlie the wall surface, wherein the second top and bottom wall mount panels are offset from the second central panel in the first direction, wherein the second top wall mount panel has a second upper slot that is elongated along a length of the second top wall mount panel, and the second upper slot is configured to receive a second upper wall mount fastener therethrough to couple the second wall mount bracket to the wall surface, and wherein the second bottom wall mount panel has a second lower slot that is elongated along a length of the second bottom wall mount panel, and the second lower slot is configured to receive a second lower wall mount fastener therethrough to couple the second wall mount bracket to the wall surface; and second offset panels respectively extending between the second central panel and the second top wall mount panel and between the second central panel and the second bottom wall mount panel, the second offset panels being respectively angled to each of the second central panel and the second top and bottom wall mount panels; and a weightlifting rack assembly connected to the first wall mount bracket and the second wall mount bracket, the weightlifting rack assembly comprising a first bracket connected to the first central panel of the first wall mount bracket at the first mounting region by a first fastener, a second bracket connected to the first central panel of the first wall mount bracket at the second mounting region by a second fastener, a third bracket connected to the second central panel of the second wall mount bracket at the third mounting region by a third fastener, and a fourth bracket connected to the second central panel of the second wall mount bracket at the fourth mounting region by a fourth fastener, wherein the first top and bottom wall mount panels being offset from the first central panel is configured to create a first space between the inner surface of the first central panel and the wall surface, to provide clearance for the first and second fasteners, and wherein the second top and bottom wall mount panels being offset from the second central panel is configured to create a second space between the inner surface of the second central panel and the wall surface, to provide clearance for the third and fourth fasteners, wherein the weightlifting rack assembly is fixed and comprises a first side rack assembly connected to the first bracket and the third bracket and a second side rack assembly connected to the second bracket and the fourth bracket, wherein the first, second, third, and fourth brackets are fixed brackets, wherein the first side rack assembly comprises a first vertical member configured to engage a ground surface that junctures with the wall surface, a first cross bar fixed to the first bracket and connecting the first bracket to the first vertical member, and a third cross bar fixed to the third bracket and connecting the third bracket to the first vertical member, wherein the second side rack assembly comprises a second vertical member spaced from the first vertical member and configured to engage the ground surface, a second cross bar fixed to the second bracket and connecting the second bracket to the second vertical member, and a fourth cross bar fixed to the fourth bracket and connecting the fourth bracket to the second vertical member, and wherein the weightlifting rack assembly further comprises a cross member connecting the first side rack assembly to the second side rack assembly.

16. The weightlifting assembly of claim 15, wherein the first offset panels are respectively oblique to the first central panel and the first top and bottom wall mount panels, and wherein the second offset panels are respectively oblique to the second central panel and the second top and bottom wall mount panels.

17. The weightlifting assembly of claim 15, wherein the first mounting region comprises a first opening in the first central panel receiving the first fastener, the second mounting region comprises a second opening in the first central panel receiving the second fastener, the third mounting region comprises a third opening in the second central panel receiving the third fastener, and the fourth mounting region comprises a fourth opening in the second central panel receiving the fourth fastener.

18. The weightlifting assembly of claim 15, wherein the first top wall mount panel further has an additional first upper slot that is elongated along the length of the first top wall mount panel, and the additional first upper slot is configured to receive an additional first upper wall mount fastener therethrough to couple the first wall mount bracket to the wall surface, and wherein the first bottom wall mount panel has an additional first lower slot that is elongated along the length of the first bottom wall mount panel, and the additional first lower slot is configured to receive an additional first lower wall mount fastener therethrough to couple the first wall mount bracket to the wall surface, and wherein the second top wall mount panel further has an additional second upper slot that is elongated along the length of the second top wall mount panel, and the additional second upper slot is configured to receive an additional second upper wall mount fastener therethrough to couple the second wall mount bracket to the wall surface, and wherein the second bottom wall mount panel has an additional second lower slot that is elongated along the length of the second bottom wall mount panel, and the additional second lower slot is configured to receive an additional second lower wall mount fastener therethrough to couple the second wall mount bracket to the wall surface.

19. The weightlifting assembly of claim 15, wherein the first side rack assembly further comprises a third vertical member configured to engage the ground surface and spaced farther from the first and second wall mount brackets than the first vertical member, and a first upper horizontal member and a first lower horizontal member connecting the first vertical member to the third vertical member, and wherein the second side rack assembly further comprises a fourth vertical member configured to engage the ground surface and spaced farther from the first and second wall mount brackets than the second vertical member, and a second upper horizontal member and a second lower horizontal member connecting the second vertical member to the fourth vertical member.

20. The weightlifting assembly of claim 19, wherein the cross member is fixed to the first upper horizontal member and the second upper horizontal member and extends between the first and second upper horizontal members.

* * * * *